United States Patent [19]

Meade

[11] 4,351,849

[45] Sep. 28, 1982

[54] FORAMINOUS MAT PRODUCTS

[75] Inventor: Reginald E. Meade, Stillwater, Minn.

[73] Assignee: DEC International, Madison, Wis.

[21] Appl. No.: 653,549

[22] Filed: Jan. 29, 1976

Related U.S. Application Data

[60] Continuation of Ser. No. 55,626, Jul. 13, 1970, abandoned, which is a continuation-in-part of Ser. No. 850,294, Jul. 1, 1969, abandoned, which is a division of Ser. No. 553,101, May 26, 1966, Pat. No. 3,520,066.

[51] Int. Cl.³ ............................................. A23C 1/05
[52] U.S. Cl. ..................................... 426/61; 426/72; 426/73; 426/285; 426/294; 426/317; 426/580; 426/582; 426/583; 426/588; 426/658
[58] Field of Search ................................... 426/72–74, 426/96, 285, 289, 294, 317, 580, 582, 583, 586, 587, 588, 384, 385, 443, 453, 465–467, 470, 471, 474, 491, 492, 658, 161; 159/4.5, 8–10; 34/10; 195/146

[56] References Cited

U.S. PATENT DOCUMENTS

| | | | |
|---|---|---|---|
| 1,874,665 | 8/1932 | Voohries | 159/4 F |
| 3,357,838 | 12/1967 | Nozick | 426/98 |
| 3,415,665 | 12/1968 | Hussman | 426/387 |
| 3,573,930 | 4/1971 | Dale | 426/582 |

*Primary Examiner*—Hiram Bernstein

[57] ABSTRACT

Spray dried products exhibiting improved dispersibility in solvent medium are obtained from a highly porous foraminous mat. The mat is comprised of a multiplicity of spheroidal dry particles bonded or fused together in an aggregate form. The fused particles of the mat are structurally arranged to provide a multiplicity of communicating pores and channels extending through the mat permitting the flow of a gas through the mat. The mat can be subdivided into pieces of the required size or reduced to a fine powder, if desired.

33 Claims, 19 Drawing Figures

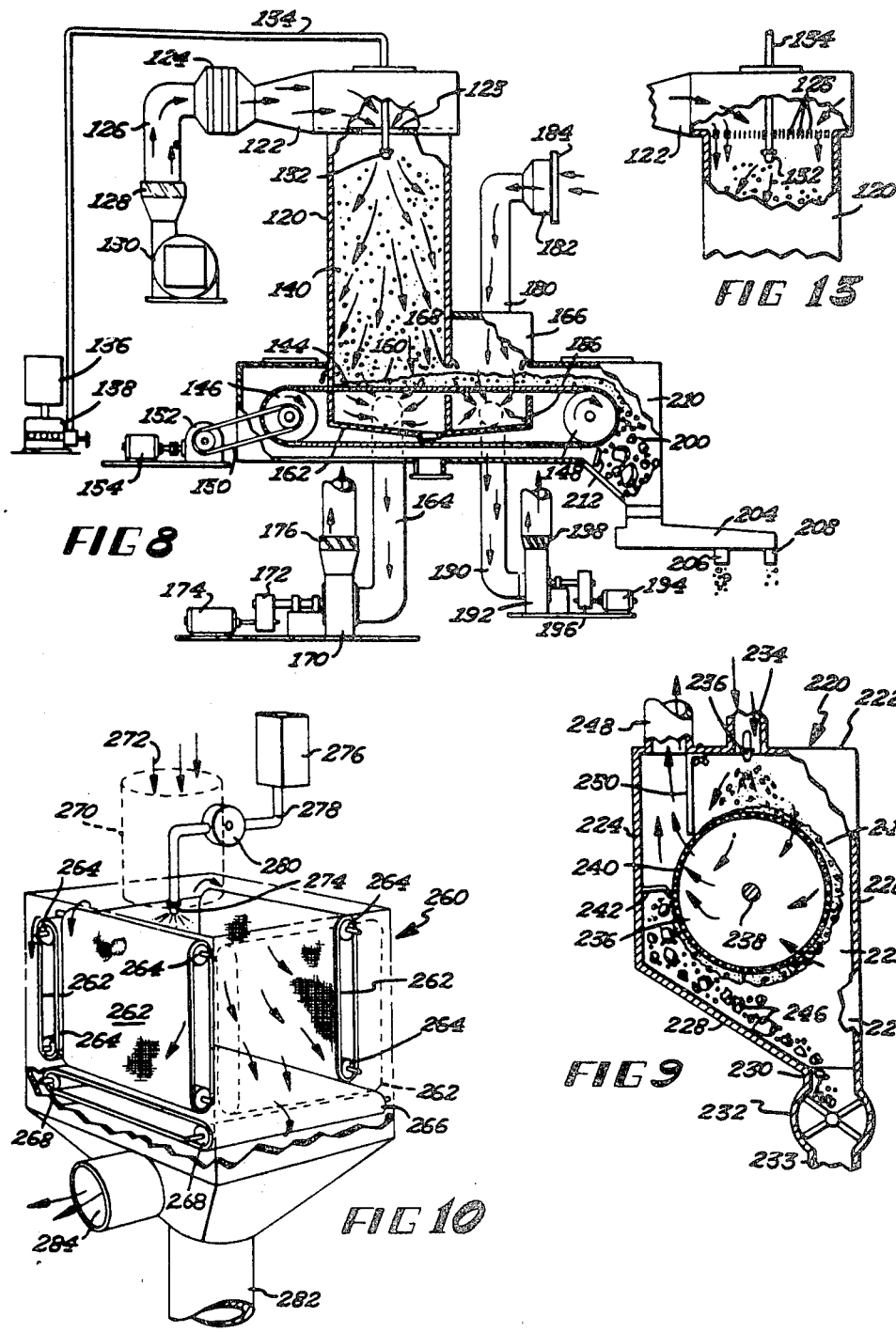

FORAMINOUS MAT PRODUCTS

This application is a continuation of application Ser. No. 55,626, filed July 13, 1970 and now abandonded, which is a continuation-in-part of application Ser. No. 850,294 entitled "Spray Dried Products," filed on July 1, 1969 by Reginald E. Meade and non-abandoned, which, in turn, is a divisional application of application Ser. No. 553,101 entitled "Spray Drying Method" filed on May 26, 1966 by Reginald E. Meade and now U.S. Pat. No. 3,520,066 issued July 14, 1979.

The present invention relates to foraminous mat products and more particularly to such products prepared by the drying of solids from a liquid solution or dispersion that is placed in finely divided droplet form and entrained in a gas stream. The invention applies to the drying of particles present in common suspensions, dispersions or colloidal suspensions as well as true solutions. The invention is also useful in providing foraminous mat products which in turn can be pulverized to provide agglomerated dried powders.

In the past several decades the drying of materials has been carried out on an ever-increasing scale by spraying liquids that are to be dried into a hot dry stream of gas passing through a drying chamber and collecting the dried solids. This process, frequently referred to as "spray drying," has become particularly widely used in the food industry for drying such products as milk, cream, instant coffee, cocoa, fruit and vegetable juices, extracts and flavorings. A variety of other products such as drugs, detergents, soaps, cosmetics, etc., have also been subjected to the process in other industries. In spite of the success this process has experienced, it has several (important disadvantages, limitations and shortcomings.

Liquid mediums containing materials having relatively low melting points and/or a high degree of solubility (e.g., a strong affinity for dispersing liquid such as deliquescent materials) are generally unsatisfactory for preparing dried materials therefrom. Thus to obtain dried materials from liquid mediums such as fruit juices (e.g. pineapple, orange, grape juices), other food products containing a relatively high percent of invert sugars like molasses, hydrolysates of starch (e.g. corn syrup, cane juice, sorghum, honey maple juice syrup) and highly concentrated fat products (e.g., in excess of 30% to about 90% by weight fat solids), etc. is an extremely difficult task.

In attempts to dry liquid mediums containing solid materials having a strong affinity for the dispersing liquid, there is a tendency upon drying for the solids to imbibe and retain the dispersing liquid. When the solid also possesses a relatively low melting point or fusion temperature in the presence of the dispersing medium, the ability to effectively remove the dispersing liquid becomes even more difficult. To achieve greater drying rates, higher temperatures are generally necessary. Such higher drying temperatures normally increase the quantum of heat in the medium to be dried which in turn provides greater vaporization and removal of the dispersing liquid medium from the solids. Unfortunately, if the solid material to be dried possesses a relatively low melting and/or fusion temperature, the solid material will become molten thus encapsulating or entraining the dispersing liquid therein. Such encapsulation and/or entraining of the liquid dispersing medium within the molten material prevents effective liquid removal therefrom. Upon cooling (as normally occurs during spray drying) the molten material coalesces onto a relatively impermeable mass with the entrained liquid medium therein. For these reasons it has been either technologically or economically unfeasible to prepare dried products from liquid mediums containing solids of such character.

Another disadvantage of prior spray drying processes is that they characteristically release a substantial amount of dust into the atmosphere or in the alternative require an elaborate dust collecting apparatus such as a cyclone or textile bag filter frequently larger than the drying apparatus itself.

Moreover, the texture of the product produced in conventional spray drying varies to some extent; that is to say, the product lacks uniform consistency with some particles being large and moist whereas others may be a fine, dry loose dust.

Another shortcoming of a conventional spray dryer is the loss of heat which is experienced. While a portion of the lost heat is carried away in the particles of solid material escaping from the dryer, the major amount is lost because there is insufficient contact time to bring about a higher degree of saturation in the drying medium.

A further shortcoming of the prior art is the fact that air entrained droplets of differing sizes and moisture content are all subjected to the same drying conditions and exposed to generally the same volume of drying air. Accordingly, the larger droplets which have a relatively high moisture content tend to be incompletely dried while the smaller particles are normally undesirably scorched or excessively dried.

A variety of other drying systems previously proposed have been either costly or largely ineffective is eliminating the aforesaid problems and accordingly have not been widely used.

In view of the deficiencies of the prior art, it is the general object of the invention to provide novel dehydrated products possessing low damage to product quality, low product loss and a predetermined final moisture content.

Another objective of the present invention is to provide highly porous dried mat products adapted to be subdivided into pieces of a predetermined size having instant wetting properties when added to a liquid.

These and other more detailed and specific objects will become apparent in view of the following specification and attached drawings wherein:

FIG. 8 is a side elevational view of another embodiment of the invention partly broken away.

FIG. 9 is a side elevational view partly in section of still another embodiment of the invention.

FIG. 10 is a side elevational view of yet another embodiment of the invention.

FIG. 13 is a partial side elevational view of the upper portion of the spray dryer of FIG. 8 showing the modified form of air flow control means.

FIG. 17 is a graph illustrating changes in processing conditions in connection with Example IV.

Figure 1:
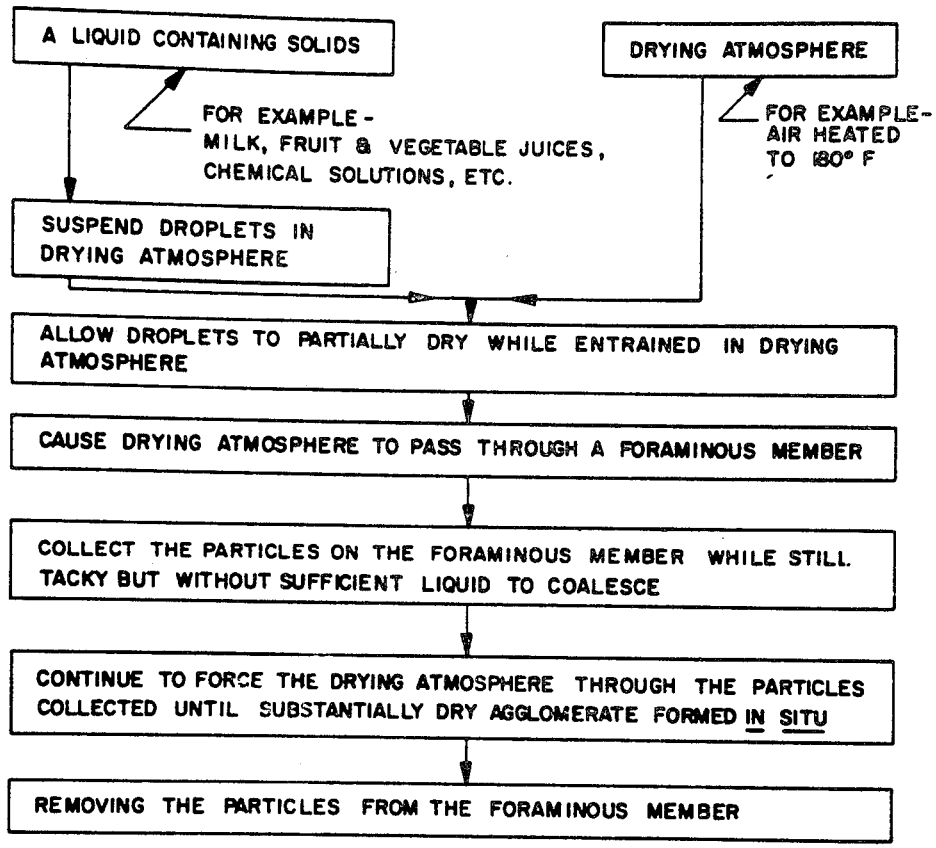
FIG. 1 is a flow chart showing the steps performed in a preferred embodiment of the invention.

I have discovered that the foregoing objects and advantages of the present invention can be accomplished by employing a process which will now be briefly described with reference to FIG. 1.

The process is begun with a fluid to be dried which is composed of a liquid containing a solid material either dissolved or suspended therein as a starting material. Examples of such starting materials are vegetable and fruit juices, milk, chemical solutions such as aqueous or non-polar solutions of any of a variety of materials, such as pure elements, salts, resinous materials and in general a solution, slurry or suspension of any material which is to be dried by the removal of a solvent or suspending liquid. An additional starting agency comprises a gaseous drying atmosphere. The drying atmosphere will normally consist of air heated substantially above room temperature or of air having a relatively low humidity level or of heated relatively low humidity air. The moisture present in the drying atmosphere is substantially below its saturation point. (The term "drying atmosphere" as used herein is intended to mean a gas at such conditions of temperature, pressure and vapor content as to be capable of absorbing a substantial quantity of liquid from the fluid to be dried.)

As a first step in the operation, the fluid to be dried is dispersed into the drying atmosphere as droplets small enough so that the liquid component of the fluid droplets will be readily evaporated. For most practical applications of the invention, it is preferred that the droplets be comparable to those produced in commercially available spray dryers. Generally, the smaller the diameter of the droplets, other things remaining equal, the more rapidly will moisture be removed.

Next, the drying atmosphere together with the entrained droplets (from which moisture is being removed) is directed toward a foraminous collecting member. While the surfaces of the particles are still in a tacky or cohesive condition, but do not contain sufficient liquid to enable them to excessively coalesce and form a relatively impermeable continuous material, the drying atmosphere passes through the foraminous member and the suspended particulate material is collected upon the foraminous member and upon the particulate material previously collected or upon both.

By the term "excessively coalesce" as used herein I mean a flowing or fusing together of the particles to form a relatively solid or continous less permeable material in which the individual particles cannot be clearly recognized without magnification and wherein the spaces or interstices between them are relatively small (if present at all) compared with the size of the particles.

The particles are thus brought together so as to contact one another while the surfaces thereof are in a tacky condition and bonds are formed at the points of contact between the particles to produce relatively highly porous lacy reticulum in which the substantial portion of the agglomerate thus formed consists of communicating spaces or pores between the contacting and bonded particles.

The ability of the particles to form bonds (fuse) will depend, of course, upon the nature of the product itself but in addition will depend largely upon two other operating conditions—the temperature of the particles at the time they strike the surface of the accumulated material and their moisture content. Thus, at a constant temperature greater moisture contents will promote greater fusion. In the case of many products, below a particular moisture content fusion may be adequate. In general, as the temperature is increased, fusion will take place with less moisture being required. It should be understood that these general statements will be subject to variation in the case of individual products.

During the drying operation, as the droplets pass through the spray chamber, the temperature of each droplet will be limited by its moisture content and by the wet bulb temperature of the drying gas which, in a typical case, for example, may be between 125° F. and 130° F.

The phenomena taking place during the falling rate phase will now be described. Once the particles have been deposited on the collection screen, a sudden change will take place in the relation between the particles and the surrounding air. The air will then begin to stream over and around the particles and through the minute microporous interstices between the particles in the agglomerate. As this streaming takes place, moisture removal from the particles will occur at a much higher rate. Removal of the last traces of removable moisture proceeds at a characteristically low rate. This is commonly referred to as the "falling rate drying period". In accordance with the present invention, after the movement of the particles has been arrested by deposition on the bed or screen, a substantial increase in the velocity of the drying gas relative to the particles is established. This provides a more effective means for removing the last traces of removable moisture than is attained during the falling rate phase in a drying process of the type in which the particles are entrained in the drying gas and thus moving at substantially lower velocity relative to the particles.

The flow of drying atmosphere through the bonded particles continues until the remaining moisture or other liquid present on the surface of the particles is removed and the particles are thereby firmly bonded to one another at their points of contact. In this way a deposit of bonded particles builds up upon the foraminous member with the drying atmosphere passing through the deposit to dry it and the particls which have been deposited upon the foraminous member serving as a means for collecting freshly deposited particles. When the spraying operation is finished and the accretion of material on the foraminous member is dried to the desired moisture content, it can be removed from the screen in any suitable manner.

I have found quite surprisingly that the particles do not pass through the foraminous member but instead accumulate in a porous, self-supporting mat. The mat includes side, upper and lower surfaces and is relatively large in size compared with the particles of which it is composed and the pores between the particles communicate with each other to form channels that extend from the upper or influent to the lower or efflunet surface of the mat. The lower surface is positioned adjacent to the foraminous collecting member. The mat in general has both a width and breadth of at least several inches, e.g. from 2—3 inches. The thickness of the mat should be at least the combined thickness of a multiplicity of dried particles but will often be several inches in thickness. Drying in this manner has a number of highly unique and advantageous benefits. The primary benefits are: First, filtration of air-entrained particles from the drying medium is accomplished by those particles already deposited in the mat, thus reducing and in some cases eliminating the need for auxiliary filters in the stream of exit drying gas. Since this phenomenon in the course of a drying operation has heretofore been unknown, it will be referred to as "autofiltration". Second, greater drying efficiencies can be achieved than was heretofore possible. While the precise reason for this result is not known with certainty, it is believed to be, in part, due to the accelerated evaporation due to the streaming of the drying medium around and through the particles having been deposited in the mat and, in part, to the increased driving force across the solid and gaseous interface. Third, greater product dryness is accomplished with the process of the invention because of the increased time of exposure of the material to the drying atmosphere. Fourth, the invention is capable of drastically reducing the undesired accumulation of the product on the walls of the dryer. This allows the application of the present process to products which were heretofore difficult or impossible to dry by conventional spray drying techniques or, for that matter, by any previous drying process of which I am aware. It also increases the product quality because of the reduction of heat damage. Fifth, the product that is being dried is placed, while in a practically dried state, in a form which can be transferred from the drying zone to one or more additional zones where further treatment may be performed. Sixth, the process of the invention places the product in a novel physical form (a porous, self-supporting mat which can be further processed if desired to provide products having advantageous properties such as a drying and/or cooling thereof without disrupting the fused particles within the bed or mat structure.

Refer now to FIGS. 2, 3 and 4. In FIG. 2 is shown a stationary enclosure or vessel 20 which in this instance forms a portion of a horizontally disposed duct. A gaseous suspending medium such as heated air 22 is forced through the duct from left to right and through a screen 24 which is supported to extend over the entire cross section of vessel 20 so that all of the heated air 22 must pass through it. Upstream of the screen 24 is a nozzle 26 for producing a spray 28 of the fluid material that is to be dried. The material being dried collects as a highly porous mat or agglomerate 30.

The thickness of this deposit upon the screen will vary. I have found that when a vertical stationary screen is employed, the thickness of the material deposited on the lower end of the screen is sometimes much greater than at the top. For example, the thickness of the material deposited in one instance on a vertical screen was ½ inch thick at the top and three inches thick at the bottom.

The appearance of the agglomerate 30 formed on the screen 24 is shown in FIGS. 3 and 4. The surface 30a which is positioned adjacent to the screen 24 bears the configuration of the screen surface. If the material is relatively tacky at the time it was deposited, marked striations and channels 30b normal to the surface 30a as shown in FIG. 4 will be present. If the material contains less moisture or is only slightly tacky it will have the irregular surface with no visible striations or markings as shown in FIG. 3.

Reference will now be made to the important process variables. First, any one or several of a variety of liquids containing a solid material can be employed. While the liquid will ordinarily consist of water, it can also comprise a non-polar liquid such as an organic solvent. Where the material being dried consists of a food product such as a bakery mix product, a vegetable fruit juice or milk or dairy product, the suspending liquid will ordinarily be water. Where chemical materials are being dried, a non-polar organic solvent such as a hydrocarbon liquid or other petroleum derivative, aldehyde, ketone or other solvent known to the art can be employed.

The solid material contained in the liquid can comprise any of a variety of particulated insoluble or soluble materials capable of being dried. They can comprise, for example, dissolved solids present as a true solution as well as colloidal and non-colloidal suspensions of insoluble material. The term "solids" as used herein also includes suspended materials such sometimes exist as a liquid, for example, fat in the case of dairy products.

The solid material being dried can consist of a single chemically pure material or a mixture. It must, however, include as a component a non-volatile material which is rendered tacky or adherent at some point during the removal of liquid. This will, of course, include materials which are not normally considered tacky in the sense that they have finger tack. The term "tacky" as used herein means capable of forming adhesive connections between particles of sufficient strength to hold a mass of material together to provide a porous medium permitting passage of gas.

The drying atmosphere will normally consist of heated air having a relatively low moisture content but it can also consist of other gases such as nitrogen, carbon dioxide, water vapor or the like. If organic solvents are employed for suspending the solids, an inert atmosphere will be preferred to prevent hazardous operation. As to temperature of the drying atmosphere, any suitable temperature may be used. In general, the drying temperatures of prior art spray drying may be used. The temperature of the air must be high enough to enable the drying atmosphere to hold a substantial quantity of the liquid or solvent being evaporated but should not on the other hand be so high that it will cause a chemical degradation or decomposition of the materials being dried. Moreover, it must not be so high as to melt the dried material that accumulates upon the foraminous collecting member. For example, the temperature can range up to 1000° F. In the case of food materials, the usual range is from about 100° F. to about 500° F.

In some forms of the invention described hereinbelow, more than one drying atmosphere can be employed. A first relatively high temperature gas to quickly evaporate the moisture or other solvent present in the product that is to be dried and a second or more relatively cool gas for quickly removing residual heat from the material accumulated upon the collecting screen to remove any soft deformable or plastic character from the deposit on the screen and convert it to a relatively hard brittle and friable product which can be handled without sticking to the exposed parts of the equipment which it contacts. In this manner, residual surface tack if it exists is removed and the product is converted to a relatively stable material which can be easily handled.

The foraminous collecting member has openings which will in most instances be many times larger in diameter than the particles themselves. Thus, for example, in spray drying foods, a wire screen having sixteen to several hundred openings per square inch can be suitably employed. As the initial material passes through the drying apparatus when operation is commenced only a fraction will be deposited upon the wires of which the screen is composed. The material will quickly begin to build up as a deposit upon the wires of the screen until the original openings within the screen are entirely closed. As this takes place, the material deposited upon the screen acts as its own collecting and supporting medium.

It is important that the surface of the particles are tacky at the time they strike the screen or surface of the deposited material. If they are entirely dried and exhibit no tackiness, they will either pass entirely through the screen or will tend to pack the screen and block substantially all flow of drying atmosphere through the screen which is, or course, undesirable. I have discovered that if the surface of the particles remain tacky when brought into contact with one another on the surface of the foraminous collecting screen, they will become bonded to one another in a relatively open network and will provide sufficiently large spaces between themselves to permit a satisfactory rate of flow of gas through the screen or form a substantially solid mass thereon. The tack of the particles depends upon several factors including the nature of the product, the amount of initial moisture present, the pressure, temperature and vapor content of the drying atmosphere, the spray particle size, concentration and the distance of the nozzle from the collecting screen. Variation in results can be controlled by moving the nozzle toward or away from the screen.

Figure 5:
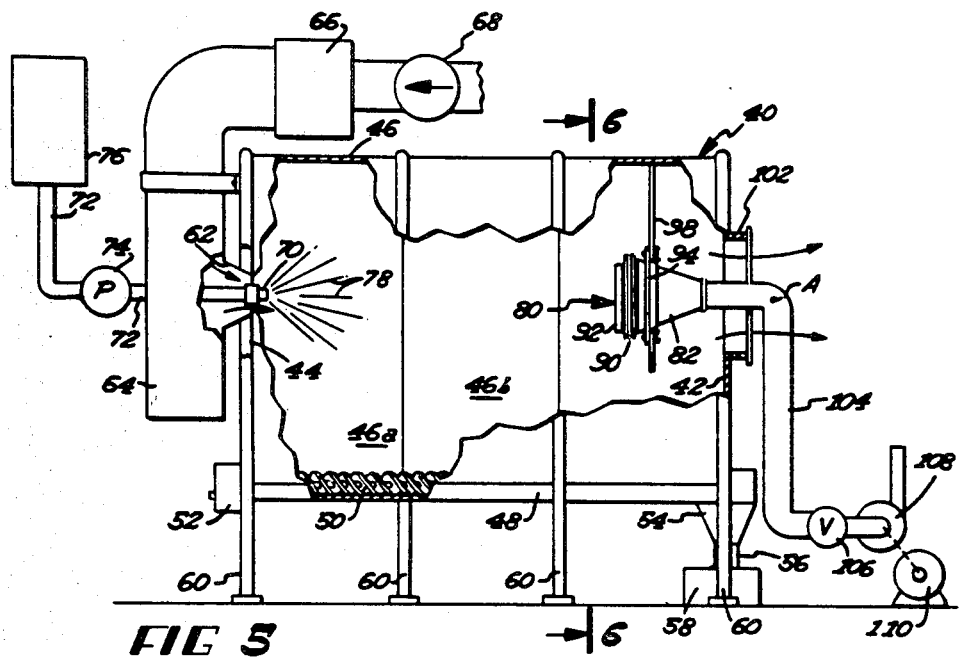
FIG. 5 is a side elevational view partially broken away of an apparatus employed for carrying out the present invention.
Figure 7:
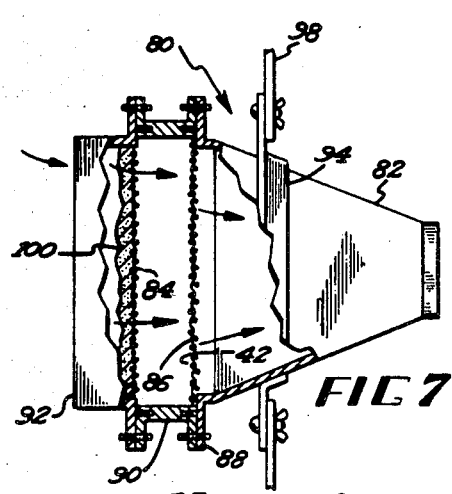
FIG. 7 is a greatly enlarged side elevational view of the collecting screen housing partly broken away.
Figure 6:
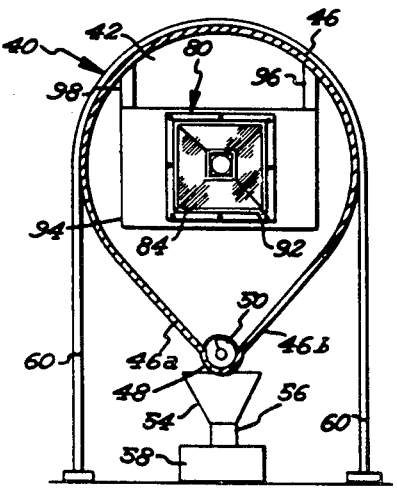
FIG. 6 is a transverse sectional view taken on line 6—6 of FIG. 5.

Refer now to FIGS. 5, 6 and 7 which illustrate one form of drying apparatus in accordance with the invention. As shown in the figures, there is provided a drying chamber or vessel 40 including front and rear walls 42 and 44 and side walls 46 which are generally cylindrical but included downwardly and centrally inclined wall portions 46a and 46b connected by a hemispherical trough 48 within which is mounted an auger 50 driven by means of a suitable motor 52. The auger 50 when rotated in the proper direction will convey dried material that falls to the bottom of the apparatus toward the right as seen in FIG. 5 to a collecting hopper 54 which is connected by means of a duct 56 to a storage container 58. The auger 50 is provided for collecting any of a material which is deposited upon the walls of the vessel 40 and which thereafter becomes loosened from the walls and falls down the inclined surfaces 46a and 46b. A portion of the material will be collected on the foraminous collecting means described below. The vessel 40 can be supported in any suitable manner as by means of tubular supporting frame members 60 connected in any suitable manner such as by welding to the chamber 40.

In the wall 44 is provided a drying gas inlet duct which communicates with a duct 64 that extends vertically and communicates with the outlet of an air heater 66 of any suitable known construction such as a gas burner. Air is supplied to the burner 66 from the atmosphere by means of a blower 68. Positioned concentrically within the air supply duct 62 is a spray nozzle 70 that communicates through a line 72 with a pump 74 which supplies the fluid to be dried from a supply tank 76. The fluid material being dried emerges from the nozzle 70 in the form of a fine spray 78. The sprayed particles are carried in the heated drying gas from left to right as seen in FIG. 5 toward a collecting device indicated generally at 80 which will now be described.

The collecting device 80, as shown in FIG. 7, comprises a tapered duct or funnel 82 and a pair of wire collecting screens 84 and 86 extending across funnel 82 in parallel spaced relationship. The screens 84 and 86 can be supported in any convenient manner but I have found that they will be suitably held in position by mounting screen 86 between the outward end of the funnel 88 and a square spacer 90 and the screen 84 between the spacer 90 and a short duct section 92. Bolts or other suitable fasteners can be used to secure the duct section 92 to the spacer 90 and the spacer 90 in turn to the outward end of the funnel 82. The entire collecting apparatus 80 is mounted upon a baffle 94 which is supported from the upper end of the vessel 40 upon brackets 96 and 98.

As shown in FIG. 7, a mat 100 of the type described hereinabove will form on the outward or central surface of the primary collecting screen 84. Screen 86 is not essential for proper operation but is included as a back-up screen for starting. The mat 100 will be highly porous and will contain channels that extend from the interior of the vessel 40 to the interior of the funnel 82 thereby allowing a substantial portion of the heated drying gas passing through the inlet 92 to pass through the mat 100 thereby further drying it after it has been deposited. The portion of the drying gas which does not pass through the screen will be exhausted through the outlet 102 (FIG. 5). Generally the exhausted gas passing through the outlet 102 will have a small amount of particulate material entrained in it and will consequently be passed through a suitable filtering mechanism such as a combinatin of cyclone collector and textile bag filter. Connected to the outer end of the funnel 82 is a duct 104 to which is secured a flow control valve 106 and an exhaust blower 108 to reduce the pressure within the duct 104 and funnel 82. The exhaust blower 108 can be driven in any suitable manner as by means of a motor 110.

The operation of the apparatus of FIGS. 5, 6 and 7 will now be described. To begin the operation, the heater 66 and blower 68 are started causing heated air to be introduced into the vessel 40 through the inlet duct 62. The liquid to be dried is then admitted through nozzle 70. Simultaneously, the motor 110 is started with the valve 106 in the "open" position thereby causing a reduced pressure condition within the line 104 and funnel 82. This in turn causes a current of heated gas to pass through the screens 84 and 86 as clearly shown in FIG. 7. As the operation of the device continues, a deposit 100 of a porous will begin to be produced upon the outward or central surface of the screen 84. After the deposit 100 is formed, little if any material will be added to the material 112 deposited on the screen 86 since the mat already formed upon the screen 84 acts as its own filter and thereby effectively removes all entrained particulate material from the stream of air passing through screen 84. However, because the openings in the screen 84 are much larger than the openings between the finely divided air entrained particles striking screen 84, a small amount of material will strike the screen 86 when the operation is started. Thus, as soon as the openings in the screen 84 become covered by the particles of the mat 100, the accretion of material on the screen 86 will be interrupted. In an apparatus of the type described in FIGS. 5, 6 and 7 used for drying a cake mix composition consisting primarily of shortening, flour and sugar, a screen having sixteen openings to the square inch and having more than 70% open area was employed as a primary screen and another as a secondary or back-up screen having ten openings per square inch was employed. While the primary screen had an accumulation of about 1½ inches of material, the back up screen had less than ⅛ inch of material deposited upon it and this material was deposited during the first five seconds of running. When sugar is being dried with an air flow of 100–400 fbm. through the dryer and an air temperature of 320° F. entering the dryer, I obtained good results by placing the nozzle from about 9 to 10 feet from the screen. At shorter distances, 5–6 feet, the particles were wet and tended to coalesce. At greater distances, the particles were insufficiently tacky and tended to pack or pass through the screen.

Refer now to FIG. 8 which illustrates another embodiment of the invention. The apparatus of FIG. 8 comprises a vessel such as a vertically disposed chamber 120 communicating through an inlet port 123 with a supply duct 122 and a heater 124 which in turn communicates through a duct 126 with a damper 128 to which air is supplied by blower 130. Mounted concentrically within the upper end of chamber 120 is a nozzle 132 that communicates through a supply duct 134 with a fluid product which is to be dried. If desired, the fluid travelling through duct 134 may be aerated or any suitable air entrained therein to facilitate the drying operation and reducing the density of the material. The fluid is supplied from a storage tank 136 under pressure by a pump 138. The liquid sprayed from the nozzle 132 is initially present in the form of wet droplets 140. These droplets are entrained in the heated air passing downwardly from the duct 122. As the particles pass downwardly, they strike a moving foraminous element or screen 144 entrained over a pair of horizontally disposed spaced rollers 146 and 148, the former being driven by means of a belt 150 connected to a speed reducer 152 which is in turn operated by means of a belt driven by a motor 154. The belt 150 can comprise a variety of materials such as a woven wire screen or perforated metal sheet. A variety of other collecting elements will be apparent to those skilled in the art.

As clearly shown in the figure, a deposit of material 160 forms on the upward surface of the foraminous belt 150. The air flowing into the chamber 120 from the duct 122 passes through this deposit of material 160 as indicated by arrows into a compartment 162 below the screen and is exhausted through a duct 164. The foraminous screen 144 is moved so that the upper reach thereof travels toward the right as seen in FIG. 8 carrying the accumulated mat on its upward surface into a second chamber 166 through an opening 168 for purposes hereinafter described. The duct 164 is connected to an exhaust blower 170 driven by a speed reducer 172 and motor 174. From the blower 170 the air passes through a suitable damper 176 which like damper 128 can be opened or closed as conditions of operation require. The chamber 166 communicates with an inlet duct 180 which is connected to an air cooler 182 of any suitable known construction. Prior to entering the air cooler 182 the air is passed through a suitable filter 184. On the opposite side of the screen 144 from the chamber 166 is a chamber 186 which communicates with an outlet duct 190 to a blower 192 driven by means of motor 194 and speed reducer 196. Air passing through the blower 192 is exhausted through a damper 198. The foraminous member 144 and the rollers are mounted within a chamber 210. At the lower end of the chamber 210 is provided a doctor knife 212 for scraping any remaining materials from the foraminous belt 150 before the belt returns to the inlet end of the chamber 120. The mat may be removed by any other suitable technique such as a blast of air.

During operation, as the foraminous member 144 travels over the roller 148, the agglomerated material breaks into chunks 200 which pass downwardly into a collecting trough 204. A suitable sifter can be provided for separating and grading various desired particle sizes and exhausting them through a pair of ducts 206 and 208 according to size. Any apparatus suitable for comminuting the discharged fragments is employed when desired to reduce the fragments to the desired size.

A slightly modified form of air flow control is shown in FIG. 13. This flow control consists of a grating 125 composed of a plurality of closely spaced parallel vertically disposed fins for establishing a laminar air flow, the turbulence within the chamber 120 will be substantially reduced and the resultant non-uniform accumulation of dried product on the walls of the apparatus will also be reduced. The flow through the foraminous collecting member 144 will also be laminar. It may be seen that my invention makes possible the provision of a spray drying apparatus without constrictions in the air flow between the spray nozzle and the point at which the drying air is withdrawn from the drying chamber.

In accordance with another modified form of the invention, an additional drying means is employed consisting of a microwave heater of any well-known commercially available kind. The microwave heater is suitably mounted to heat that portion of the mat within either chamber 120 or the chamber 166 of FIG. 8 and assist in removing residual moisture from the mat. As electromagnetic wave energy from the microwave heater is transferred to the water molecules, their increased energy will accelerate evaporation and as soon as the water is converted to the vapor state it is removed by the current of gas such as air passing through the mat from chamber 166 to chamber 186.

Refer now to FIG. 9 which illustrates another embodiment of the invention. As shown in the figure, there is provided a vessel 220 having a top wall 222, side walls 224, 226, 227 and 229, inclined lower wall 228 and outlet duct 230 which communicates with a star valve 232. A drying gas inlet 234 is provided at the upward end of the chamber. Within the duct 234 is provided a spray nozzle 236 that communicates with a source of fluid to be dried (not shown). Mounted for rotation within the chamber 220 is a cylindrical collecting drum 236 supported on a shaft 239 which is itself suitably journalled in the walls 227 and 229 and driven by means of a motor (not shown) at a uniform speed in a clockwise direction as seen in FIG. 9. The cylindrical wall of the drum 236 comprises a foraminous member 240 which can consist, for example, of perforated sheet metal. The openings may suitably be ¼ inch in diameter. A doctor blade 242 is mounted within the housing 220 in position to scrape deposited material 244 which has accumulated on the surface of the drum as shown. Material thus scraped from the drum falls downwardly in the form of porous chunks and pieces 246 along the inclined surface 228 into the star valve 232 and are exhausted through the duct 233. On the upper wall 222 is also provided an exhaust duct 248. Extending downwardly between the exhaust duct 248 and the inlet duct 234 is a baffle 250, the lower end of which contacts the upward surface of the drum 240. In this manner, the air passing through the duct 234 must pass through the accretion 244 to the interior of the drum before being exhausted thereby drying the material deposited upon the surface of the drum. The air then passes through the drum section between the doctor blade 242 and the baffle 250 is exhausted through the duct 248.

Refer now to FIG. 10 which shows still another embodiment of the invention. As seen in FIG. 10 there is provided a drying chamber or vessel 260 including imperforate side, top and bottom walls. On each of the walls is mounted a foraminous collecting element each comprising an endless screen entrained over a pair of horizontally disposed vertically spaced rolls 262 and 264. On the bottom of the chamber is provided a similar collection surface comprising an endless screen 266 entrained over horizontally spaced rolls 268. A suitable driving means is provided for turning each pair of rolls in given feed direct ons. At the upper end of the apparatus is provided an inlet duct 270 for conveying heated air 272 to the upward end of the apparatus. A spray nozzle 274 is provided at the upward end of the chamber 260. The fluid to be dried is supplied to nozzle 274 from a storage container 276 through a duct 278. A metering pump 280 controls the flow of fluid from the storage container 276 to the nozzle 274.

During operation, the air 272 passing through into the chamber 260 flows downwardly and outwardly through each of the screens 262. Material expelled from the nozzle 272 accumulates on the inward surfaces of each of these foraminous collecting members 262. The solid material collecting on the surface of each of the screens either falls from the screens where the screens pass over the rolls or can be removed therefrom by means of a doctor blade (not shown). After being removed, the material falls downwardly and is discharged through a duct 282. The drying air is discharged through a duct 284. The apparatus of FIG. 10 has the advantage that all exposed walls are covered by one of the foraminous collecting surfaces. This effectively prevents the walls of the chamber 260 from being covered with cakes of dried material sprayed from the nozzle 274.

It was found that under some operating circumstances and in the case of certain materials, there is a tendency for the dried or semi-dried particulate material to pass through the portions of the screen at the point where they enter the apparatus prior to the formation of a coating on the screen. In accordance with the modified forms of my invention illustrated in FIGS. 11 and 12, a means is provided for reliably preventing the passage of dried particulate material through the screen and out of the apparatus through the outlet duct which, if allowed to take place, would be wasteful and would create a dust problem. To prevent this occurrence, I provide a preliminary coating layer on the upstream surface of the collection screen prior to passing a drying gas through the screen and expelling the gas into the atmosphere. This can be accomplished in various ways. For example, an external supply of particulate material can be applied to the outside surface of the screen prior to passage into the drying apparatus. Alternatively, a portion of the material collected on the screen can be allowed to, remain at all times on the surface of the screen thereby providing a permanent preliminary coating layer. Two other alternative means for accomplishing this objective are described in connection with FIGS. 11 and 12 to which reference will now be made.

FIG. 11 shows a modified form of the invention including a provision for coating the collection screen with a predetermined thickness of the material that is to be dried prior to the passage of the drying gas through the screen and into the atmosphere. There is provided a drying enclosure or housing 300 including side, top and bottom walls, an inlet duct 302 through which a drying gas such as heated air is introduced, a duct 304 for supplying a moist material which is to be dried to a nozzle 306 positioned at the upward end of the housing 300 in the center of the duct 302. The housing 300 includes horizontally disposed and laterally spaced openings 308 and 310 through which passes a suitable foraminous member such as an endless woven foraminous screen 312 entrained over a pair of horizontally spaced parallel and laterally extending drive rolls 314 and 316, each suitably journalled for rotation and driven in given feed directions for advancing the screen through the housing 300.

Below a portion of the screen 312 within the housing 300 is a chamber designated 300*a* that defines an outlet plenum which receives the drying gas after it is passed through the screen 312. The dryin gas within the chamber 300*a* is exhausted through a duct 318 connected to the inlet of a suitable blower (now shown). Below the first portion of the screen 312 entering the slot 308 is a blocking plate 320 which will ordinarily rest in engagement with the lower surface of the screen 312 or closely adjacent thereto. A portion of the plate 320 can extend out of the apparatus through the slot 308. The plate 320 is preferably slidably mounted within the slot 308 for movement toward either the left or right as seen in FIG. 11 so that the area of the plate 320 underlying a portion of the screen 312 within the housing 300 can be controlled as desired. A handle 322 is provided for permitting manual adjustments to be easily made.

During operation of the apparatus illustrated in FIG. 11, the droplets sprayed from the nozzle 306 will be carried downwardly by the air passing through duct 302 toward the bottom of the housing. When the operation is started, the rolls 314 and 316 are turned in given feed directions thereby advancing the screen 312 toward the right through the housing. The particles will become tacky as moisture is removed from them as they travel toward the lower end of the housing and will form a deposit on the upper surface of the screen 312. The particles which are either extremely small or have been dried to the point where they are no longer tacky may initially pass through the screen 312 and will be exhausted through duct 318. A deposit will, however immediately begin to accumulate upon the upper surface of the screen 312 adjacent the plate 320 since substantially no air will be able to pass through that portion of the screen. This coating layer is designated 11a in FIG. 11. Because the layer 11a will be formed upon the screen prior to the time that the drying gas is allowed to flow through the screen, the loss of particulate material which would otherwise pass through the screen prior to the build-up of a coating layer is prevented.

Figure 11:
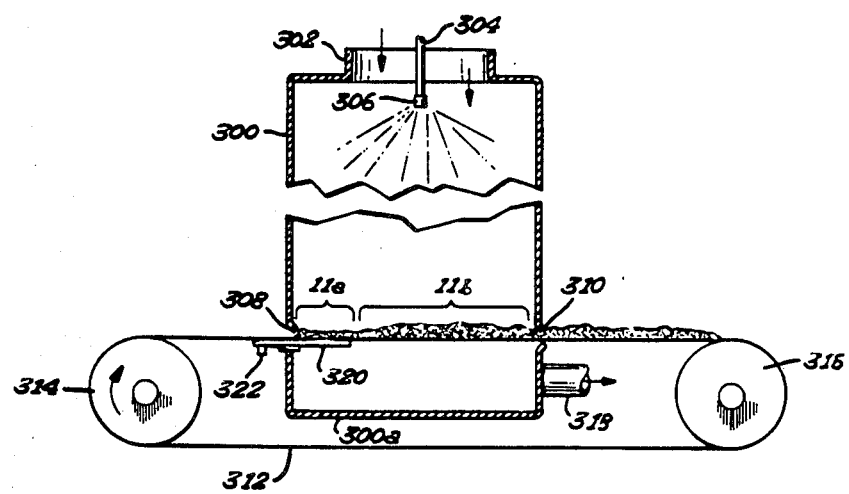
FIG. 11 is a semi-diagramatic side elevational view of a modified form of a dryer in accordance with the invention including a provision for pre-coating the collection screen.
Figure 12:
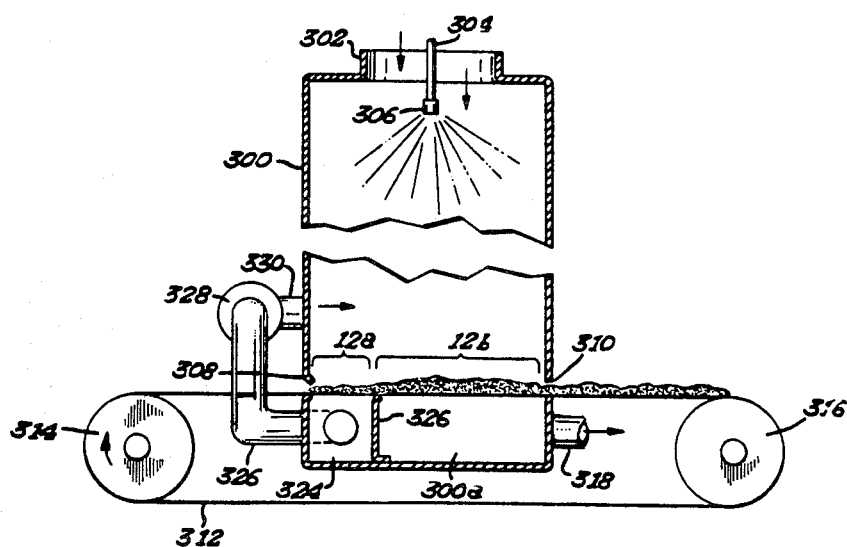
FIG. 12 is a modified form of the apparatus in accordance with the invention including another provision for pre-coating the collection screen.

Refer now to FIG. 12 which is similar to FIG. 11 and in which the same numbers have been used for corresponding parts except for the difference which will now be explained. As clearly seen in FIG. 12, no blocking plate has been employed. Instead, there is provided a collection chamber 324 defined by the side and bottom walls of the housing 300 and by a plate 326 which separates the chamber 324 from the chamber 300a. A duct 327 connects the chamber 324 to the inlet of a blower 328. The outlet of the blower 328 is in turn connected by means of duct 330 with the chamber 300 thereby recirculating gas from chamber 324 to the upper chamber of housing 300.

The operation of the apparatus illustrated in FIG. 12 will now be described. To begin the operation, the rolls 314 and 316 are driven in given food directions to convey the upper reach of the screen 312 from left to right as seen in the figures so that it travels first over the chamber 324 and next over the chamber 300a. The sprayer 306 is then operated as described hereinabove such that the droplets are carried downward and partially dried in the stream of drying gas entering through the inlet 302. Partially dried particles will first contact the screen 312 in the section thereof above the chamber 324. Any particles which happen to pass through the screen at this point are recirculated through the duct 326, blower 328 and duct 330. The particles which remain on the screen form an initial coating layer or deposit designated 12a, the thickness of which can be controlled by the speed of the screen 312 and the characteristics of the blower 328 and by other factors which will be apparent to those skilled in the art.

In this manner, a coating layer of semi-dried product designated 12a will be formed upon the upward surface of the collection screen 312 prior to the final deposit of the dried product thereon in the area designated 12b. In this manner, the product which initially passes through the screen will be recirculated to the drying chamber upstream of the collecting screen instead of being lost through the outlet duct 318.

The formation of the preliminary coating layer as described herein is highly effective in preventing the loss of dried products from the dryer. Moreover, the preliminary coating layers were found surprisingly porous and uniform in consistency.

Figure 14:
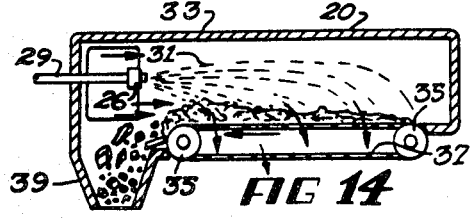
FIG. 14 is a semi-diagrammatic vertical longitudinal sectional view of another form of apparatus embodying the invention.

Refer now to FIG. 14 which illustrates a modified form of the invention embodying an endless moving collecting element. The apparatus includes a nozzle 6 connected to a source of liquid to be dried by a duct 29. The liquid to be dried is expelled as a spray 31 into a drying chamber 33. At the lower end of the chamber 33 defined by walls is provided a pair of laterally spaced horizontally disposed rolls 35 over which is entrained a porous collecting element such as a woven screen 37. During operation, the heated drying gas enters the apparatus in the area of the nozzle 26, passes through the screen 37 and is exhausted through a duct 39. The screen is thus interposed between the air inlet and air outlet of the enclosure. The screen 37 is preferably driven in a direction of travel opposite the flow of material through the nozzle, i.e. from right to left in FIG. 2. It will be seen that the particles containing the greatest amount of moisture travel the greatest distance in the air and are therefore deposited furthest from the nozzle 26. They consequently are subjected to drying for a greater period of time as they travel toward the outlet of the machine on the screen. A greater number of relatively small particles will be deposited near the outlet of the machine and consequently dried for a shorter period of time.

I have found that in some instances, the mat formed in accordance with the invention contains relatively fine particles which are collected by autofiltration from the gaseous drying medium as the medium passes through the agglomerate. These fine particles may be adhesively bonded to the mat but in some cases owing to their relatively low moisture content are merely mechanically trapped in the agglomerate. Moreover, a dry pulverulent material can be introduced into the drying chamber and intermixed with the dispersed air entrained liquid particles and collected by autofiltration on the mat of agglomerated material. The pulverulent material can have either the same or different compositions from the liquid particles.

The invention as it applies to the agglomeration of dried powders will now be described. In this application of the invention, since there is no liquid suspension to be dried, the dispersing means therefor is eliminated. The agglomeration process is begun with pulverulent solid which includes as a component a material that exhibits a certain amount of surface tack or adhesion when heated or when exposed to a liquid hereinafter referred to as "an activating liquid." Examples of such solids are foods such as dried powdered vegetable and fruit juices, milk, sugar, flour or powdered chemicals any, if a variety of materials, such as pure elements, salts, resinous materials and in general a pulverulent material which when exposed to a liquid will become tacky enough to bond to itself. A second starting material consists of the activating liquid. While this usually comprises water, it can also consist of other polar or non-polar liquids depending upon the material being agglomerated. An additional starting agency comprises a gaseous drying atmosphere. The drying atmosphere will normally consist of air heated above room temperature and containing moisture substantially below its saturation point. The term "drying atmosphere" as used herein is intended to mean at such conditions of temperature, pressure and vapor content as to be capable of holding a substantial quantity of the activating liquid.

As a first step in the operation, the solid to be dried is suspended in the drying atmosphere as by introducing it to the apparatus with an air stream. The activating liquid is also introduced into the drying atmosphere as droplets small enough so that the liquid portion of the droplets will readily contact and mix with the solids. For most practical applications of the invention, it is preferred that the droplets be smaller than approximately 150 microns in diameter. Generally, the smaller the diameter of the droplets, other things remaining equal, the more effectively and uniformly will the particles be bonded together to form a permeable mat and the more rapidly will any surplus moisture be removed by evaporation.

Next, the drying atmosphere together with the suspended moistened particulate material is passed through a foraminous collecting member. As the drying atmosphere passes through the foraminous member, the suspended particulate material is collected upon the foraminous member as well as and upon the particulate material which has already been deposited on the foraminous member while the surfaces of the particles are still in a tacky condition but do not contain sufficient liquid to enable them to coalesce and form a relatively solid material. By the term "coalesce" as used herein I mean a flowing or fusing together of the particles to form a relatively solid hard material in which the individual particles cannot be clearly recognized and wherein the spaces or interstices between them are relatively small (if present at all) relative to the size of the particles. The particles are thus brought together so as to contact one another while the surfaces thereof are in a tacky condition so that bonds are formed between the points of contact of the particles to produce relatively highly porous lacy reticulum in which a fairly high percentage of the agglomerate thus formed consists of empty spaces between the contacting and bonded particles. The flow of drying atmosphere through the bonded particles continues until the remaining moisture or other liquid present on the surfaces of the particles is removed and the particles are thereby firmly bonded to one another at their points of contact In this way a deposit of bonded particles builds up in situ upon the foraminous member with the drying atmosphere passing through the deposit to dry it. The particles which have been deposited upon the foraminous member serve as a means for collecting freshly deposited particles. When particles are collected and agglomerated in situ as described I discovered that a tightly packed or blinded condition on the collection screen is prevented and accordingly the flow of the drying atmosphere through and around the material deposited on the screen will continue without interruption. When the agglomerating operation is finished and the mat formed on the screen is completely dried it can be removed from the screen in any suitable manner. It is then preferably reduced to form agglomerate pieces of a predetermined size, often from 1/32 to ¼ inch in diameter. This can be accomplished by passing the mat through conventional sizing rolls (not shown).

Briefly, the apparatus in accordance with a preferred form of the invention (shown in schematic form in FIG. 8 hereof) includes a first area or zone into which is introduced a heated gaseous drying medium together with the suspended solids to be agglomerated together with an atomized activating liquid. This zone is provided with a foraminous surface which is preferably mobile arranged so that a minimum of the product is retained upon the walls of the drying chamber. The foraminous surface is constructed to permit passage of the gas through itself while most of the solid particles entrained in said heated gas are deposited on the inner side thereof thus separating the particles from the gaseous medium.

The particles accumulate on the surface while tacky until a predetermined desired thickness is reached to produce a highly porous network of bonded particles to form a friable solid accretion or agglomerate containing voids sufficient to permit passage of the gas therethrough but acting as a filter bed for additional entrained particles. In a preferred form of the invention a provision is made for causing the mobile collecting surface together with the bed of agglomerated particles to move out of the first drying area or zone to another area or zone wherein said heated and relatively humid drying gas is prevented from contacting the porous bed or perforated surface. There the porous accretion is further treated or dried and preferably cooled suffiently to facilitate its removal. The pieces that are removed are then reduced to the desired size often between ¼ and 1/6 inches in diameter as by screening or by passage through reducing rolls. Finally, the mobile perforate surface is returned to the original drying zone with or without a portion of the previously dried material.

The apparatus employed can be identical to that described above except that the spray nozzles will, of course, supply a liquid having little or no solids content rather than a solution or slurry.

During operation, the material to be agglomerated mixes with the spray and collects on the screen as a highly porous agglomerate. The particles that form the agglomerate have sufficient initial moisture during falling rate period to permit migration of soluble components while the product is maintained at a desired temperature for a desired period of time. This results in better surface wetting and more rapid solubility of the finished agglomerate when it is placed in water. The control of total drying time permits drying to desired moisture levels at relatively low temperature if desired when temperature-sensitive materials are being processed.

An application of this embodiment of the invention can also be adapted to produce a dry mat product from particles of dust entrained in the exhaust gas of a spray dryer or other dust laden gaseous atmosphere. Such a mat product and the method of producing same is described in Example XXXIV hereof and the process is described in more detail in my co-pending application Ser. No. 13,147 which is a continuation in part of Ser. No. 749,707 filed by me on Aug. 2, 1968.

The resultant highly porous mat of agglomerated particles collected by spraying a mixture of liquid and solid materials into a stream of drying atmosphere and causing the particles to deposit as a bed and to bond together at their points of contact is characterized as:

(a) a multiplicity of microscopic spheroidal particles rigidly adhering together at their points of contact with a multiplicity of communicating pores and channels extended through the mat whereby the passage of said drying gas through the mat is readily facilitated;

(b) said mat having side edges and an upper and lower surface;

(c) both the width and breadth of said mat being at least several inches and the thickness of the mat being at least the combined thickness of said dried particles; and, (d) the pores and spaces between the particles communicating between the upper and lower surfaces of said mat to permit the flow of gas through the mat from the influent to the effluent surface thereof. The microscopic spheroidal particles rigidly adhered together at their points of contact, possess a multiplicity of communicating pores and channels which facilitate the removal of moisture therefrom and the passage of drying gas therethrough. As a result, the dried mat, as well as the mat during the drying thereof, has pores and channels communicating between the upper and lower mat surfaces to permit the flow of gas through the mat from the influent to the effluent surface thereof.

The dried mat is characterized as a highly porous, lacy reticulum in which a substantial portion of the total volume for the mat is comprised of communicating spaces or pores between the bonded particles therein. The voids of spaced interstices contained within the mat can be characterized by a value referred to in the art as a void fraction value. This void fraction value is determined by the following mathematical computation:

$$\epsilon = 1 - (b_a/P_a)$$

wherein $\epsilon$ represents the void fraction, $b_a$ is the bulk density and $P_a$ represents the average particle density of the material tested.

A completely coalesced material would be solid without void spaces and therefore would have void fraction value of zero. Conversely, a bed characterized as having the highest possible void fraction will mathematically have a value of 0.87[1]. Generally, the void fraction for any particular mat pursuant to the teachings herein will depend largely upon the process conditions employed in preparing the mat. Relatively free flowing particles and which are deposited under process conditions without the appropriate degree of tackiness upon impact tend to compact and form a bed possessing a lower void fraction value. A particle possessing an appropriate degree of tackiness or coherence will adhere tangentially upon impact to a bed particle at its initial point of contact.

[1] Vold, M. F., "The Sediment Volume in Dilute Dispersion of Spherical Particles," *Journal of Physical Chemistry*, Vol. 64, p. 1616, 1960.

In preparing mats under varying process conditions wherein the degree of particle tackiness or coherence has been altered (e.g., increasing or decreasing particle wetness), it has been found that the void fraction values for the resultant mats correspondingly change. By plotting the resultant mat void fraction values against the particle tackiness values, a typical loci generated thereby is a bell-shaped curve having a maximum value approaching 0.87.

Although factors other than particle coherence such as particle electrostatic charge can effect particle coherence on the mat, the particle coherence upon deposition on the mat is a satisfactory means of controlling the desired mat product character. By varying process conditions such that the particles have a different content of dispersing liquid from which the particles are obtained, the character of the resultant mat product will change. Depending upon operating conditions and the inherent characteristics of the material utilized, typical moisture content of the particles (wherein water is employed as a dispersing medium) approaching the bed in the dryer generally ranges, for example, from less than 5 percent to more than 30 percent. At the low end of this range, the particles are generally nearly dry and do not possess the appropriate degree of coherence for mat deposition. Generally, at the high end of the range, the particles still possess considerable fluidity and may not only stick, but also tend to excessively coalesce which can result in a mat product having both a reduced void volume and a lesser total exposed surface area. The effect of extreme dryness and extreme wetness of the particles will both result in a low void fraction (as evidenced by then determined values), the former by slippage of particles over one another, the latter by excessive coalescence between particles.

There appears to exist an intermediate level of particle coherence wherein neither slippage nor coalescence is appreciable. In general, superior bed products are provided when the void fraction approaches theoretical maximum for beds formed by sedimentation of spheres. This maximum was estalished by Vold's studies as approximately $\epsilon = 0.87$. Purusant to the present invention, mats having void volume values approaching a theoretical maximum are provided. A general characteristic of the mats is a large void volume in relation to their exposed surface, and that the void volume is near the theoretical maximum in many cases.

Greater drying efficiency as well as improved product performance is achieved by the utilization of process conditions wherein the resultant mat has a void fraction value of 0.50 or greater. Mats having a void fraction of greater than 0.60 and preferably greater than 0.70 are conveniently provided by the present invention.

In addition to possessing relatively high void fraction values, the dried mats provided herein are further characteristic of having pores and channels communicating between the upper and lower surfaces to promote the flow of gas through the mat from the influent ot the effluent surface thereof. My copending application, Ser. No. 749,707 entitled "Dust Collecting Process" filed Aug. 2, 1968 discloses a suitable means for ascertaining the gas flow characteristics of the mat. As disclosed in the copending application, cylindrical cores are cut from the mat in the direction of gas flow therethrough. The cores are then placed in a chamber cell or cell of the same size with the core being sealed therein against gas seepage or gas flow along the cell side walls. By forcing air through the cell and measuring the pressure drop, the mat's resistance to flow of gas is ascertained. Comparatively, it has been found that mat products possessing unexpectedly superior characteristics will exhibit less resistance to gas flow than powders or granulated particles of a comparable density obtained from the mat.

A convenient means of ascertaining the gas flow resistance of a product and granulated products obtained therefrom is to determine its resistance to gas flow as the velocity of the gas being passed through the test sample equals zero (hereinafter referred to as I value). This I value may be derived by measuring the pressure drop of the particular test material at several different gas flow rates and plotting the air approach velocity in cm/sec versus the ratio of $\Delta p/uL$ in dyne-sec/cm$^4$ wherein $\Delta p$ is the pressure drop in dynes/cm$^2$, u is air approach velocity cm/sec. and L is the depth of the test sample. After plotting the ratio $\Delta p/uL$ for several different flow rates against air approach velocity and extrapolating the $\Delta p/uL$ ratio (based upon the plotted slope thereof) to a u value of zero, the I value for a particular test material is obtained. Apparatus suitable for obtaining data and the manner of deriving the gas flow resistance mat products and particulated samples is more fully described later herein.

Figure 18:
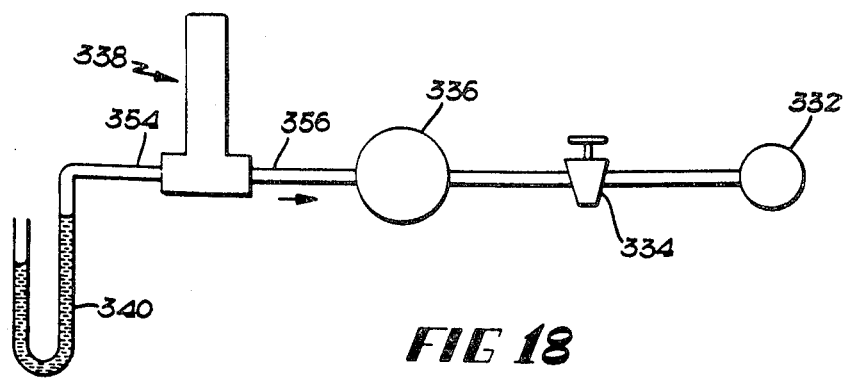
FIG. 18 is a schematic drawing of an apparatus suitable for providing data in ascertaining the resistance to gas flow of foraminous mat products and particles.

With reference to the schematic drawings of FIG. 18, a suitable apparatus for ascertaining the resistance to flow of gas for both the mat products and granulated test material is depicted. In FIG. 18 it will be observed that the apparatus is a vacuum system comprised of a vacuum pump 332, a valve 334 such as a Hoke needle valve to regulate the gas flow rate through the vacuum system, an air permeability cell 338 adapted to receive test material, and a manometer 340 such as an oil manometer whereby pressure differentials at varying gas flow rates may be determined. Vacuum conduit 356 permits the flow of atmospheric air through simple material contained wherein air permeability cell 338 and then respectively through gas meter 336, valve 334 and into the vacuum source (i.e., vacuum pump 332). Manometer conduit 354 connects the air permeability cell 338 to manometer 340.

Figure 19:
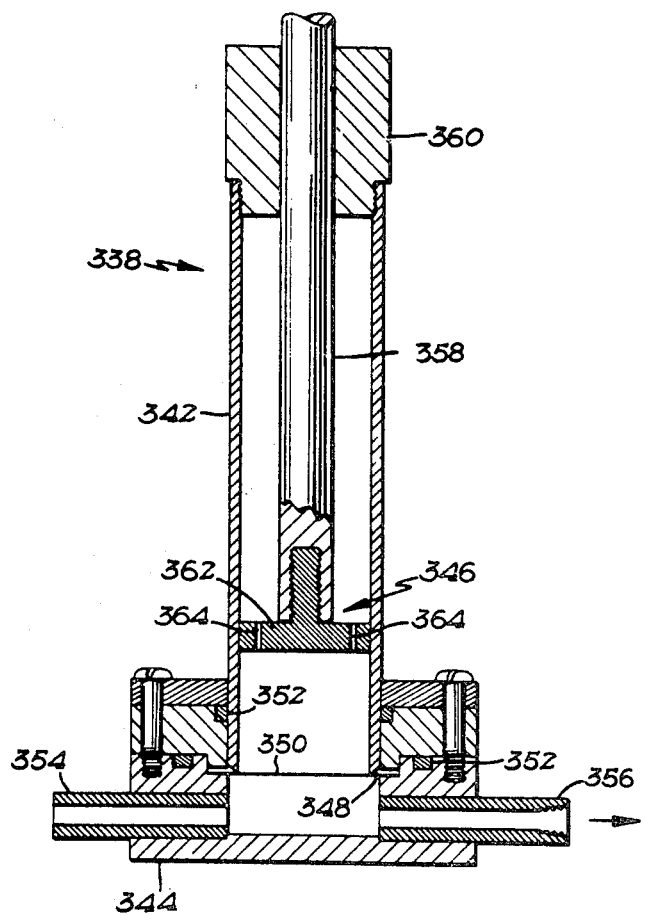
FIG. 19 is a vertical sectional view of the air permeability cell which is adapted to receive foraminous mat and particulate samples.

A suitable air permeability cell is depicted in FIG. 19. The air permeability cell is suitably constructed of a sample tube 342, a base assembly 344, and a piston 346. As indicated in FIG. 19, one end of the sample tube is chamfered to provide a cutting edge 348 for cutting through mat product structures. When the sample tube 342 is slipped into the base assembly 344, it rests against a perforated plate 350 which in turn supports a fine mesh screen such as a 200 mesh screen (not shown) utilized for the purpose of preventing test sample loss from air permeability cell 338 when vacuum is applied thereto. The sample tube 342 as utilized herein was six inches in length with an outer diameter of one and one-half inches and a wall thickness of 0.0625 inch. The base assembly 344 accepts removable sample tube 342 and provides an air passageway for the flow of gas through the sample being tested. Gas passage ways to the manometer 340 and to gas meter 336 as depicted in FIG. 18 is respectively provided by manometer conduit 354 and vacuum conduit 356. Base assembly 344 also provides a means of securing and hermetically sealing sample tube 342 thereto. The sample tube 342 is secured and supported by the base assembly via tube collar member 366 and retaining plate 368 which in turn are secured to the base assembly 344 via means of retaining screws 370. To engage and secure the sample tube to the base assembly the retaining screws are loosened sufficiently to release the pressure on O-rings 352 (e.g., rubber O-rings). Sample tube 342 is merely inserted through the retaining plate 368 and tube collar member 366 until its rests upon perforated plate 350. Retaining screws 370 are then securely tightened to the base assembly which in turn compresses O-ring 352 and thereby hermetically seals and retains the sample tube 342 therein.

The piston assembly 346 is provided primarily as a means of accurately measuring the sample depth. The piston shaft 358 is secured to the sample tube by piston collar member 360. The piston shaft 358 is ruled in tenth of inches and the piston collar member 360 through which piston shaft 358 slides has a corresponding vernier scle to enable ascertainment of sample depth to the nearest 0.01 inch. Piston head 362, attached to piston shaft 358, is provided with orifices 364 to permit the flow of gas therethrough the piston assembly 346 may be also utilized to compress particulate samples should this be desired.

In determining the resistance to gas flow test sample materials are placed in the air permeability cell 358. Valve 334 is then adjusted to a predetermined setting and the piston assembly is removed followed by engagement of vacuum pump 332. The actual flow rate of gas through the test apparatus was determined by means of gas meter 336 and stop watch, the pressure drop being derived from oil manometer (340). This test procedure is repeated for various other predetermined valve settings until a sufficient number of readings are determined to enable ascertainment of the resistance to flow of gas at a theoretical zero pressure (hereinafter more fully described).

Mat product samples for testing purposes were obtained by gently forcing the chamfered cutting edge 348 of sample tube 342 through the mat product in a direction parallel to the influent and effluent gas flow channels of the mat and thereby providing a sample core. Only those sample cores which appeared by visual observation to be intact and sealed tightly against the walls of the sample tube 342 are acceptable for test purposes. For each mat product, at least two acceptable cores were prepared and tested. If the I values computed for the two apparently acceptable sample cores differed by no more than 10% from the average I values of the test sample cores both test values were deemed valid but for charaterizing the product the average I value was used. In testing samples of highly deliquescent particulated or intact mat materials for gas flow resistance (e.g. pineapple solids) a dry gas (e.g. dehumidified air) should be employed. Particular care should be exercised throughout sampling, storing and testing procedures to avoid and prevent distortion or other physical change to the samples until testing is complete.

Suitable source materials for preparing the porous mat products of the present invention include those materials which exhibit dispersibility in a liquid medium (e.g., as a solute, colloidal dispersion or a slurry and the like where the material is uniformly dispersed throughout the liquid medium), capable of being atomized while in the dispersed state (e.g., spray dried), and which are rendered coherent by a liquid. In general, materials presently spray dried and/or agglomerated are suitable source materials for preparing mat products. Accordingly, a wide variety of commercial products including both industrial and those adapted for human consumption (e.g., animal, pharmaceutical and food products) are suitable as source materials for forming the mat structure described herein.

Typical mat products include those edible food products containing fats or carbohydrates or proteins or combinations thereof. Proteinaceous and carbonaceous materials (e.g., the saccharides) are particularly suitable in providing structural matrixes for the mat products. Relatively minor amounts (e.g., greater than about 5 percent and preferably 10 percent or more on a weight basis) of either the soluble and/or hygroscopic proteinaceous materials, carbohydrates or any combinations thereof is generally sufficient to provide a supportive matrix.

Exemplary carbohydrates (i.e., $C_X(H_2O)_Y$) include the monosaccharide wherein X and Y in the aforementioned formula range from 2 to 7 inclusive; the disaccharides wherein X is 12, Y is 11; the trisaccharides wherein X is 18 and Y is 16 and the polysaccharides wherein X and Y exceed a value of 18 includes the conjugated saccharides such as the gums and mucilage groups (saccharides and acids), the glucosides (saccharides and another compound), the tannins, etc.

Sugars (e.g., the mono-, di- and trisaccharides) are particularly suitable structural matrix ingredients for the mat products. The sugars may be either in the crystalline or amorphous form. Typical sugars and derivatives thereof include sucrose (e.g., beet and cane sugars), glucose (dextrose), cabbage sugars, arabinose, the invert sugars, maltose, lactose, trilose, xylose, inositol, frutose the carbonate esters of sugars (e.g., glucopyranose carbonate), the sugar chemicals (e.g., chemical products made commercially from cane sugar for use in detergents, cosmetics, pesticides, alcohol, sugar-formaldehyde, plastics and plasticizers such as sucrose benzoate), the lead acetates of sugar, the sugar phosphates such as fructose-6-phosphoric acid, lactose-6-phosphoric acid, glucose phosphoric acids, the inositolhexaphosphoric acids, mannose-6-phosphoric acids, 6-phosphogluconic acids, ribbose-5-phosphoric acid, mixtures thereof and the like.

Exemplary mats of dried fruit juices include dried juices of apples, apricots, avocados, bananas, peaches, pears, pineapple, plums, prunes, blackberries, boysenberries, cherries, cranberries, organes, figs, gooseberries, grapefruit, grapes, lemons, limes, logenberries, raspberries, tangerine, strawberries, mixtures thereof, etc. and dried whole fruit products thereof. Similar dried mats may be prepared from plant juices or syrups such as papalon, honey, molasses, sorghum, maple, hydrolysates of starch such as corn syrup, can juice and the like. In view of the relatively high amount of invert sugars for such products, the ability to provide a mat structure with acceptable permeability, dryness and with superior rehydration characteristics was unexpected. Due to the relatively mild drying temperatures and the ability to provide a drier resultant product, product processing degradation (e.g., charring, caramelization and loss of flvoar volatiles) is substantially reduced while signficiantly improving product stability.

Polysaccharides generally characterized as hydrophilic film formers are also suitable structural mat matrix ingredients. Upon addition to water, hydrophilic film formers are quite similar to wheat flour in that they have the characteristic of balling or agglomerating and-/or forming sticky masses even in the presence of very large quantities of water. Both naturally occurring and synthetically produced polysaccharide film formers are suitable structural matrices for the mat products. Illustrative polysaacharides include the water dispersible cellulosic derivitives such as sodium carboxymethylcellulose, hydroxypropylmethylcellulose ether, carboxymethylcellulose, hydroxypropylmethylcellulose ether, carboxymethylcellulose, hydroxypropylethylcellulose ether, hydroxypropylcellulose ether; the tree and shrub extracts such as tragacanth, arabic, ghatti, furcelleran and the salts of furcelleran (sodium, calcium, potassium and ammonium salts), karaya; seaweed colloids such as agar, carrageenin and the salts thereof (e.g., ammonium, calcium, potassium and sodium salts; the alginates (.e.g., the calcium, potassium, sodium alginates and propylene glycol alginates), starch, gelatinized starches and modified starches (e.g., hydroxypropyl starch, modified starches such as those treated with succinic anhydride, sodium hydroxide, aluminum sulfate, dextrin including corn syrups containing dextrin, etc.); pectins such as citruc pectin, low methoxyl pectin and sodium pectinate; seed extracts such as locust bean, quince, oat gum and guar gum and other gum-like natural and synthetic hydrophilic colloids such as dextran and certain biologically produced polysaccharides such as disclosed in U.S. Pat. No. 3,301,848 by Frank E. Halleck; *Xanthamonas compestris* produced polysaccharides such as disclosed in the *Canadian Journal of Chemistry*, vol. 42 (1964), pages 1261–1269, mixtures of hydrophilic colloids and the like.

The present invention can also be utilized to provide sweetening products knwn to the art as sugar replacements or substitutes. Such products normally contain a nutritive or non-nutritive binder as a major ingredient (e.g., sugars in combination with an artificial sweetening agent (usually a noncaloric sweetener). Illustrative sugar substitutes are disclosed, for example, in U.S. Pat. No. 3,011,897 by W. M. Grosvenor, et al (an agglomerated sweetening composition principally composed of sugar and a small amount of non-caloric sweetener therein); U.S. Pat. No. 3,170,800 by M. Tatter, et al; U.S. Pat. No. 3,259,506 by B. Eisenstadt employing lactose as the principal binding agent in combination with non-caloric sweetners; U.S. Pat. No. 3,285,751 by Paul Kracauer; U.S. Pat. No. 3,294,544 by G. L. Stanko employing arabinogalactan as a binder; U.S. Pat. No. 3,320,074 by H. T. Gebhart which employs dextrin substantially free from mono-, di- and trisaccharides as a polysaccharide binding agent; U.S. Pat. No. 3,325,296 by W. C. Braaten employing a water-soluble corn starch hydrolysate as a binding agent; U.S. Pat. No. 3,329,507 by Ernst Conrad employing non-hydroscopic water soluble dextrin with sorbitol. Additionally suitable binding agents are the water-soluble polysaccharides such as hereinbefore described in combination with artificial sweeteners.

Typical artificial sweetening agents for the aforementioned sugar substitutes and other dietetic mat products include the cyclamate salts, cyclohexylsulfamic acid, the saacharide and saccharin salts, dihydrochalcone derivatives, sucrose-ammoniated glycyrrhizin, various dihydrochalcone derivatives, aspartylphenyalanine methyl ester, aspartylphenylalanine lower alkyl esters per U.S. Pat. No. 3,492,131 by James M. Schlatter, mixtures thereof and the like. Other sweetners may be employed in like manner.

Mat products somewhat similar to either the sugar replacements or the dried fruit mat products and provided herein are the sugar sweetened fruit flavored beverage mixes, artificially sweetened dietetic fruit flavored mixes and dry mixes suitable for use as an alcoholic beverage mix. In general, the fruit flavored beverage mat products are comprised of an edible acidulent (e.g., fruit acids), fruit flavoring and a coloring agent with or without the sugar, sugar replacments and/or artificial sweetening agents which, if desired, are employed to impart sweetness and increase the product dispersibility.

Likewise, gelatin mat products and gel substitutes therefor are also provided by the invention. Sugar sweetened gelatin dessert products are somewhat similar to sugar based fruit flavored beverage mixes in that the gelatin dessert products normally contain sugar as a major ingredient (70–95 percent by weight) in combination with edible acidulents, fruit flavoring agents, coloring agents and gelatin (normally from about 5 to about 20 percent depending upon bloom strength) as minor ingredients on a weight basis. As with the dietetic fruit flavored beverage mat products, a portion or all of the sweetness provided by the sugar may be substituted with sugar replacement ingredients and/or aritifical sweetening agents. Similarly provided are the gelatin type dessert mat products wherein a portion or all of the gelatin has been replaced with another gelling agent such as the alginates (ammonium, calcium, potassium and sodium, sodium and carboxymethyl alginates), carrageenan and the salts thereof (e.g., ammonium, calcium, potassium and sodium), gum acacia, locust bean gum, sodium pectinate, etc.

Typical proteins as a mat product constituent include nitrogenous organic compounds of relatively high molecular weights (e.g., from 34,000 to 200,000) derived from both vegetable and animal sources, the synthetic derivatives thereof and the man-made synthesized proteins (e.g., simple proteins, the conjugated proteins and proteins derived therefrom). Exemplary simple proteins include the albumins (serum albumin, ovalbumin, lactalbumin and the like), globulins (e.g., proteins of seeds and nuts); prolamines such as those obtained from cereal seeds like zein from corn, the glutelins (e.g., proteins derived from ceral seeds with the removal of the alubmins, globulins and prolamines therefrom); scleroproteins (i.e., the albuminoids such as the collagen of skin, tendons, bones, elastins of elastic tissues such as tendons, arteries and the keratins from hair, nail, horns, feathers, etc.); histones, protamines, mixtures thereof and the like; also yeast, protein concentrates from yeast; other proteinaceous products derived from microbial or other ferments. Exemplary conjugated protein materials include the nucleoproteins, the glycoproteins (i.e., compounds of protein with carbohydrate as mucins and mucoids), the phosphoproteins (i.e., compounds having only phosphoric acid groups and occur, for examle, in casein of milk and in egg yolk); chromoproteins (e.g., hemoglobins); lecithoproteins (i.e., compounds of proteins with lecithins); lipoproteins (i.e., compounds of proteins with fatty acids, mixtures thereof and the like). Exemplary derived proteins include primary and secondary split products of proteins such as proteans (e.g., insoluble products from the action of water or enzymes such as myosan), metaproteins such as those derived from the action of acid or bases, the coagulated proteins (e.g., those coagulated by the action of heat or alcohol), protenoses (e.g., proteins obtained by further hydrolysis which are normally soluble in water, not coagulated by heat and precipitated in saturated solutions of ammonium or zinc sulfide), the peptones (normally soluble in water and non-coagulable by heat and not precipitated by ammonium sulfate), the peptides (i.e., compounds of amino acids containing peptide groups) and the like.

Preferred proteinaceous materials possessing hydrophilic film forming characteristics which function as a mat product constituent similar to polysaccharide hydrophilic film formers are egg albumin, human serum albumin, sodium proteinate of soy bean, wheat germ, wheat gluten, sodium caseinate, nut proteins, corn germ, nonfat dry milk solids, fish protein, bran proteins, pea flour protein, bean flour protein, mixtures thereof and the like.

Typical mat dairy products employing dairy products as a major mat product constituent on a weight basis are buttermilk, coffee cream, half and half, whipping cream, whey, custard, yogurt, nonfat milk solids, caseins, caseinates (e.g., the sodium and calcium caseinates), lactose whey, dried whole milk mat products and the like.

The invention is particularly adaptable to dried dairy mat products wherein it is desirable to provide a reconstituted product of a fine, smooth, creamy consistency. Preferred products which necessitate such consistency are frozen custards, malted milk, malted milk shakes, ice cream and ice milk, whipping cream mat products and the like. In preparing mat products having such an intended use, it is normally advantageous to aerate the slurry or mass with a non-toxic gas prior to atomization thereof with the degree of aeration being sufficient to reduce the average particle density of the particles within the resultant mat product (in comparison to a non-aerated product) by at least 10 percent. Unexpectedly superior results are normally (both as to product and processing efficiency) achieved when the average particle density thereof is reduced by aeration by at least 20 percent and preferably a sufficient amount of aeration to reduce the average particle density of the spray dried particles by at least 30 to about 60% by weight.

By aerating the slurry medium prior to the drying thereof, the resultant dried particles are characterized as having a highly porous particle structure with a plurality of gas voids therein. The highly porous particle structure increases the rate at which the dried material is reconstituted in a liquid medium and also imparts an aerating effect when the product is ultimately reconstituted. Aerated mats containing the aerated particles prepared from materials of suitable composition, (e.g., ice cream mix) in accordance with the present invention do not necessitate a whipping or beating step to provide an overrun of at least 150 to about 300 percent but may be prepared by merely reconstituting the aerated, dried mats with sufficient agitation to merely disperse the particles within the reconstituting medium. The rehydration character of the resultant mat product is also significantly enhanced by aeration.

Exemplary aerated mat products of suitable composition to provide acceptable overrun include toppings, fillings, dips, spreads, puddings, custards, souffles, gelatin desserts, frozen sherbets, salad dressings, fruit freezes, icings, tapioca, meringues, desserts and the like. In general, the gas retention characteristics of the lactalproteins are achieved by substitution thereof with an effective amount of a non-lactal based hydrophilic film forming agent such as the proteinaceous and polysaccharide hydrophilic film formers as hereinbefore disclosed. Normally, the sweetness of such mat products is enhanced by including as a mat ingredient sugar an/or non-nutritive sweeteners with the sugar and polysaccharides (e.g., dextrin) facilitating dispersibility of the product in a reconstituting medium. Many naturally occurring proteinaceous materials such as whole eggs and lacteal proteins normally contain a sufficient amount of emulsifying activity (e.g., lecithin, lecithoroproteins, phosphoroproteins, etc.) to facilitate product dispersibility, seration and foam stability. However, most proteinaceous and polysaccharide film formers inherently lack sufficient emulsifying activity therefor. Under such circumstances, it is desirable to employ as a mat product ingredient an effective amount of edible emulsifier or surface active agent.

Suitable edible emulsifiers or surface active agents in an effective amount include the partial fatty acid esters of glyceryl having at least one fatty ester group containing from 12 to 22 carbon atoms, the partial esters of fatty acids (e.g., 12 to 22 carbon atoms) and hexitol anhydrides, the polyoxyalkylene derivatives of partial esters of edible glycols and a higher saturated fatty acid (e.g., $C_{12}$ to $C_{22}$) and other surface active agents as well as mixtures thereof. Partial fatty acid esters of glyceryl having at least one fatty ester group are the mono- and di-glycerides such as glycerol monostearate, glycerol monooleate, glycerol monopalmitate, glycerol monolaurate, glycerol monomyristate, glycerol monobehenate, glycerol monopentadecante, glycerol distearate, glycerol dipalmitate, glycerol dilaurate, glycerol monostearate monopalmitate, glycerol dibehenate, glycerol dimyristate, glycerol monostearate monoethanoate, glycerol monopalmitate, monocaprate, glycerol monomyristate monocaprate, acetylated monoglycerides (e.g., acetylated glycerol monostearate, acetylated glycerol monoleate, acetylated monopalmitate, etc.), the glyceryl-lacto esters of fatty acids such as glycerol lacto oleate, glyceryl lacto-monopalmitate, partial esters of fatty acids include surface active agents such as propylene glycol monostearate, propylene glycol monopalmitate, propylene glycol monolaurate, propylene glycol monomyristate, etc.

Edible partial esters of the fatty acids and hexitol anhydride (e.g., the hextans and hexides) include the reaction products of the fatty acids (preferably the fatty acids having between 16 and 18 carbon atoms) and the hexitol anhydrides such as the partial fatty acid esters of sorbide and sorbitan acid esters, the partial monomannitan and mannide fatty acid esters, and the galactan and galactide fatty acid esters, mixtures thereof and the like. Illustrative partial esters of the fatty acids and hexitol anhydrides include mannitan di- and monopalmitates, mannitan mono- and distearates, mannitan mono- and dilaurates, mannitan mono- and dioleates, mannitan monopalmitate monostearate, mannitan mono- and di-myristates, mannitan tristearate, mannitan monobehenate, sorbide monolaurate, sorbide monooleate, sorbide monopalmitate, sorbide monobehenate, sorbide monostearate, sorbide distearate, galactan monostearate and distearate, galacitan monolaurate, galactitan monobehenate, galactide mono- and distearates, the sorbitan fatty acid esters, mixtures thereof and the like. Preferably employed as the partial esters of the fatty acids and hexitol anhydrides are the sorbitan fatty esters. Typical sorbitan fatty esters are those sorbitan fatty esters that have at least one fatty acid group containing from 12 to 22 carbon atoms and include sorbitan monostearate, sorbitan monopalmitate, sorbitan distearate, sorbitan dipalmitate, sorbitan monooleate, sorbitan dioleate, sorbitan dilaurate, sorbitan monolaurate, sorbitan monomyristate, sorbitan dimyristate, sorbitan tristearate, sorbitan monoprorionate monostearate, mixtures thereof and the like.

Typical polyoxyalkylene derivatives of partial esters of fatty acids and hexitol anhydrides include polyoxyethylene (20) sorbitan monostearate, polyoxypropylene (20) sorbitan monostearate, polyoxyethylene (20) sorbitan tristearate, polyoxyethylene (5) sorbitan distearate, polyoxyethylene (15) mannitan monopalmitate, polyoxyethylene (10) mannitan dimyristate, polyoxyethylene (20) Sorbitan dioleate, polyoxyethylene (20) sorbitan monooleate, polyoxypropylene (20) sorbitan monooleate, polyoxyethylene (20) galactitan monostearate, polyoxyethylene (20) galactitan diolate and polyoxyethylene (30) sorbitan monostearate. Additional surface active agents include sucrose monostearate, sodium dioctyl sulfosuccinate, lecithin, hydroxylated lecithin, etc. polyoxyethylene (20) sorbitan dioleate, polyoxyethylene (20 sorbitan monooleate, polyoxypropylene (20) sorbitan monooleate, polyoxyethylene (20) galactan monostearate, polyoxyethylene (20) galactan diolate and polyoxyethylene (30) sorbitan monostearate. Additional surface active agents include sucrose monostearate, sodium dioctyl sulfoscuccinate, lecithin, hydroxylated lecithin, etc. The aforementioned surface active agents are particularly useful in supplementing the ability of hydrophillic film formers to entrain and retain a gas in the resultant mat particles. The resultant aerated particles of the mat are characterized as consisting essentially of a multiplicity of highly porous particles possessing a significant reduction in average particle density comparative to particles obtained under nonaerated conditions. To achieve reduction of the average particle density of the mat product particles, liquid mediums capable of entraining and maintaining the incorporated non-toxic gas are suitable as a source material therefore.

A suitable apparatus for ascertaining gas entraining characteristics of liquid mediums (especially reconstituted dry products possessing a fine, smooth, creamy consistency) is disclosed as in U.S. Pat. No. 3,463,014 entitled "Method and Apparatus for Ascertaining the Characteristics of Food Products" by Morris H. Katz et al. The ability of such mediums to retain and maintain gas therein as it applies to edible food products of a fine, smooth, creamy consistency is further disclosed in U.S. Pat. No. 3,434,848 entitled "Food Mixes" by Morris H. Katz and U.S. Ser. No. 809,911 entitled "Edible Mix Compositions for Producing an Aerated Product" by Morris H. Katz, filed Mar. 23, 1969. Applying the ascertainment of the short gel characteristics for various aerated products (including the stability of such products over prolonged periods of time, as it relates to entraining and maintaining gas therein) mat products containing porous aerated particles are readily obtainable. Pursuant to the present invention, there is provided a variety of mat products containing porous aerated particles suitable as a food ingredient in providing a reconstituted product of a short gel character. Usually, the short gel characteristics for such products will range from 10 millimeters to about 30 millimeters. In preparing mat products containing porous aerated particles herein described, the amount of gas necessary to reduce the particle density will depend largely upon the liquid medium and solid constituents therein. For direct aeration of an inert gas, the incorporation of 0.1 to about 0.8 standard cubic feet of non-toxic gas per each pound of solid contained in the liquid medium will generally provide an average particle density reduction of at least 10% to about 60% (i.e., compared to non-aerated mediums). To provide an average particle density reduction of greater than 20%, an aeration rate of about 0.4 to about 0.6 cubic feet of non-toxic gas for each pound of solid contained in the visco-elastic mass is normally sufficient. Illustrative non-toxic gases include carbon dioxide, nitrogen and air, with air normally being preferred for economic reasons. A suitable method of injecting non-toxic gases into the liquid mediums is disclosed in U.S. Pat. No. 3,222,193 by Francis P. Hanrahan. Aeration may also be provided by solid or liquid gas-providing substances. For example, liquid carbon dioxide of granulated solid carbon dioxide may be incorporated into the liquid medium prior to the atomization and drying thereof. Similarly, conventional chemical leavening agents, as the leavening acids and bases disclosed herein and other solid gas producing agents. such as ammonium carbonate in either the liquid or solid form, can be used as aerators. In general the average particle density for most food products, as provided in the mat form by drying aerated masses, will generally range from about 0.25 to about 1.2 grams per cubic centimeter. The average particle density of the particles comprised of the mat will, of course, depend upon the density of the material employed therein. Other source materials suitable in preparing mat products exhibiting a creamy consistency upon reconstitution in an aqueous medium may be found, for example, in U.S. Pat. No. 3,330,667 by Tressler; U.S. Pat. No. 3,295,986 by I. M. Saslaw, et al; U.S. Pat. No. 3,300,318 by A. S. Szczesniak, et al; U.S. Pat. No. 2,883,286 by J. C. Musser; U.S. Pat. No. 2,913,342 by D. E. Cameron, et al; U.S. Pat. No. 2,939,792 by R. W. Kline, et al; U.S. Pat. No. 2,965,493 by J. J. Mancusco, et al; U.S. Pat. No.

2,992,113 by J. M. Gorman, et al; U.S. Pat. No. 3,098,748 by P. P. Noznick, et al; U.S. Pat. No. 3,383,219 by B. A. Patterson; U.S. Pat. No. 3,291,614 by L. Tumerman, et al; U.S. Pat. No. 2,598,282 by D. Melnick; U.S. Pat. No. 2,607,692 by M. H. Kennedy, et al; U.S. Pat. No. 2,785,982 by M. A. Weaver, et al; U.S. Pat. No. 2,801,924 by A. S. Clausi; U.S. Pat. No. 2,868,653 by H. W. Diamond, et al; U.S. Pat. No. 2,954,299 by A. S. Clausi, et al; U.S. Pat. No. 2,987,400 by A. R. Hunter; U.S. Pat. No. 2,927,861 by J. J. Charie, et al; U.S. Pat. No. 3,016,302 by A. R. Hunter, et al; U.S. Pat. No. 3,043,700 by A. S. Szczesniak; U.S. Pat. No. 3,183,098 by F. J. Baur; U.S. Pat. No. 3,246,992 by P. P. Noznick, et al; U.S. Pat. No. 3,231,391 by O. W. Breivik, et al; etc.

The invention is also applicable in providing mat products useful in preparing culinary and baking mixes including those which utilize chemical and yeast as a leavening. Illustrative leavened baking mixes include cake, roll, biscuit, cobbler, shortbread, cookies, bread, muffin, brownie, doughnut, pie crust mix, puffed snack, pancake, waffle and other similar mix products. These mixes customarily contain at least 10 percent farinaceous materials (e.g., flour and starch). In such mixes, large amounts of starch may be substituted for the flour provided the farinaceous material mixes contain sufficient wheat protein.

Illustrative leavened baking mixes to which the present invention is adaptable include the shortening based cake mixes. Shortening based cake mixes generally contain on a dry weight basis from about 20 percent to 50 percent flour, about 20 percent to 70 percent sugar, about 4 percent to 20 percent shortening with or without from about 0.5 to about 4 percent chemical leavening. Exemplary shortening based cake mixes are those mixes known to the art as layer cake mixes such as white, yellow and chocolate layer cakes and other flavored cake mixes (e.g., banana, orange, pineapple, fudge and spice layer cakes). Such shortening based layer cake mixes normally contain on a total mix weight from about 4 percent to about 20 percent shortening, about 35 percent to about 48 percent sugar and about 25 percent to about 45 percent flour. A dry milk product equivalent to form 0 percent to 5 percent nonfat dry milk solids is frequently included and, if desired, dried egg solids in an amount usually ranging from about 0 to 5 percent may be employed as a shortening based cake mix ingredient. Exemplary shortening based cake mixes other than those layer type cakes are cake mixes such as fruitcakes, gingerbread, pound cake, coffee cake, cupcakes, sponge mixes and the like.

Exemplary non-shortening based cake mixes are chemically leavened angel food cake mixes, as disclosed in U.S. Pat. No. 3,038,808 by J. R. Perrozzi, et al, broadly comprising about 10 to about 30 weight percent flour, about 50 percent to 75 percent by weight sugar, about 5 percent to about 20 percent weight egg albumen (dry weight basis) and from about 1 to about 8 percent by weight chemical leavening. Similarly provided are the two-package conventional two-stage and machine fold angel food cake mixes with the chemical leavening being omitted from the former.

Leavened bread mixes broadly comprise about 35 to about 80 percent flour, 5 to 50 percent sugar and, if desired, chemical leavening in an amount ranging from about 2.0 to about 8 weight percent with about 2 to 10 weight percent shortening. Also included are biscuit mixes which broadly contain from 75 to 90 percent by weight flour (usually 80 to 85 percent flour), about 5 to about 10 percent by weight shortening or fat and, if desired, about 2 to about 5 percent by weight chemical leavening.

For most baking mix formulations, it is generally desirable to supply only a portion of the total desired baking mix ingredients in the mat product form with the resultant mat product being useful as premix concentrates for various baking mix formulations. In U.S. Pat. No. 3,505,079 and U.S. Pat. No. 3,383,217, both by R. E. Meade, et al., increased flour component functionality as a baking mix ingredient was achieved by drying an aqueous flour slurry. The reconstitution and dispersibility characteristics of dried flour components in an aqueous medium were further enhanced by employing as an additional slurry and mat ingredient, an effective amount of mat adjunct aids exhibiting a relatively high degree of solubility in water. Suitable mat adjunct aids for such purposes include carbohydrates exhibiting a solubility of at least 50 grams (preferably at least 100 grams) in 100 ml of water at 20° C. Particularly suitable mat adjunct aids for increasing the reconstitution and dispersibility flour characteristics are the soluble sugars. For most baking mix products sucrose is preferred as a mat adjunct aid with dextrose alone or in combination with sucrose being employed in mixes wherein a browning effect is desired in the baked product. Depending upon the desired baking mix (e.g., bread and biscuit mixes necessitating less sugar than cake mixes), the amount of adjunct normally ranges from about 2 to about 180 parts by weight for each 20 parts by weight flour. Advantageously, the amount of adjunct ranges for about 5 to about 100 parts by weight with the preferred amount ranging from about 10 to about 40 parts by weight of adjunct for each 10 parts by weight flour. An effective amount of edible emulsifier may also be employed to facilitate the reconstitution and dispersibility characteristics of the flour.

Many of the aforementioned baking mixes utilize shortening in varying amounts. When the baking mix formulation necessitates shortening, it is advantageous to include the shortening as baking mix mat components along with an effective amount of emulsifier. Although the amount of shortening provided in the baking mix concentrate mat product may vary considerably (e.g., from 0 to about 90 percent by weight), the shortening most generally ranges from about 10 to 40% of the concentrate weight. The preferred level of shortening for shortening based baking mix concentrates is from about 15 to about 30% by weight. Conventional amounts of edible emulsifier (such as those described hereinbefore) are usually employed to facilitate recipe tolerance and baking functionality of the mat concentrate.

In yeast leavened products, the yeast leavening is generally omitted from baking mixes and added by the consumer after the baking mix has been reconstituted. Similarly, either the chemical leavening acid or base or both may be omitted and added subsequently to the granulated mat product. In providing the aforementioned baking mix mat products, it is desirable to aerate the mass with a non-toxic gas prior to atomization and drying.

Conventional baking mix ingredients (in quantities and proportions commonly added to dry baking mixes) such as yeast, chemical leavening, edible emulsifier, color and flavor additives, foam stabilizers, preservatives, buffer salts, surface active agents, egg solids, nonfat dry milk solids, starch, gum arabic, carboxymethylcellulose, artificial sweeteners, sodium caseinate and the like may be included as mat product constituents depending upon the ultimately desired product.

Materials other than the above carbohydrates and the proteinaceous materials such as fumaric, citric, adipic, and other tacky compounds may also be employed as the primary structural matrix ingredients. In general, dietetic, fruit flavored, synthetically sweetened beverage mixes do not necessarily contain either a carbohydrate or proteinaceous material but are suitable mat product ingredients. Patents disclosing such mixes may be found in U.S. Pat. No. 3,433,644 by W. L. Ganske, et al. and U.S. Pat. No. 3,506,453 by Fred McCarron, et al.

Another suitable application of the present invention is in providing instant dry mat products for use as a breakfast beverage. Conventionally, such instant breakfast products are adapted to provide a balanced nutritional diet (e.g., nutritional caloric ingredients and proteins and if desired supplemented with vitamins and minerals). Such instant breakfast products are normally consumed in a liquid form by reconstituting dried instant breakfast base product is an aqueous medium such as water or milk. An exemplary dry instant breakfast product for such use contains 2 parts by weight proteinaceous material, about 3 parts to about 20 parts by weight fat and/or carbohydrate fortified with or without either at least one vitamin and/or vitamin supplements (e.g., niacin, vitamins A, $B_1$, $B_2$, $B_{12}$, C, D) and/or mineral supplements (e.g. iron, copper, calcium, magnesium, phosphorous, etc.). Said dry instant breakfast mat products normally provide at least 15 and preferably 25 percent or more of the recommended dietary allowance as established by the Food and Nutrition Board, National Academy of Sciences[3] when 20 grams of mat product is reconstituted in 200 grams of milk. Suitable protein source materials for the mat ingredients are the proteinaceous materials hereinbefore defined with the hydrophilic protein film former of a balanced amino acid content hereinbefore defined as the major protein ingredient being preferred. Fats and/or carbohydrates can be employed as the major caloric ingredients with sugar as a major constituent thereof being preferred. Advantageously provided are instant breakfast mat products containing from about 2 to about 9 parts by weight fat and/or carbohydrates for each 2 parts by weight protein. Conventional flavoring and coloring agents, edible emulsifier and body agents (e.g., polysaccharide film formers) are also employed as dry milk ingredients.

[3] *Recommended Dietary Allowances*, National Academy of Sciences, 7th Edition, 1968.

Other nutritional mat products to which the invention is adaptable include strained and/or pureed dehydrated baby food mat products and the like such as precooked cereal products (e.g., barley, high protein, oatmeal, rice, wheat with or without added nitrates, dessert pudding (e.g., chocolate, butterscotch, vanilla, etc.), fruit pudding (e.g., starch base, milk, and/or egg in a variety of fruit flavors), beef noodle cereal-egg yolk-bacon, meats, poultry and eggs, beef heart, chicken, egg yolks, strained; egg yolks with ham or bacon, lamb, liver, strained; liver and bacon, strained; pork, vegetables such as beans (green), strained beets, carrots, mixed vegetables (including vegetable soup), strained peas, creamed spinach, squash, sweet potatoes, strained tomato soup, chicken noodle dinner; macaroni, tomatoes, meat and cereal split peas, vegetables, and ham or bacon; vegetables and bacon, with cereal; vegetables and beef, with cereal; vegetables and chicken, with cereal; vegetables and ham, with cereal; vegetables and lamb, with cereal; vegetables and liver, with cereal; vegetables and liver, with bacon and cereal; vegetables and turkey, with cereal; beef with vegetables; chicken with vegetables; turkey with vegetables; veal with vegetables.

Instant mat products related to the aforementioned and also provided herein are instant precooked dehydrated soups such as beef, chicken, chicken-cereal, onion, green pea, tomato, vegetable and the like in both clear and cream styles.

Additional exemplary dried mat products include cheese fondues and souffles, gravy mixes, coffee, tea, powdered nuts (e.g., U.S. Pat. No. 3,317,325 by J. R. Durst), nut masses (e.g., marzipan, persipan, nougat, nut meat masses such as disclosed in the U.S. Pat. No. 3,115,419 by H. Schoppe, et al.), powdered fat compositions such as disclosed in British Pat. No. 937,564 of September 1963, condiments and condiment containing mat products (e.g., chili sauce, catsup, mustard, etc.), cooked cereal products such as hot breakfast cereal products, yeast, grated cheese, vitalized wheat germ, instant wheat flours, encapsulated flavoring agents (e.g., for illustrative ingredients and techniques therefor. See U.S. Pat. Nos. 2,949,368 by K. P. Demick; 3,067,038 by J. J. O'Connell; 2,906,626 by B. M. Eagon; 2,876,160 by T. J. Schock, et al; 2,886,441, 2,886,448, 2,886,446 and 2,886,442 by F. Kramer, et al; 3,159,585 by R. B. Evans, et al; 3,137,631 by S. Soloway, 3,264,114 by M. Glicksman, et al), encapsulated dyes (e.g., see U.S. Pat. Nos. 3,116,206 by C. Brynko, et al; 3,161,602 by J. A. Herbig, et al; 2,800,457 by B. K. Green, et al; 3,396,116 by L. M. Adams, et al; 3,396,117 by C. E. Schuetz; 3,423,489 by R. P. Arens, et al; 3,041,288 by W. H. Anthony; 3,317,433 by H. J. Eichel; 3,254,330 by A. J. Bruzynski, et al), sustained release therapeutic compositions; cocoa and chocolate products including the high fat medium and low-fat cocoa and chocolate products including the high fat medium and low-fat cocoa processed with or without alkali.

From the aforementioned disclosure, the following examples and appendant claims there is provided pursuant to the present invention of mat products with a board spectrum of chemical compositions. Appendant are claims for various edible mat products such as whey, buttermilk, ice cream, sour cream, sweet cream, whole milk, non-fat dry milk, cheese, cheese food and the like, the definitions and composition of which are well established and known to the art (e.g. published in the *Federal Register* and various U.S.D.A. bulletins and other federal agency publications).

Due to the manner in which the mat products of this invention are prepared, the channels extending from the influent to the effluent surface of the mat product provide an unexpectedly low resistance to gas flowing therethrough. Accordingly, most mat products prepared pursuant to the invention will have a sufficient porosity from the influent to effluent surfaces thereof so that the mat product exhibits a lesser resistance to the flow of gas than a particulated sample of the mat in which the particulates have a maximum size of less than 840 microns with the resistance to the flow of gas for the particulated sample being computed on an equivalent void fraction and weight basis as the mat product.

It has been found that mat products which have a relatively low resistance to flow of gas therethrough normally provide or can be treated so as to provide granulated or sifted particles possessing improved characteristics over those obtained from mat products having a greater resistance to gas flow. Illustrative improved characteristics achieved thereby include dispersibility, preservation of volatile flavor components, improved color, storage stability, flow character, a low and more uniform moisture content, controlled and predetermined uniformity in size and shape without a concomitant undesirable quantity of dust or fine particles, greater control in providing a particle in either the crystalline and/or amorphous form, reduced chemical, bacteriological and enzymatic degradation, and if desired, preservation and/or retention of biologically active substances such as viable microorganisms, enzymes, co-enzymes and the like. As indicated by the following examples herein, particulated samples having a maximum particle size of 840 microns frequently exhibit at least a two-fold or three-fold increase in gas flow resistance as compared to the mat products from which such particulates are obtained.

The mat products as prepared herein also establish a gradient difference in density. The mat portion initially deposited on the collecting screen (i.e., in closest proximity of the effluent surface) tends to be more dense than subsequent mat depositions in closer proximity of the influent surface of the mat. Immediately after leaving the spray drying chamber, the mat product also tends to exhibit a gradient difference in moisture content from its influent to effluent surface. The mat product portion in closest proximity to the effluent surface has a lower moisture content than that portion nearest to the influent surface.

Due to the unique permeability character and structure of the mat products resulting from this invention, they can be further characterized as unusually receptive, sensitive and rapidly responsive to external forces such as infrared or microwaves and to changes in the physical state or other properties of fluid media in contact with the mat or portions thereof. Such characteristics will suggest other obvious applications resulting in other novel porous mat products. For example, a heated, humidified fluid (air) when passed through the mat products at regulated rates, temperatures, and quantities, can impart desirable properties not otherwise possible to achieve in non-porous or packed granular beds of materials of similar to identical chemical composition. Thus, a porous mat food product can be produced with a negative or greatly reduced content of viable microorganisms. This can be attained by contacting the intact bed with a hot, humid gas as shown in Example XIV in which the procedure for manufacture of a pasteurized porous mat of egg albumin solids is described. Conversely, this same rapidly sensitive and receptive property of the porous mat to external forces may be employed to advantage in retaining and preserving heat labile biologically active substances contained in said mat in substantially dry, stable form (as indicated above). Thus, when desired, porous mat products containing viable microorganisms, (such as yeast and bacteria), enzymes, co-enzymes, vitamins, pro-vitamins and other biologically active substances when dried in combination with other components of suitable composition, can be produced in dry, stable form with superior retention of their active properties when retention and stability are compared with that of dry products of similar composition in other known forms.

Another ancillary application derived as a result of the novel character of the porous mat products formed as described herein, relates to drying by sublimation commonly known as "freeze drying" and results in porous mat products in frozen form, and the dry products produced therefrom, by sublimation of the water contained therein employing either atmospheric or subatmospheric conditions. Exemplary products and procedures for their manufacture are described in Examples XXXII and XXXIII hereof.

Other applications and benefits attributable to the porous mat structure due to the accessibility of its large exposed and expanded surfaces and relatively small size of the individual particles of which it is formed, will be apparent to those skilled in and familiar with methods of applying physical forces and/or introducing other ancillary reactive or non-reactive substances. For example, a volatile flavor constituent can be introduced in combination with a gaseous transport medium and deposited within the mat by adsorption, absorption or fractional condensation on the surfaces thereof. Desorption of undesirable volatile substances other than water may also be achieved.

The following examples are illustrative of the invention:

EXAMPLE I

A yellow cake pre-mix was prepared and dried in accordance with the invention using the apparatus generally similar to that illustrated in FIGS. 5, 6 and 7. The mix consisted of 54 parts flour, 29 parts sucrose, 14 parts fat including both shortening and emulsifiers and 3% moisture by weight. The dry mix was added to water to produce a suspension consisting of 44.2% solids. Mixing was carried out in a high-speed mixer of the type known as an Oakes mixer and air was entrained in the feed stream at a pressure of 3800 psig. The resulting aerated mixture had a density of 0.85 gms/cc and when entrained air was removed from the mix, the density was 1.15 gms/cc. The viscosity of the aerated suspension at 125° F. was 1200 Cp. The resulting suspension was heated and fed at a pressure of 3500 psig to the spray nozzle at which point the temperature was 124° F. The dry bulk temperature of the drying gas, fed to the dryer was maintained between 315° F. and 325° F. and the wet bulb temperature was less than 110° F. The air exhausted through the duct 102 (FIG. 5) had a temperature between about 190° F. and 200° F. The air exhausted through the duct 102 had a dew point of about 94° F. The amount of entering air estimated at the inlet was about 2500 C.F.M. The foraminous collecting screen 84 had an area of 2 square feet and consisted of a woven stainless steel screen formed from 0.150 inch round wire of 10 mesh/inch. The distance of the screen from the nozzle was 9 feet 3 inches.

In the first run, a dry friable highly porous agglomerated mass was deposited on the collecting screen having a moisture content when removed of 2.3% moisture by weight. By comparison, the product collected from the interior wall of the dryer had a moisture content of 2.6% by weight. All percentages given below will be represented in parts by weight.

A second run was conducted at a somewhat reduced exit temperature. In this run, a product was obtained on the collecting screen having a moisture content of 3.6%. The material collected on the wall of the dryer had a moisture content of 4.2%.

In the third run, a product was obtained on the screen having a moisture content of 1.4%. The corresponding product obtained on the interior wall of the dryer had a moisture content of 3.6%. In each of these three runs the product obtained on the screen was highly porous, foraminous and friable agglomerate or mat consisting of a multiplicity of microscopic spheroidal particles bonded together at their points of contact and having a multiplicity of interconnecting passages extending therethrough from the free surface thereof up to the screen and communicating through the screen with the portion of the dryer in the opposite side of the screen. The product was dry to the touch and could readily be either broken or otherwise subdivided into pieces of the required size or reduced to a fine powder as required.

EXAMPLE II

Figure 15:
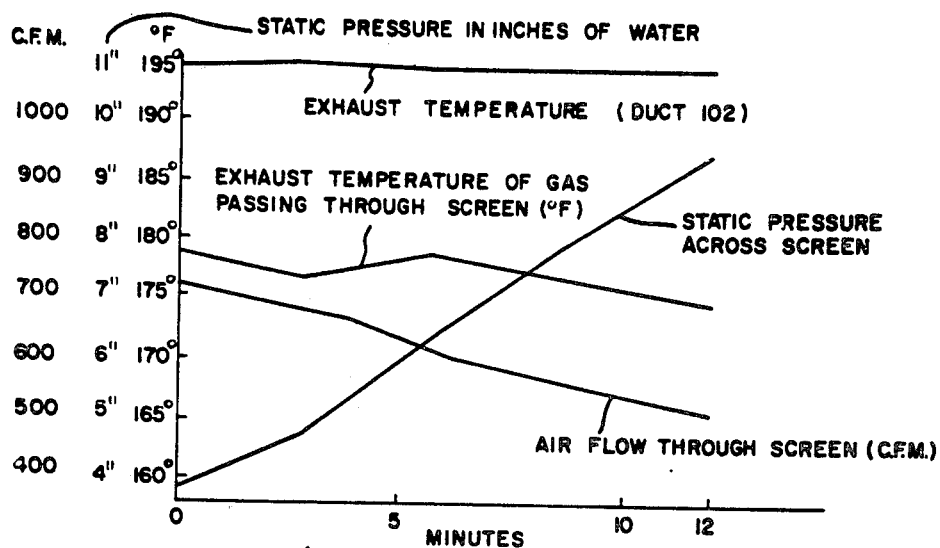
FIG. 15 is a graph illustrating the changes in processing conditions in connection with Example II.

A cake mix having the composition described in Example I was dried in the same manner described therein except that the screen was coated with a preliminary layer of dried cake mix particles to a thickness of ¾ inch by reducing the air flow through the screen. Following the deposition of the pre-coating layer virtually no particulate material passed through the screen. Changes in the operating conditions which occurred during the formation of the foraminous agglomerate on the screen are represented graphically in FIG. 15. The run lasted for 12 minutes. The density of the product obtained from the screen was 0.19 gms/cc and the moisture content was 1.6%. By way of comparison, the density of the material obtained from the walls of the dryer was 0.26 gms/cc and had a moisture content of 2.4%. During the 12-minute run, it will be seen that while the exhaust temperature of the gas expelled through the duct 102 remained relatively high at approximately 193° F., the temperature of the gas passing through the screen and through the dried product remained at a much lower level and had a tendency to drop during the drying operation. This indicates the effectiveness of the invention in removing moisture from the material as it is collected and in lowering the temperature to which the dried particles are exposed thereby helping to prevent heat damage. The graph also shows that although there is a noticeable rise in the static pressure across the screen during operation as the mat continues to increase in thickness, there is nevertheless a relatively free passage of gas through the screen in the last stages of the run, in this case the rate being 550 C.F.M.

EXAMPLE III

Figure 16:
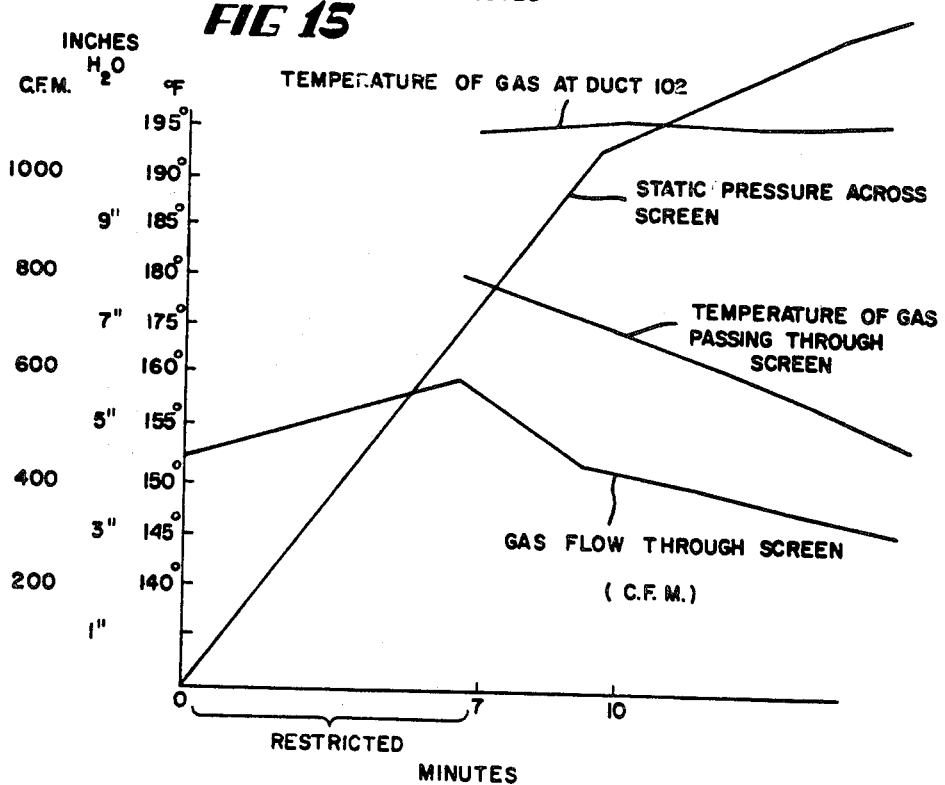
FIG. 16 is a graph illustrating changes in processing conditions in connection with Example III.
Figure 12:
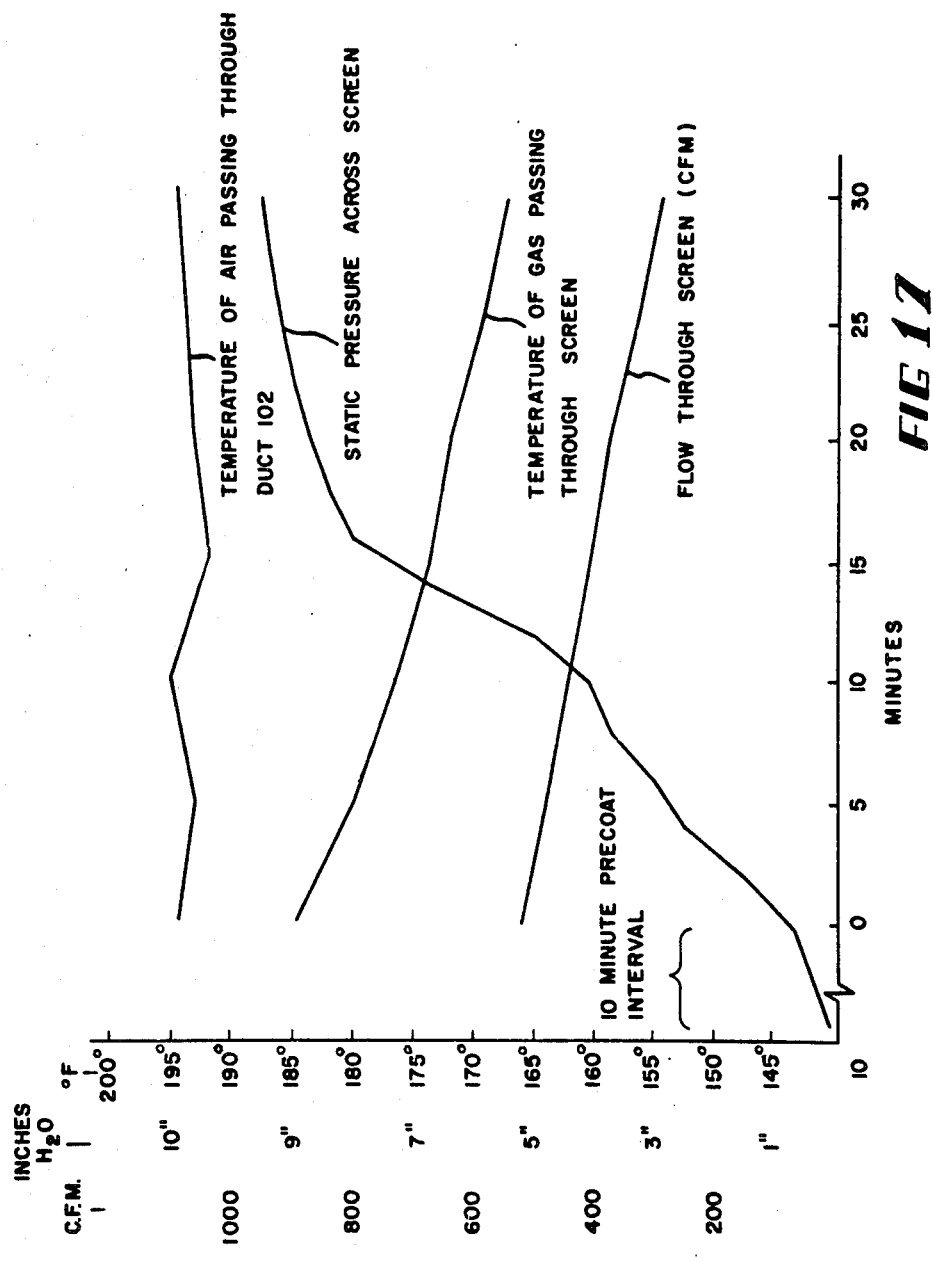

Another run was conducted with the cake mix product in the manner described in Example I, except that the initial velocity of the gas passing through the screen was reduced somewhat. The product obtained on the screen had a density of 0.20 gms/cc. The product obtained from the wall of the dryer on the other hand had a density of 0.26 gms/cc. The change in operating conditions which took place during the run are illustrated graphically in FIG. 16. During the initial start-up period of 7 minutes, the flow through the screen was reduced by partially closing the valve 106. During this initial 7-minute period, the flow through the screen increased from about 550 to about 600 cubic feet per minute. The effectiveness of the invention for removing moisture from the deposited material can be seen by referring to the temperature of the gas passing through the screen which dropped during operation from about 178° F. to about 152° F. at the end of the run. On the other hand, the outlet temperature of the gas passing through the duct 102 increased during operation from about 192° F. to about 194° F. At the end of the run, the flow through the screen was adequate (about 300 C.F.M.).

EXAMPLE IV

Another run was conducted in the manner set forth in Example I with the same cake mix composition. In this run, a 10-minute pre-coating operation was performed in which a coating layer was formed on the screen having a predetermined thickness of from about ⅛ inch to about ¼ inch. The changes in operating conditions taking place in the course of the run can be clearly seen by reference to FIG. 17. During this run, the gas inlet temperature passing through duct 62 was about 320° F. At duct 102 it was about 195° F. The product obtained from the wall of the dryer had a moisture content of 3.3% while the product obtained on the screen had a moisture content of 1.5% thus demonstrating the effectiveness of the invention for obtaining relatively low moisture levels.

EXAMPLE V

Another run was conducted as set forth in Example I with the same cake mix composition except that no air was allowed to pass through the foraminous collecting screen by placing a metal plate adjacent to and abutting the downstream surface of the screen. A coating of material was thus built on the screen which had no air flowing through it. During this run, the moisture content of the material collected on the walls of the dryer was 1.8% whereas the moisture content of the material collected on the sealed screen was 2.9%. It can, therefore, be seen that while the moisture content of the material collected on the screen is almost twice the moisture content of the material collected on the walls of the dryer, by comparison with Example IV, it will be seen that the moisture content of the material on the screen will be substantially less rather than greater than the moisture content of the material allowed to collect on the walls of the apparatus when gas is allowed to pass through the agglomerate. This demonstrates the efficiency with which the invention is capable of drying materials.

EXAMPLE VI

A flour-water slurry was dried in generally the same manner set forth in Example I, except that flour was employed in place of the cake mix composition disclosed. In this instance, the air inlet temperature was 325° F. The temperature of the air exhausted through duct 102 was approximately 185° F. In the course of the operation, a highly porous friable agglomerate was collected upon the foraminous screen. The moisture content of the agglomerate was 5.6%. By comparison, the material which had collected upon the walls of the dryer was 11.2%.

In a second run with the inlet air temperature changed to 330° F. and the temperature of the drying gas passing through duct 102 at 155° F., the resulting agglomerate collected upon the screen was 6.3%. By comparison, the material which collected upon the interior walls of the dryer was 29.7%.

EXAMPLE VII

A slurry was made from a mixture consisting of 40% non-fat dry milk solids and 60% water. The resulting mixture was sprayed into the dryer in the manner described in connection with Example I, with the temperature of the air leaving the dryer through duct 102 on the order of about 150° F. A dry, porous agglomerate having a friable character including a multiplicity of microscopic pores extending between the adhered particles was collected upon the foraminous screen. The resulting agglomerate had a moisture content of 5.7%. The material collected upon the walls of the dryer itself had a moisture content of 7.3%.

A second run was conducted with the same material but at a solids content of 50% by weight. In this instance, the air passing through the duct 102 was at a temperature of about 153° F. The moisture content of the material collected upon the screen was 4.4%. The moisture content of the material collected on the wall of the dryer was 7.5%. Solubility indices determined conventionally for concentrated skim milk used to produce the sample and on the dried sample indicated that solubility of the dried sample from the screen was not impaired.

EXAMPLE VIII

A supersaturated solution of lactose was prepared with a small portion of the lactose present in a crystalline form in the slurry. The saturated solution was passed through the spray nozzle into the dryer in the general manner described in Example I, except that the inlet air was controlled to maintain the air passing out through the duct 102 at a temperature of 130° F. A highly porous, friable agglomerate was collected upon the screen having a moisture content of 4.2%. The moisture content of the material collected upon the walls of the dryer was 3.6%.

In a second run, a dilute solution of lactose was sprayed into the drying chamber in the manner described in connection with FIG. 1, with the drying air maintained at a temperature sufficient to hold the air passing through the duct 102 at 190° F. The resulting porous agglomerate collected upon the screen had a moisture content of 1.2%. The moisture content of the material collected upon the wall of the dryer was 1.4%. The higher moisture content of the product collected in the first run is believed to indicate the presence of lactose in the monohydrate form in which a mole of water is present for each mole of lactose. The fact that the moisture content of the product obtained in the second run was less than that collected on the wall of the dryer is believed to indicate the presence of lactose in the amorphous form. The results obtained in these two runs indicate the effectiveness of the invention for controlling the characteristics of the end product and the ability of the invention to produce either amorphous lactose or lactose in the monohydrate form by varying process conditions.

EXAMPLE IX

A dried whey product was mixed with water to form a slurry having a moisture content of 50% by weight. This material was sprayed as described in Example I using a fine spray nozzle. The temperature of the air passing through duct 102 was held at about 150° F. The resulting agglomerate collected upon the screen had a moisture content of 3.0% by weight. The material collected on the wall of the dryer had a moisture content of 3.7%. The moisture content of the dry product which passed through duct 102 was 3.3%.

Another run was conducted using a spray head adapted to produce a coarse spray. The temperature of the outlet gas was held below 150° F. The resulting agglomerate collected upon the screen had a moisture content of 5.9% and the material on the walls of the dryer had a moisture content of 18.0%.

EXAMPLE X

Sodium caseinate was made up into a solution having a solids content of 20%. The material was sprayed into the dryer in the manner described in Example I with the temperature of the drying gas passing through duct 102 held at around 160° F. A coarse spray nozzle was used. The resulting agglomerate collected upon the screen had a moisture content of 5.2%. The product obtained on the walls had a moisture content of 20.0%. The product passing through duct 102 had a moisture content of 8.8%. The products obtained from the screen in Examples IX and X could be crushed to form a free-flowing powder after cooling whereas the product on the walls was in the form of a homogenous paste or film.

EXAMPLE XI

Three parts of a shortening were mixed with eight parts water and one part non-fat milk solids to form a slurry composed of 33% solids by weight and introduced into the dryer in the manner described in Example I with the air passing through the duct 102 maintained at 160° F. The resulting spray dried agglomerate collected upon the screen of the dryer had a moisture content of 0.50%. By comparison, the agglomerate collected upon the walls of the dryer had a moisture content of 1.20%.

EXAMPLE XII

Figure 2:
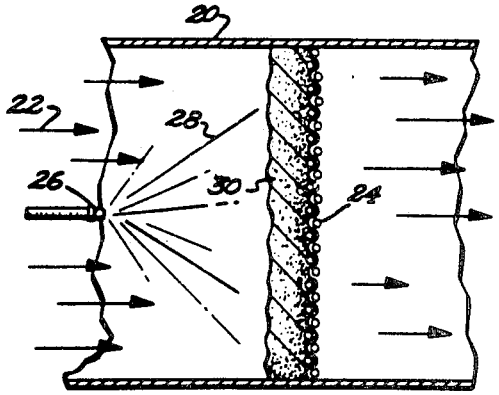
FIG. 2 is a diagram illustrating the method employed in accordance with one embodiment of the invention.
Figure 3:
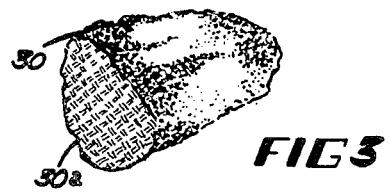
FIG. 3 is a drawing illustrating the appearance of a piece of spray dried material after being removed from the screen of FIG. 2.
Figure 4:
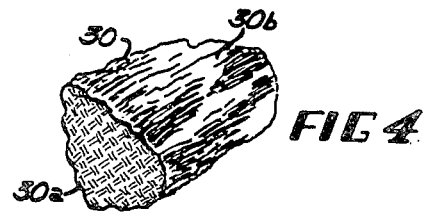
FIG. 4 is a perspective view showing the appearance of another type of spray dried material after being removed from the screen of FIG. 2.

For comparative purposes mat products were prepared at low and high rates of deposition on the collecting conveyor screen from skim milk. Concentrated skim milk at a solid level of 45% was atomized in both tests through 4 Spraying Systems Company Type SBCTC Size No. 5 high pressure nozzles at the top of a drying chamber 2 meters square and 5 meters high as illustrated in FIG. 2. The spray was atomized into the drying chamber at an air flow rate of 158 cubic meters per minute at 205°–210° C. Atomized droplets traveled vertically for about 5 meters at 0.8 meters per second for a period of 6 to 8 seconds at which point the particles were deposited upon the collecting conveyor screen. The conveyor collecting screen consisted of hinged 20 gauge stainless steel plates perforated with 9/64" (0.36 cm) dia. holes on 3/16" (0.476 cm) centers which provided 51% open area for passage of gas therethrough. A galvanized 18 mesh wire screen with individual wires having a diameter of 0.254 cm and an average opening measuring 0.1143 cm×0.1143 cm providing 64% opening was super-imposed on top of the stainless steel plates. The second stage drying chamber to which both mat products were subjected was 1.3 meters long. Operating conditions for preparing the mat products are as follows:

TABLE I

| | Test No. 1 High Feed Rate | Test No. 2 Low Feed Rate |
|---|---|---|
| Air Supplied 1st Stage (Spray Chamber) | 158 m³/minute | 158 m³/minute |
| Temperature - Inlet | 205–210° C. | 205–210° C. |
| Temperature - Outlet | 60° C. | 74° C. |

TABLE I-continued

|  | Test No. 1 High Feed Rate | Test No. 2 Low Feed Rate |
| --- | --- | --- |
| Relative Humidity - Outlet | 50% | 25% |
| Nozzle Pressure | 155 kg/cm$^2$ | 105 kg/cm$^2$ |
| Approximate Average Mat Thickness Leaving 1st Stage | 6.35 cm | 6.35 cm |
| Pressure Drop Across Mat, cm of Water | 5.10 cm | 11.6 cm |
| Conveyor Rate - cm per min. | 8–10 | 8–10 |
| Air Supplied 2nd Stage (fixed mat) | 45 m$^3$/minute | 45 m$^3$/minute |
| Temperature | 66° C. | 66° C. |
| Estimated Evaporation Rate (based on feed rate) | 308 kg/hour | 256 kg/hour |

As indicated above, the resultant mat product prepared under the high feed rate conditions was considerably thicker than the mat prepared under low feed rate conditions (i.e., 6.35 cm vs. 3.81). Even though the mat product prepared via high feed rate conditions was 67% thicker than the low feed rate mat products, its resistance to the flow of gas therethrough, as evidenced by the pressure drop readings across the mat (in cm of water), clearly indicates higher permeability than the low feed rate product. Due to the enhanced permeability character of the mat deposited at the high feed rate, it exhibited a significantly greater evaporation rate than the mat prepared under low feed rate conditions.

Table II sets forth comparative analytical data between the mat products deposited upon the conveyor at high and low feed rates. The dispersibility data for the mat products were obtained by first grating the mat products through a 20 mesh screen (U.S. Standard Sieve Size or of 840 micron size). Dispersibility for the resultant grated particles were determined pursuant to Bulletin 916, revised copyright 1965, entitled "The Standards for Grades of Dry Milk Including Methods of Analysis" by the American Dry Milk Institute, Inc., 130 North Franklin Street, Chicago, Illinois 60606, as disclosed on pages 31–33 inclusive. Solubility index values were determined per the above Bulletin 916 as disclosed in pages 26 and 27 with the percent moisture also being determined pursuant to the toluene distillation method as disclosed in the same publication. Bulk densities in grams per cubic centimeters were determined by placing a sufficient amount of sifted particles to fill a 250 milliliter graduated cylinder to a volume of 200 milliliters. Loose bulk densities were determined by ascertaining the weight of the particles on a 200 milliliter basis (i.e., weight in grams divided by 200 cubic centimeters equals bulk density). Packed bulk densities were obtained by repeatedly dropping the graduated cylinder previously filled to a 200 milliliter volume from a height of ⅛ inch upon a hard surface until a constant volume reading was obtained (i.e., until no further decrease in volume occurs by additional free falls or dropping of the cylinder). Average particle density (grams/cubic centimeter) represents the average particle weight in relation to the volume of the particles. Thus, more porous particles provide a lesser particle density than particles of a lesser porosity. Average particle density of tested material as referred to herein was ascertained by a Beckman Model No. 930 air comparison pycnometer. Employing the air comparison pycnometer, average particle density is ascertained by the equation:

Average particle density (grams/cubic centimeter) =

$$\frac{\text{Sample weight in grams}}{\text{Instrument reading in cubic centimeters}}$$

It was observed that the mat particles initially deposited upon the screen conveyor at a high rate had a moisture level of about 14% whereas the low feed rate of the particles were initially deposited at an average moisture content of about 8.3. Mat products issuing from the spray dried chamber into the second stage dryer at a high rate was about 6.8% water with the corresponding low feed rate mat product having a moisture content of about 5.4%. Unexpectedly, it was discovered that the skim mat product produced under high feed rate conditions recovered after the second stage drying step (notwithstanding a deposition at a higher moisture level) exhibited a significantly lower final moisture level (3.8%) than that deposited at a low feed rate (4.4%).

TABLE II

ANALYTICAL RESULTS

| Sample Identification | % Moisture | Solubility Index ml Sediment/10 grams | Dispersibility | Bulk Density Loose | Bulk Density Packed | Average Particle Density |
| --- | --- | --- | --- | --- | --- | --- |
| High Feed Rate Issuing From Spray Chamber | 8.0 |  |  | 0.35 | 0.43 | 1.29 |
| High Feed Rate Issuing From Second Stage | 3.8 | 0.50 | 50.7 | 0.35 | 0.54 | 1.27 |
| Low Feed Rate Issuing From Spray Chamber | 5.4 |  |  | 0.50 | 0.60 | 1.25 |
| Low Feed Rate Issuing From Second Stage | 4.4 | 0.40 | 40.3 | 0.50 | 0.62 | 1.22 |

Employing the apparatus for ascertaining the resistance to flow of gas hereinbefore described, the flow resistance for the mat products prepared under high and low feed rate conditions were determined. Sample cores for test purposes were obtained from intact mat product chunks.

In Table III the resultant data are shown for Hoke valve settings of 1.0, 2.0, 3.0, 4.0 and 5.0 for acceptable intact core samples on both high and low feed rate mat products and particles obtained by sifting the high feed rate mat product through a 20-mesh (i.e., 840 micron size) sieve. Test numbers 1 and 2 represent the test results for intact sample cores of the resultant mat product obtained after issuance from the second stage drying chamber. Test numbers 4 and 5 show measurements for sample cores on mat samples obtained after issuance from the second stage drying chamber produced under low feed rate conditions. Test number 3 represents data on a 16.32 gram test sample of particles obtained by sifting the high feed rate mat product chunk through a 20-mesh sieve.

The lower surfaces for the mat products prepared under both the high and low feed rates (i.e., the portion resting upon the conveyor screen) were relatively flat. The upper surfaces of both mat products however were relatively uneven and had to be squared off with a spatula before sample cores were cut from the intact mat product chunks. Intact sample cores for test numbers 1, 2, 4 and 5 were obtained by forcing the chamfered cutting edge of the sample tube of the air permeability cell through the mat products in a direction parallel to the influent gas flow channels of the mat (i.e., cores were cut perpendicular to the lower surface thereof).

Only those intact core samples which were tightly sealed against the sample tube wall, free from fractures and fissures were accepted for test purposes. Acceptability of samples was determined by passing a beam of light through the core samples and visually observing whether or not the sample cores were tightly sealed resistance to the flow of air therethrough, largely due to a mesh screen placed upon the perforated screen support, the actual pressure drop readings (for tests number 1–5) were corrected for the 1.0, 2.0, 3.0, 4.0 and 5.0 Hoke valve settings respectively by a factor of 0.03, 0.04, 0.08, 0.11 and 0.14 inches of water. Prior to testing test sample no. 3, the initial sample depth was 1.62 inches. After completion of the test sample on number 3, it had been found that the sample compacted to a sample depth of 1.59 inches. The average sample depth between initial test sample depth and after completion of the test was therefore ascertained as 1.605.

TABLE III

| | High Feed Intact Samples | | | | | | Sifted High Feed Test #3 Sifted Loose Mat Products 93, 1 | | | Low Feed Intact Samples | | | | | |
|---|---|---|---|---|---|---|---|---|---|---|---|---|---|---|---|
| | Test #1 Intact Core Sample #1 92, 1 | | | Test #2 Intact Core Sample #1 92, 2 | | | | | | Test #4 Intact Core Sample #1 94, 1 | | | Test #5 Intact Core Sample #1 94, 2 | | |
| Hoke Valve Setting | Absolute Pressure (in. Hg) | Pressure Drop (in. H₂O) | Time for 1 cu ft gas (sec.) | Absolute Pressure (in. Hg) | Pressure Drop (in. H₂O) | Time for 1 cu ft gas (sec.) | Absolute Pressure (in. Hg) | Pressure Drop (in. H₂O) | Time for 1 cu ft gas (sec.) | Absolute Pressure (in. Hg) | Pressure Drop (in. H₂O) | Time for 1 cu ft gas (sec.) | Absolute Pressure (in. Hg) | Pressure Drop (in. H₂O) | Time for 1 cu ft gas (sec.) |
| 1.0 | 29.28 | 1.22 | 352.6 | 29.20 | 1.00 | 352.2 | 29.05 | 3.18 | 354.4 | 29.09 | 2.50 | 353.3 | 28.96 | 4.05 | 353.3 |
| 2.0 | 29.09 | 2.16 | 202.0 | 29.10 | 1.73 | 201.3 | 28.86 | 5.76 | 201.2 | 28.87 | 5.08 | 201.6 | 28.62 | 7.10 | 201.6 |
| 3.0 | 28.98 | 3.32 | 141.6 | 29.00 | 2.92 | 141.0 | 28.62 | 8.42 | 141.6 | 28.67 | 7.82 | 142.0 | 28.48 | 10.40 | 142.0 |
| 4.0 | 28.88 | 4.67 | 109.6 | 28.90 | 4.17 | 109.6 | 28.40 | 11.09 | 109.5 | 28.43 | 10.41 | 110.2 | 28.20 | 13.49 | 110.2 |
| 5.0 | 28.70 | 6.18 | 90.0 | 28.78 | 5.26 | 89.4 | 28.16 | 13.83 | 89.8 | 28.20 | 12.84 | 90.0 | 27.95 | 16.76 | 90.0 | against the sample tube wall and the cores were free from fractures and fissures.

The sample tube containing an acceptable intact sample core was then inserted and secured to the base assembly of the air permeability cell. Depth of the sample core was measured directly from the piston assembly to the nearest 0.01 inch. After the sample depth was determined, the piston assembly was removed from the air permeability cell, thereby permitting the flow of atmospheric air through the sample during testing. For test purposes herein the actual gas flow rate was determined by means of the gas meter readings and a stopwatch. An oil manometer was used to read the pressure drop in inches of water. For each core sample tested the pressure drop was read at several different flow rates. After obtaining a sufficient number of drop readings at different flow rates to enable determination of the flow resistance valves for each sample core, the sample cores were removed from the sample tube and weighed.

Sample depth as ascertained by the calibrated piston assembly, sample weight and bulk density for tests number 1–5 are as follows:

| | Test No. 1 | Test No. 2 | Test No. 3 | Test No. 4 | Test No. 5 |
|---|---|---|---|---|---|
| Sample depth (inches) | 2.27 | 2.28 | 1.605 | 1.30 | 1.10 |
| Sample weight (grams) | 15.97 | 16.86 | 16.32 | 12.61 | 12.66 |
| Sample bulk density (gms/cc) | 0.282 | 0.297 | 0.410 | 0.390 | 0.463 |

Table III sets forth absolute pressure in inches of mercury, the pressure drop in inches of water and the time in seconds for one cubic foot of air to pass through the test sample at the indicated Hoke needle valve settings. Since the air permeability cell had an internal Table IV reports the test results for particles obtained by sifting both the high and low feed rate mat products through a 20-mesh sieve. As indicated above the test sample particles used in test number 3 were obtained by sifting the high feed rate mat product through a 20-mesh sieve and placing 16.32 grams of the resultant particles without compaction in the air permeability cell for test purposes. By means of the piston assembly, the 1632 gram sample contained within the air permeability cell for test number 3 was compacted for test number 6 to a sample depth of 1.36 and further compacted in test 7 to a depth of 1.21 inches. In test number 6 the sample after completion of the test had a sample depth of 1.34 inches (i.e., sample depth was deemed as 1.35 inches). After completion of the test on sample number 7 the sample expanded to a depth of 1.22 inches; thus, for test purposes the depth was considered to be 1.215 inches.

Tests numbers 8, 9 and 10 represent the results for particles obtained by sifting low feed mat product through a 20-mesh sieve. In test number 8, 11.94 grams of the low feed rate sifted particles were placed in the air permeability cell without compaction. Tests number 9 and 10 represent progressively further compaction of 11.94 grams of sifted particles employed in test number 8. Corrected sample depth after completion of the test for test number 8 was 0.875 inches and the corrected bulk density was 0.547. Corrected depths for tests number 9 and 10 were respectively 0.78 inches and 0.23 inches.

Table IV reports the results for tests number 6–10 as to absolute pressure in inches of mercury, pressure drop in inches of water and the time in seconds for one cubic foot of air to pass through the test sample. In Table IV the pressure drop values have been corrected to reflect the internal resistance to air flow of the air permeability cell per se at the indicated Hoke valve settings.

TABLE IV

| | Sifted High Feed | | | | | | Sifted Low Feed | | | | | | | | |
|---|---|---|---|---|---|---|---|---|---|---|---|---|---|---|---|
| | Test #6 93, 2 | | | Test #7 93, 3 | | | Test #8 96, 1 | | | Test #9 96, 2 | | | Test #10 96, 3 | | |
| Hoke Valve Setting | Absolute Pressure | Pressure Drop | Time for 1 cu ft gas (sec.) | Absolute Pressure | Pressure Drop | Time for 1 cu ft gas (sec.) | Absolute Pressure | Pressure Drop | Time for 1 cu ft gas (sec.) | Absolute Pressure | Pressure Drop | Time for 1 cu ft gas (sec.) | Absolute Pressure | Pressure Drop | Time for 1 cu ft gas (sec.) |
| 0.5 | 28.95 | 4.34 | 475.8 | 28.76 | 6.77 | | 29.00 | 3.67 | 486.0 | 28.85 | 5.79 | | 28.73 | 6.98 | |
| 1.0 | 28.87 | 5.80 | 354.4 | 28.60 | 9.18 | | 28.88 | 5.43 | 354.0 | 28.70 | 8.05 | | 28.60 | 9.20 | |
| 1.5 | 28.68 | 8.27 | 249.1 | 28.36 | 12.89 | | 28.70 | 7.71 | 247.9 | 28.42 | 11.57 | | 28.20 | 14.52 | |
| 2.0 | 28.51 | 10.24 | 201.2 | 28.08 | 15.96 | | 28.58 | 9.48 | 202.6 | 28.26 | 14.06 | | 27.96 | 17.58 | |
| 2.5 | 28.35 | 12.46 | 165.8 | 27.81 | 19.44 | | 28.40 | 11.57 | 164.7 | 28.02 | 17.22 | | 27.69 | 21.60 | |

With the data given in Tables III and IV, the first step in data reduction is to compute the airflow resistance at the designated Hoke value settings. The airflow resistance for the designated Hoke settings and data set forth in Tables III and IV may be determined by the following equation:

$$\Delta p / uL$$

wherein $\Delta p$ is the pressure drop (dynes/cm$^2$) across the test sample, L is the sample depth in cm, and u is the approach velocity of air upon the test sample in cm/sec. The airflow resistance thus determined for samples 1–10 are set forth in Tables V and VI.

| Test number | I Value |
|---|---|
| 1 | 53.6 |
| 2 | 39.7 |
| 3 | 232.0 |
| 4 | 225.0 |
| 5 | 435.0 |
| 6 | 517.0 |
| 7 | 898.0 |
| 8 | 710.0 |
| 9 | 1236.0 |
| 10 | 1521.0 |

A meaningful comparison between the intact core

TABLE V

| Hoke Valve Setting | Intact High Feed | | Sifted High Feed | | Intact Low feed | | | | | |
|---|---|---|---|---|---|---|---|---|---|---|
| | Test #1 | | Test #2 | | Test #3 | | Test #4 | | Test #5 | |
| | u | $\Delta p/(uL)$ | u | $\Delta p/(uL)$ | u | $\Delta p/(uL)$ | u | $\Delta p/(uL)$ | u | $\Delta p/(uL)$ |
| 1.0 | 8.21 | 64.11 | 8.22 | 52.26 | 8.17 | 238.30 | 8.20 | 229.86 | 8.20 | 440.09 |
| 2.0 | 14.34 | 65.03 | 14.39 | 51.68 | 14.40 | 245.05 | 14.37 | 266.53 | 14.37 | 440.24 |
| 3.0 | 20.46 | 70.07 | 20.54 | 61.09 | 20.46 | 252.11 | 20.40 | 288.99 | 20.40 | 454.21 |
| 4.0 | 26.43 | 76.28 | 26.43 | 67.82 | 26.45 | 256.78 | 26.29 | 298.55 | 26.29 | 457.23 |
| 5.0 | 32.18 | 82.90 | 32.40 | 69.78 | 32.26 | 262.61 | 31.18 | 300.74 | 32.18 | 463.93 |

TABLE VI

| Hoke Valve Setting | Sifted High Feed | | | | Sifted Low Feed | | | | | |
|---|---|---|---|---|---|---|---|---|---|---|
| | Test #6 | | Test #7 | | Test #8 | | Test #9 | | Test #10 | |
| | u | $\Delta p/(uL)$ | u | $\Delta p/(uL)$ | u | $\Delta p/(uL)$ | u | $\Delta p/(uL)$ | u | $\Delta p/(uL)$ |
| 0.5 | 6.09 | 517.50 | 6.09 | 893.28 | 5.96 | 685.72 | 5.96 | 1200.53 | 5.96 | 1572.16 |
| 1.0 | 8.17 | 515.13 | 8.17 | 902.21 | 8.18 | 739.01 | 8.18 | 1236.05 | 8.18 | 1509.38 |
| 1.5 | 11.63 | 516.27 | 11.63 | 890.43 | 11.68 | 734.82 | 11.68 | 1244.08 | 11.68 | 1668.22 |
| 2.0 | 14.40 | 516.33 | 14.40 | 890.49 | 14.30 | 738.40 | 14.30 | 1235.55 | 14.30 | 1650.69 |
| 2.5 | 17.47 | 517.72 | 17.47 | 893.82 | 17.59 | 732.61 | 17.59 | 1230.16 | 17.59 | 1648.75 |

Given the values as set forth in Tables V and VI, the next step is to determine the theoretical air flow resistance for each test sample at a u value of 0 (i.e., when the approach velocity of the air is zero cm/sec.) The theoretical air flow resistance for each test sample at zero velocity were obtained by plotting for each test sample gas flow resistance (i.e., $\Delta p/uL$) against its corresponding u value as indicated in Tables V and VI (on standard linear graph paper). After the airflow resistance had been plotted against its corresponding u value per Tables V and VI for test samples 1–10, the resultant curves were extrapolated to a u value of zero. The intercept of the air flow resistance curves at a velocity of zero (i.e., u equals zero) represents the air flow resistance at zero velocity (i.e., its I value at zero velocity). The determined air flow resistance for test samples 1–10 at zero velocity thus determined were as follows:

samples as opposed to the particulate samples obtained from sifting the mat product through a 20-mesh sieve are obtained by calculating their respective resistance to flow of air at zero velocity (the above determined I values for test samples 1–10) on an equivalent void fraction basis. Thus, it is necessary to mathematically compute the sifted particles so that its void fraction will be the same as that of the intact core sample. Resistance to gas flow for both the intact core sample and sifted particulate samples are mathematically computed pursuant to the Kozeny-Carmen equation[1]:

$$\frac{\Delta p}{uL} = \eta k S_o^2 \frac{(1-\epsilon)^2}{\epsilon^3} \quad (1)$$

wherein $\Delta p$ is the pressure drop (dynes/cm$^2$), L is sample depth (in cm.), u is approach velocity (in cm/sec.) resistance, $\eta$ is the air viscosity, k is a constant, $S_o$ is the specific surface of the material (surface area per unit solid volume in $cm^2/cm^3$) and $\epsilon$ is the void fraction.

[1] see P. C. Carmen, *Flow of Gases Through Porous Media*, Academic Press Inc., New York, N.Y. 1956, pages 11, 12 and 13 wherein the basic equation is 1.44 but usually combined with 1.45 and 1.36 to give the above equation.

It is also apparent that the Kozeny-Carmen equation is applicable to the actual measured resistance to flow of air of the sample and is thus expressed as:

$$\left(\frac{\Delta p}{uL}\right)_m = \eta k S_o^2 \frac{(1-\epsilon_c)^2}{\epsilon_c^3} \quad (2)$$

wherein $(\Delta p/uL)_m$ represents measured air flow resistance at zero velocity and $\epsilon_c$ denotes the void fraction for the material tested.

The Kozeny-Carmen equation would also apply to sifted particles compacted to a void fraction equivalent to that of intact sample core. The particulate sample compacted to an equivalent void fraction may be expressed as:

$$\left(\frac{\Delta p}{uL}\right)_n = \eta k S_o^2 \frac{(1-\epsilon_i)^2}{\epsilon_i^3} \quad (3)$$

wherein $(\Delta p/uL)_n$ represents the theoretical flow resistance for the particulate sample packed to an equivalent void fraction and $\epsilon_i$ represents a void fraction equivalent to that of the intact core sample.

In taking the ratio of equation (3) to equation (2) $\eta k S_o^2$ cancel and the mathematical repacking equation may be expressed as:

$$\left(\frac{\Delta p}{uL}\right) / \left(\frac{\Delta p}{uL}\right)_m = \left(\frac{1-\epsilon_i}{1-\epsilon_c}\right)^2 \left(\frac{\epsilon_c}{\epsilon_i}\right)^3 \quad (4)$$

In applying the above-derived equation (4) to the air flow resistance of the intact core for test no. 2 at zero velocity and the particulate sample of test no. 3 at zero velocity, the void fraction for the sample test No. 3 may first be determined. The actual void fraction for test no. 3 may be determined as follows:

$$\epsilon_c = 1 - \frac{b_a}{P_a} \quad (5)$$

wherein $\epsilon_c$ represents the void fraction value for test No. 3, $b_a$ represents its bulk density in gm/cm and $P_a$ represents the average particle density in gm/cm as determined by the air comparison pycnometer. The $b_a$ (i.e., bulk density for test No. 3) was 0.410 gms/cc. and its $P_a$ value was 1.272. The $\epsilon_c$ value for the particulate sample tested in test No. 3 is therefore determined as follows:

$$\epsilon_c = 1 - \left(\frac{0.410}{1.272}\right) = 0.677$$

Similarly, the void fraction for test sample No. 2 may be calculated per the above equation (5). Based on a $P_a$ value 1.337 and a $b_a$ value of 0.297 the void fraction for the intact core sample is calculated as 0.777. Thus to calculate the theoretical air flow resistance for the particulate sample of test No. 3 on an equivalent void fraction basis of intact core sample of test no. 3 $\epsilon_i$ in equation (4) may be stated as 0.777.

The corrected I value for the particulate test No. 3 on an equivalent void fraction to that of intact core sample test No. 2 may then be obtained by substituting the above $\epsilon_i$ and $\epsilon_c$ values into equation (4). Since $(\Delta p/uL)_m$ has been determined to have a value of 232 for test No. 3 $\epsilon_c$ equals 0.677 and $\epsilon_i$ is 0.777. The air flow resistance at zero velocity for test No. 3 on an equivalent void fraction basis as Test No. 2 can be determined as follows:

$$\left(\frac{\Delta p}{uL}\right)_n / 232 = \left(\frac{1-0.777}{1-0.677}\right)^2 \left(\frac{0.677}{0.777}\right)^3$$

$$\left(\frac{\Delta p}{uL}\right)_n = 232 \left(\frac{0.223}{0.323}\right)^2 \left(\frac{0.677}{0.777}\right)^3$$

$$\left(\frac{\Delta p}{uL}\right)_n = 232 \, (0.3151)$$

$$\left(\frac{\Delta p}{uL}\right)_n = 73.10$$

Thus a theoretical particulated sample of test No. 3 having the same equivalent void fraction as the intact core sample of test No. 2 would have an air flow resistance at zero velocity of 73.10.

Table VII summarizes the comparative measurements and computations derived therefrom for test samples prepared under both high and low feed rates. In Table VII it will be observed that the test sample (from the high feed rate intact core sample) includes data on the density, percent void fraction, and actual calculated sample gas flow resistance at zero velocity (i.e. $I_m$). Similar data is given for the sifted, loose particles obtained from the high feed mat product (i.e. test No. 3) and compacted sample thereof (i.e. test No. 7). The last column under gas flow resistance in Table VII represents the computed gas flow resistance (i.e. $I_c$) at zero velocity of test No. 3 on a void fraction basis equivalent to that of Test No 2. In Table VII also corresponding data and computations are given for the product prepared under Low Feed Rate conditions.

TABLE VII

| | Density gm/cc | Void Fraction $\epsilon_c$[1] | Gas Flow Resistance $I_m$ | Gas Flow Resistance $I_c$ |
|---|---|---|---|---|
| High Feed Rate (Test Nos. 1, 2, 3 and 7) | | | | |
| Average Particle Density (3) | | | | |
| Intact | 1.337 | | | |
| Crushed | 1.272 | | | |
| Bulk Density (4) | | | | |
| Intact Core from Mat | 0.290 | 0.785 | 47 | |
| Sifted - Loose | 0.410 | 0.677 | 232 | 73.1 |
| Sifted - Packed | 0.539 | 0.577 | 898 | |
| Low Feed Rate (Test Nos. 4, 5, 8 and 9) | | | | |
| Average Particle Density | | | | |
| Intact | 1.259 | | | |
| Sifted | 1.222 | 0.553 | | |
| | | 0.496 | | |
| Bulk Density | | | | |
| Intact Core from Mat | 0.427 | | 336 | |
| Sifted - Loose | 0.547 | | 710 | 322 |

TABLE VII-continued

| | Density gm/cc | Void Fraction $\epsilon_c$[1] | Gas Flow Resistance | |
|---|---|---|---|---|
| | | | $I_m$ | $I_c$ |
| Sifted - Packed | 0.618 | | 1236 | |

EXAMPLE XIII

Dry Egg Albumin Solids

A dry porous mat product with rehydration properties superior to conventionally spray dried egg albumin solids was prepared by drying a slurry containing 12.5% egg white solids.

1. Slurry Composition

| Ingredients | % | Parts By Weight |
|---|---|---|
| Dry albumen with about <0.1% sodium lauryl sulfate added | 12.5 | 100 |
| Water | 87.5 | 700 |
| | 100.0 | 800 |

2. Process Conditions

Twenty-five percent of the total water at 70° F. was placed in a jacketed tank with sweep agitator and the egg solids added to form a smooth paste by slow agitation. The remaining 75% of water at 70° F. was added. The batch was then blended by circulating through a shear mixer until homogeneous. The batch was then transferred to a jacketed supply tank and held during drying at 70° F.

| Atomizing | |
|---|---|
| Aeration | None |
| Nozzles | Spraying System Inc. Type - SBC No. - 4 Size - No. 5 |
| Feed Pressure | 1200–1500 psig |
| Dryer | |
| Spray Chamber | |
| Air Inlet Temperature | 365° F. |
| Air Outlet Temperature | 125° F. |
| Air Flow CFM | 4900 |
| Second Stage Dryer | |
| Air Inlet Temperature | 140° F. |
| Air Outlet Temperature | 130° F. |
| Air Flow CFM | 1500 |
| Screen Conveyor Rate | 1.5 inches per minute |

1. Mat Character

| | As Deposited On Mat | Leaving Spray Chamber | Leaving Second Stage |
|---|---|---|---|
| A. At high feed rate (600 lbs per hr) | | | |
| Thickness of mat - in. | | 1.0 | |
| Pressure Drop Across Mat - in. of water | | 0.7 | |
| Sifted Product: | | | |
| Bulk densities - gms/cc | | | |
| Composite | | | 0.40 |
| Upper half | | | 0.38 |
| Lower half | | | 0.42 |
| Particle Density (air pycnometer) - gms/cc | | | 1.19 |
| % Moisture Composite | 23.5 | 16.8 | 3.6 |
| Upper half | | | 4.2 |
| Lower half | | | 3.3 |
| Sina $A_w$ (water activity)[1] value, composite) | | | 0.12 |
| % Moisture after 24 hrs at 60% R.H. | | | — |
| Intercept Value (flow resistance) | | | 280. |
| Void Fraction | | | 0.65 |
| Intact Mat: | | | |
| % Moisture, average | | | 3.6 |
| Bulk densities, average - gms/cc Upper half | | | 0.23 |
| Lower half | | | — |
| Particle density (air pycnometer) | | | 1.30 |
| Intercept value (flow resistance) | | | 36. |
| Void Fraction | | | 0.76 |
| B. At low feed rate (500 lbs per hr) | | | |
| Thickness of mat - in. | 0.6 | | |
| Pressure Drop Across Mat - in. of water | 2.5 | | |
| Sifted Product: | | | |
| Bulk density - gms/cc (average) | | | 0.49 |
| Particle density (air pycnometer) gms/cc | | | 1.30 |
| % Moisture | | | 6.8 |
| Sina $A_w$ (water activity value) | | | 0.30 |
| % Moisture after 24 hrs at 60% R.H. | | | — |
| Intercept Value (flow resistance) | | | 1600. |
| Void Fraction | | | 0.62 |
| Intact Mat: | | | |
| % Moisture, average | | | 6.8 |
| Bulk density, average gms/cc | | | 0.47 |
| Upper half | | | — |
| Lower half | | | — |
| Particle density (air pycnometer) | | | 1.30 |
| Intercept value (flow resistance) | | 670 | 400. |
| Void Fraction | | | 0.64 |

[1]Value for equilibrium % relative humidity/100 of sample as determined by use of a Sina-scope, Type SLT-B, with sensor range 0.02 to 0.20% relative humidity/100 ($A_w$), a moisture sensing device manufactured by Sina, AG, Zurich, Switzerland.

The dry porous mat egg product described above was produced in the same equipment and in a similar manner as employed in producing the "High Feed Rate" product described in Example XII Supra.

EXAMPLE XIV

Terminally Pasteurized Porous Mat Egg Product

Egg albumin is prepared and dried following the methods described in Example XIII except that prior to drying the prepared slurry was inoculated with a strain of *Escherichia coli* to determine if the porous mat product could be more effectively pasteurized by heat than other dry products of the same composition.

1. Slurry Composition

| Ingredients | % | Parts By Weight |
|---|---|---|
| Commercial Egg Albumin Solids | 14.3 | 100 |
| Water | 85.7 | 600 |

2. Process Conditions

A paste was made by combining in a 150 gallon kettle the egg albumin solids with 200 parts of the water after which the remaining 500 parts of water was added and the batch was circulated through a shear type mixer with agitation in kettle to mix the slurry to a smooth, homogeneous consistency which was held throughout at 80° F. ±5° F. The batch was then split into two equal portions. Both portions were dried as shown below using identical dryer operating procedures. However, one of the portions was inoculated with 90 cc of a virile culture of *Escherichia coli*. Samples of the feed slurry were taken before drying from each portion and examined for the presence of *Escherichia coli* and total microbial content. The counts were also determined for dry samples obtained after the first and second stages. The inoculated portion was subjected to additional heat treatment by passing hot humidifed air through the porous mat after drying.

| Atomizing Nozzles | Both portions Spraying Systems Inc. Type - SBC No. - 4 |
|---|---|
| | Size - No. 5 |
| Feed Pressure | 1100-1200 psi. |
| Slurry Feed Rate | 800 to 900 lbs. per hr. |
| Dryer Spray Chamber | |
| Air inlet temp. | 350-365° F. |
| Air outlet temp. | 120-125° F. |
| Air flow CFM | 4600-5000 |
| Second Stage Dryer | |
| Air inlet temp. | 145° F. |
| Air outlet temp. | 135° F. |
| Air flow CFM | 1800 |
| Mat temp. leaving | 120-125° F. |
| Screen conveyor rate | 1.2 inches per minute |
| Third Stage | heat pasteurizing innoculated portion only |
| Dryer | |
| Air inlet temp. | 240° F. |
| Air inlet relative humidity | 12% |
| Air outlet temp. | 225° F. |
| Air flow CFM | 1500 |
| Duration of Heating | 18 minutes |
| Conveyor rate in. per min. | 2.0 |
| Mat temp. entering | 120-125° F. |
| Mat temp. leaving | 220° F. |

3. Mat Character: Innoculated portion

| | Feed Slurry | Leaving Spray Chamber | Leaving Second Stage | Inoc. Position Leaving Third Stage |
|---|---|---|---|---|
| A. At feed rate of 900 lbs./hr. | | | | |
| Thickness of Mat | | 1.0" | 1.0" | 1.00 |
| Pressure Drop Across Mat in. of water | | 0.5-0.7 | | 0.7 |
| Sifted Product Bulk densities gms/cc Composite | | | 0.38 | 0.40 |
| Particle Density (air pycnometer) | | | 1.19 | |
| % Moisture Composite | | | 15.07 | 5.15 |
| Sina $A_w$ (water activity value, comp.) | | | 0.13 | |
| Intercept Value (flow resistance) | | | | |
| Void fraction | | | | 0.62 |
| Intact Mat | | | | |
| % Moisture, Avg. | | | | 5.15 |
| Bulk densities, avg. gms/cc | | | | 0.42 |

| | Feed Slurry | As Deposited On Mat | Leaving Spray Chamber | Leaving Second Stage | Inoc. Portion Leaving Third Stage (after heat treatment) |
|---|---|---|---|---|---|
| Particle density (air pycnometer) | | | | | 1.25 |
| Intercept value (flow resistance) | | | | | |
| Void fraction | | | | | |
| E. coli c/gram 230,000 | | | 9,300 | | <3 |
| Total plate count c/gram 500,000 | | | 62,000 | | <50 |
| Noninoculated portion control: | | | | | |
| B. At feed rate of 900 lbs/hr | | | | | |
| Thickness of mat (in.) | | | 2.7 | 2.7 | |
| Pressure drop across mat (in. of water) | | | 0.6 | 0.6 | |
| Sifted Product: Bulk density gms/cc avg. | | | 0.39 | 0.42 | |
| Particle density (air pycnometer) gms/cc | | | | 1.30 | |
| % Moisture | | 23.5 | 16.80 | 4.95 | |
| Sina $A_w$ (water activity value) | | | | 0.12 | |

| | | |
|---|---|---|
| Intercept value (flow resistance) | | 260. |
| % Void fraction | | .64 |
| Intact Mat: | | |
| % moisture, avg. | | 4.95 |
| Bulk density (air pycnometer) | | 1.33 |
| Intercept value (flow resistance) | 670 | 60. |
| % Void fraction | | 0.72 |
| E. coli c/gm | slurry 3 | 2300 |
| Total plant count c/gm | 7900 | 13000 |

EXAMPLE XV

Dry Shortening Emulsion Mat Product

A dry porous mat containing over 70% fat was produced in stable form. The mat product as well as granules resulting from crushing the mat were notably lacking in greasiness and possessed excellent wetting properties. When redispersed in an equal weight of water, the product formed a stable oil-in-water emulsion. 1. Slurry Composition

| Ingredients | % | Parts by Weight |
|---|---|---|
| Hydrogenated shortening with emulsifier and freshness preserver (melting point 90° F.) | 45.4 | 350 |
| Low heat nonfat dry milk (NDM) | 18.3 | 140 |
| Water added | 36.3 | 280 |
| | 100.0 | 770 |
| Slurry % dry products | 63.7 | |
| Slurry % solids by analysis | 58.7 | |

2. Process Conditions

To water at 150° F. in a 150 gallon jacketed kettle with sweep agitator the melted shortening was added and the mixture circulated through shear mixer, while adding the NDM. Mixing was continued (at 150° F.) until stable oil-in-water emulsion was formed (12–15 minutes) and the slurry was then transferred and held during test in dryer supply tank.

| | |
|---|---|
| Atomizing Aeration Nozzles | Spraying Systems Inc. Type - SBC No. - 2 Size - No. 10 |
| Feed Pressure | 1400–1500 psi |
| Slurry Feed Rate | 1000 pounds per hour |
| Dryer | |
| Spray Chamber | |
| Air Inlet Temperature | 360 = 5° F. |
| Air Outlet Temperature | 160 = 5° F. |
| Air Flow CFM | 5400 |
| Second Stage Drier | |
| Air Inlet Temperature | 85° F. |
| Air Outlet Temperature | 90° F. |
| Air Flow CFM | 1200 |
| Screen Conveyor Rate | 5.0 inches per minute |

3. Mat Character

| | As Deposited On Mat | Leaving Spray Chamber | Leaving Second Stage |
|---|---|---|---|
| A. At slurry feed rate of 1000 lbs per hour | | | |
| Thickness of Mat | 0–5.0" | 5.0" | 5.0" |
| Pressure Drop Across Mat | | 1.5" | — |
| Sifted Product | | | |
| Bulk Densities gms/cc | | | |
| Composite | | | 0.37 |
| Upper Half | | | 0.29 |
| Lower Half | | | 0.42 |
| Particle Density (air pycnometer) | | | 0.94 |
| % Moisture | | | |
| Composite | 3.2 | 0.80 | 0.65 |
| Upper Half | 4.0 | | 0.80 |
| Lower Half | 3.0 | | 0.60 |
| Sina $A_w$ (water activity value, comp.) | 0.74 | 0.17 | 0.15 |
| Intercept Value (flow resistance) | | | 185. |
| Void Fraction | | | 0.60 |
| Intact Mat | | | |
| % Moisture, Avg. | | | 0.65 |
| Bulk Densities, Average gms/cc | | | 0.30 |
| Particle Density (air pycnometer) | | | 0.92 |
| Intercept value (flow resistance) | | | 25. |
| Void Fraction | | | 0.67 |

EXAMPLE XVI

Tomato Paste Mat Product

1. Slurry Composition

A commercial grade, 34% solids, fine finish tomato paste prepared by a hot break process was diluted with water to provide a tomato paste slurry containing 80% water and 20% solids. Approximately 0.02 pounds sulfur dioxide per 1.0 pound of tomato solids was added to the batch in the supply tank prior to drying. Mat products were prepared under high and low feed rates from a non-aerated slurry under the following conditions: 2. Process Conditions

| | |
|---|---|
| 20% Solids Slurry Preparation | 140° F. water added to and mixed with paste in jacket kettle with agitation |
| Order of Mixing | Slurry transferred to dryer supply tank by "gear" pump after circulating through Oakes mixer to disperse. Sulfur dioxide was added by bubbling into slurry. Batch held at 130° F. during test. |
| Homogenization | None other than Oakes mixer |
| Atomizing Aeration | None |
| Nozzles | Spraying Systems, Inc. Type - SBC-TC No. - 2 |

-continued

| Feed Pressure | Size - 4 High Feed Rate | Low Feed Rate |
|---|---|---|
| | 2400 psi | 1900 |
| Dryer Spray Chamber | | |
| Air Inlet | 285° F. | 285° F. |
| Air Outlet | 145° F. | 160° F. |
| Air Flow | 5100 C.F.M. | 5100 C.F.M. |
| Second Stage Inlet Air | | |
| Temp. | 120° F. | 120° F. |
| Air Flow | 1600 C.F.M. | 1600 C.F.M. |
| Screen Conveyor Rate | 0.10 ft/min. | 0.10 ft/min. |

3. Mat Character At High Feed Rate

| | As Deposited On Mat | Leaving Spray Chamber | Leaving Secondary Chamber |
|---|---|---|---|
| Pressure Drop Across Mat, in. of water | | 1.00 | |
| Thickness, in. | | 1.25 | |
| Bulk Density (sifted), gms/cc | | | |
| Composite (loose) | | 0.51 | 0.51 |
| Upper Half of Mat | | | 0.47 |
| Lower Half of Mat | | | 0.52 |
| Particle Density, gms/cc, air pycnometer) | 1.42 | 1.43 | 1.41 |
| Sifted Composite % Moisture | 16.66 | 1.70 | 1.47 |
| Upper Third of Mat | | 2.52 | 1.97 |
| Center Third of Mat | | 1.86 | 1.46 |
| Lower Third of Mat | | 1.38 | 1.34 |
| Sina $A_w$ (water activity value) | 0.59 | 0.11 | 0.09 |
| % Moisture after 24 hrs at 60% R.H. | | | 16.71 |
| Bulk Density, Average | | | 0.32 |
| Mat - Upper Half | | | 0.31 |
| Mat - Lower Half | | | 0.36 |
| Particle Desity, air pycnometer | | | 1.51 |
| Intercept Value, flow resistance | | | 47.00 |
| 4. At Low Feed Rate | | | |
| Pressure Drop Across Mat, in. of water | | 2.50 | |
| Bulk Density (loose), average | | | 0.54 |
| Particle Density, air pycnometer | | 1.43 | 1.41 |
| Sifted Composite % Mositure | 12.52 | 3.09 | 3.01 |
| Sina $A_w$ | 0.47 | — | 0.12 |
| Intact Mat, % moisture, average | | | 3.01 |
| Bulk Density, average | | | 0.36 |
| Particle Density, air pycnometer | | | 1.47 |
| Intercept Value, flow resistance | | | 90.00 |

As indicated below the mat product prepared at high feed rate provided a more permeable mat product having an unexpectedly lower moisture content in its final mat form notwithstanding an initial deposition at a considerably higher moisture level.

| Mat | Low Feed Rate | High Feed Rate |
|---|---|---|
| Initial Deposition Moisture Level | 12.5% | 16.7% |
| At End of 1st Stage Drying (i.e. just prior to 2nd stage drying) | 3.1% | 1.7% |
| End 2nd Stage | 3.0% | 1.5% |

Both products had satisfactory color, viscosity and flavor. When reconstituted with water to provide a 32% solids paste or 6.5% single strength juice, comparatively the high feed rate mat product possessed superior rehydration characteristics.

EXAMPLE XVII

Artificial Milk Mat Product

A highly dissolvable and suitable mat product for a substitute for bitch's milk in feeding pups having the following characteristics was prepared, employing the equipment pursuant to Example XIV from an aqueous medium having the following composition under process conditions as set forth below:

1. Aqueous medium composition prior to drying

| Ingredients | Weight | |
|---|---|---|
| Non-fat milk solids | 70.00 | pounds |
| Dry cream powder | 3.00 | pounds |
| Casein | 20.00 | pounds |
| Whole egg solids | 17.00 | pounds |
| Shortening | 70.00 | pounds |
| Sucrose | 20.00 | pounds |
| Lecithin | 2.00 | pounds |
| Vitamin premix | | |
| $CaP_2O_5$ | 2.00 | pounds |
| Water | 300.00 | pounds |
| Stabilizer | 70 | grams |

2. Process Conditions

| Nozzle type | Spraying Systems Inc. nozzles type SX #67 orifice inserts #17 cores |
|---|---|
| No. of nozzles | 4 |
| Dryer inlet temperature | 400° F. |
| Dryer outlet temperature | 150° ± 5° F. |
| Aeration | none |
| Triplex pump pressure | 2000 psi. |
| Dryer slurry feed temperature | 120° F. |
| Screen conveyor speed | 3 in./min. |
| Secondary drying chamber | 1600 cubic feet of air per minute at 170° F. |
| Spray dryer chamber | 5550 cubic feet of air per min. |

3. Mat Character

| Thickness | 2¾ inches |
|---|---|
| Sifted density | loose - 0.335 gms/cc. packed - 0.451 gms/cc. |
| Moisture content | 2.4% by weight |
| Particle density (via air pycnometer) | 1.144 gm/cc. |

EXAMPLE XVIII

Dry Pineapple Solids

Two dry deliquescent porous mat products were prepared from concentrated pineapple juice (48.68% solids) obtained from fresh pineapples processed to reduce fiber size and content. In one test the feed to the drying system nozzles was without aeration. In the second test, compressed air was injected into the feed to provide an aerated spray.

1. Slurry Composition

| Ingredients | Percent | Parts by Weight |
|---|---|---|
| Pineapple Concentrate | | 100 |
| Water | 51.32 | |
| Solids | 48.68 | |
| bH 3.65 | | |

-continued

| Ingredients | Percent | Parts by Weight |
|---|---|---|
| Citric acid | 5.78% | |
| | 100.00 | 100 |

2. Process Conditions

The conditions in both tests were maintained as similar as possible except where noted. The material to be dried was split into 2 batches, each containing approximately 200 lbs. of liquid and 97 lbs. of pineapple solids. The material to be dried was stored in a supply tank at 125° F. ±5° F. and agitated by stirring with a propeller type mixer throughout the tests.

| | Non-Aerated | Aerated |
|---|---|---|
| Atomizing | | |
| Aeration | None | 2-3 SCFM |
| Nozzles - Spraying Systems Inc. | | |
| Type | SBCTC | SBCTC |
| No. | 2 | 2 |
| Size | No. 5 | No.5 |
| Feed pressure | 2200 psi | 2000 psi |
| Dryer | | |
| Spray chamber | | |
| Air inlet temperature | 295° F. | 285° F. |
| Air outlet temperature | 140° F. | 145° F. |
| Air flow CFM | 5500 | 5500 |
| Air inlet temp. (dehumidified) | 95° F. | 100° F. |
| Air 20% RH | — | — |
| Air flow CFM | 1600 | 1600 |
| Screen conveyor rate | 5.0 in./min. | 7.0 in./min. |

3. Mat Character

| | As deposited on mat | Leaving spray chamber | Leaving second stage |
|---|---|---|---|
| A. Non-Aerated Spray | | | |
| Thickness of Mat | 0.7–0.8 in. | — | |
| Pressure Drop Across Mat inches of water | 3.0–3.5 in. | — | |
| Sifted product | | | 0.28 |
| Bulk Densities gms/cc composite | | | |
| Particle Density (air pycnometer) | | | 0.73 |
| % moisture composite | | | 1.99 |
| Sina A$_w$ (water activity value, comp.) | | | 0.09 |
| % Moisture after 24 hr. at 60% RH | | | 23.70 |
| Intercept value (flow resistance) | | | 278.0 |
| Void fraction | | | 0.63 |
| Intact Mat | | | 2.00 |
| % Mositure, average | | | |
| Bulk Densities, average gms/cc | | | 0.22 |
| Particle Density (air pycnometer) | | | 0.69 |
| Intercept Value (flow resistance) | | | 78.0 |
| Void fraction | | | 0.74 |
| B. Aerated Spray | | | |
| Thickness of Mat inches | 1.0 | | |
| Pressure Drop Across Mat inches of water | 4.0 | | |
| Sifted product: | | | |
| Bulk density gms/cc (average) | 0.17 | | 0.21 |
| Particle density (air pycnometer) | | | 0.57 |
| % Mositure | | | 1.44 |
| Sina A$_w$ (water activity value) | | | 0.08 |
| % Mositure after 24 hrs. at 60% R.H. | | | 24.40 |
| Intercept Value (flow resistance) | | | 170.00 |
| Void fraction | | | 0.60 |
| Intact Mat | | | |
| % Moisture, average | | | 1.40 |
| Bulk density average gms/cc | | | 0.16 |
| Particle Density (air pycnometer) | | | 0.57 |
| Intercept Value (flow resistance) 670 | | | 47.0 |
| Void fraction | | | 0.73 |

EXAMPLE XIX

Dry Cottage Cheese Whey Solids (high lactic acid)

A deliquescent dry porous mat product was obtained from concentrated cottage cheese whey, pH 4.35. Composition of the material and procedure employed were as follows:

1. Slurry Composition

| Ingredients | % | Parts By Weight |
|---|---|---|
| Whey concentrate | | |
| Water | 52.7 | 52.7 |
| Whey solids containing | | |
| lactose | 32.2 | |
| Protein | 6.2 | |
| Minerals | 5.6 | |
| Acid (aslactic) | 3.3 | |
| | 100.0 | 47.3 (total solids) |
| | | 100.0 |

2. Process Conditions

Slurry Preparation: 18,000 lbs of cottage cheese whey at 0.47% lactic acid, was pasteurized, concentrated to 47.3% solids in a vacuum evaporator and cooled to 70° F. During drying the concentrated whey (2200 pounds) was held with agitation.
Homogenization: None
Atomizing
Aeration: 2-3 SCFM of air was injected into the nozzle feed supply line throughout the test.

| Nozzles: | Spraying Systems, Inc. |
|---|---|
| | Type - Whirljet |
| | No. - 1 |
| | Size - No. 2 |
| Feed Pressure | 700 psi |
| Dryer | |
| Spray Chamber | |
| Air Inlet Temperature | 350° F. |
| Air Outlet Temperature | 145° F. |
| Air Flow CFM | 5400 |
| Second Stage Dryer | |
| Air Inlet Temperature | 190° F. |
| Air Outlet Temperature | 160° F. |
| Air Flow CFM | 1600 |
| Screen Conveyor Rate | 2.5 inches per minute |

3. Mat Character

| | As deposited on Mat | Leaving Spray Chamber | Leaving Second Stage |
|---|---|---|---|
| Thickness of Mat | 3.0–4.0 in. | | |
| Pressure Drop Across Mat | 3.5–4.0 in H$_2$O | | |
| SIFTED PRODUCT | | | |

|  | As deposited on Mat | Leaving Spray Chamber | Leaving Second Stage |
|---|---|---|---|
| (5 I-5) |  |  |  |
| Bulk Densities gms/cc |  |  |  |
| Composite |  | 0.39 | 0.34 |
| Upper half |  | 0.34 | 0.31 |
| Lower half |  | 0.43 | 0.40 |
| Particle Density (air pycnometer) |  |  | 1.55 |
| % Moisture |  |  |  |
| Composite | 16.80 | 8.33 | 3.00 |
| Upper half |  | 10.50 | 4.00 |
| Lower half |  | 7.00 | 2.80 |
| Sina $A_w$ (water activity value, composite) |  |  | 0.12 |
| % Moisture after 24 hr. at 60% R.H. |  |  | 19.24 |
| Intercept value (flow resistance) |  |  | 133. |
| Void fraction |  |  | 0.74 |
| INTACT MAT |  |  |  |
| % Moisture, average |  |  | 3.00 |
| Bulk Densities, average gms/cc |  |  | 0.27 |
| Upper half |  |  | 0.26 |
| Lower half |  |  | 0.28 |
| Particle density (air pycnometer) |  |  | 1.61 |
| Intercept Value (flow resistance) |  |  | 17. |
| Void fraction |  |  | 0.83 |

EXAMPLE XX

Dry Sweet Whey Solids

A non-deliquescent dry whey mat product (suitable for comminuting to "instant" free-flowing granules) was produced from a concentrate of sweet cheddar cheese whey containing 50% whey solids employing material and processing conditions shown below:

1. Slurry Composition

|  | Ingredients | Parts by Weight |
|---|---|---|
| Cheese Whey Concentrate | % | 100 |
| Composition | 50.0 | 50 |
| Water |  |  |
| Whey Solids Containing Approximately: |  |  |
| Lactose | 37.4 |  |
| Protein | 7.0 |  |
| Minerals | 4.8 |  |
| Acid (aslactic) | 0.8 |  |
|  | 100.00 | 50 |

2. Process Conditions

Slurry Preparation: 20,000 lbs. of pasteurized low acid (0.15) cheddar cheese whey at 6.5% solids was concentrated in a vacuum evaporator by evaporating 17,400 lbs. of water, to a solids content of 50%. The concentrate was cooled to 90° F. and transferred to the dryer supply tank. Ten pounds of finely ground crystalline lactose (alpha monohydrate) was added as seed with mild agitation. The concentrate was held throughout the test at 90° F. ± 5° and stirred by mechanical means to keep crystals suspended.
Homogenization: None
Aeration: None
Nozzles: Spraying Systems, Inc. Same, both tests
Type - SBC-TC
No. - 2
Size - 10

| Feed Pressure: | High Rate | Low Rate |
|---|---|---|
|  | 1500 psi | 1000 psi |

|  | High Rate | Low Rate |
|---|---|---|
| Dryer: |  |  |
| Spray Chamber |  |  |
| Air inlet temp. | 340° F. | 340° F. |
| Air outlet temp. | 135° F. | 150° F. |
| Air Flow CFM | 5600 | 5600 |
| Second Stage Dryer |  |  |
| Air inlet temp. | 170° F. | 170° F. |
| Air outlet temp. | 135° F. | 144° F. |
| Air flow CFM | 1600 | 1600 |
| Screen Conveyor rate: | 4" per min. | 4" per min. |

3. Mat Character

|  | As deposited on mat | Leaving Spray Chamber | Leaving Second Stage |
|---|---|---|---|
| At high feed rate |  |  |  |
| Thickness of Mat |  | 5-6" |  |
| Pressure Drop Across Mat |  | 2.0" H$_2$O |  |
| Sifted Product: |  |  |  |
| Bulk densities gms/cc |  |  |  |
| Composite | 0.54 | 0.55 | 0.55 |
| Upper half |  |  | 0.53 |
| Lower half |  |  | 0.59 |
| Particle Density (air pycnometer) |  |  | 1.29 |
| % Moisture |  |  |  |
| Composite | 17.50 | 10.80 | 4.40 |
| Upper half |  | 12.20 | 5.20 |
| Lower half |  | 8.20 | 4.20 |
| Sina $A_w$ (water activity value, composite) | 0.79 | 0.68 | 0.18 |
| % Moisture after 24 hrs. at 60% R.H. |  | 12.26 | 13.10 |
| Intercept value (flow resistance) |  | 288.00 |  |
| Intact Mat: |  |  |  |
| % Moisture, average |  |  | 4.40 |
| Bulk Densities, average gms/cc |  |  | 0.38 |
| Upper half |  |  | 0.37 |
| Lower half |  |  | 0.39 |
| Particle density (air |  |  |  |

|  | As deposited on mat | Leaving Spray Chamber | Leaving Second Stage |
|---|---|---|---|
| -continued | | | |
| pycnometer) | | | 1.31 |
| Intercept Value (flow resistance) | | 36.70 | |
| At Low Feed Rate | | | |
| Thickness of Mat | | 2-3" | |
| Pressure Drop Across Mat | | 3.0" in $H_2O$ | |
| Sifted product: | | | |
| Bulk density gms/cc (average) | | | 0.47 |
| Particle density (air pycnometer) | | | 1.16 |
| % Moisture | 12.20 | 6.00 | 4.80 |
| Sina $A_w$ (water activity value) | 0.65 | 0.14 | 0.08 |

EXAMPLE XXI

Dry Polysaccharide Gum (hydrocolloid)

A fermentation medium containing a polysaccharide gum, "Polytran," was dried to produce a mat product with excellent permeability and superior rehydration and storage properties. The material was prepared in accordance with the teachings of Example I of U.S. Pat. No. 3,436,311 and can be identified by the description therein.

1. Slurry Composition

| Ingredients | % | Parts by Weight |
|---|---|---|
| Fermentation medium containing: | | 100.0 |
| Water | 96.0 | |
| Fermentation solids | 4.0 | |
| | 100.0 | 100.0 |
| NaOH to raise pH from 5.4 to 7.0 (50 gms) | | |

2. Process Conditions

Six hundred pounds of ferment at 4% solids were supplied at pH 5.4 after homogenizing and holding for 72 hours at 40° F. The batch was warmed to 110° F. and pH raised to 7.0 by addition of sodium hydroxide while circulating the material through a sheer mixer by means of a lobe pump. The batch was transferred to the dryer supply tank and stired with a propeller mixer during the test.

| Atomizing | |
|---|---|
| Aeration | None |
| Nozzles | Spraying Systems Inc. |
| | Type - SX |
| | No. - 1 |
| | Size - Orifice No. 60, Core No. 17 |
| Feed Pressure | 2400 psi |
| Dryer | |
| Spray Chamber | |
| Air Inlet Temperature | 290 ± 10° F. |
| Air Outlet Temperature | 145 ± 5° F. |
| Air Flow CFM | 5600 |
| Second Stage Dryer | |
| Air Inlet Temperature | 150° F. |
| Air Outlet Temperature | 145° F. |
| Air Flow CFM | 1200 |
| Screen Conveyor Rate | 2 inches per minute |

3. Mat Character:

| | | As Deposited On Mat | Leaving Spray Chamber | Leaving Second Stage |
|---|---|---|---|---|
| A. | At feed rate of 450 lbs/hr | | | |
| | Thickness of mat (in.) | | 1.0 | |
| | Pressure Drop across mat (in. of water) | | 0.2 | |
| | Sifted Product: | | | |
| | Bulk densities (gms/cc) | | | |
| | Composite | | | 0.27 |
| | Particle density (air pycnometer) | | | 0.42 |
| | % moisture Composite | | | 3.20 |
| | Upper half | | | 2.80 |
| | Lower half | | | 4.20 |
| | Sina $A_w$ (water activity value), Composite | | | 0.10 |
| | % moisture after 24 hrs of 60% R.H. | | | |
| | Intercept value (flow resistance) | | | 180. |
| | Void fraction | | | 0.60 |
| | Intact Mat: | | | |
| | % moisture, average | | | 3.20 |
| | Bulk densities, average (gms/cc) | | | 0.20 |
| | Particle density (air pycnometer) | | | 0.35 |
| | Intercept value (flow resistance) | | | 30. |
| | Void fraction | | | 0.76 |
| B. | At Low Feet Rate | | | |
| | Thickness of mat | | Could not form a mat | |
| | Pressure drop across mat | | Product sifted through screen and was lost up the stack. | |

4. A beta 1,3 polyglucose with appendant beta 1,6 glucopyranose groups and identified as "Polytran" was sold by The Pillsbury Company, 608 Second Avenue South, Minneapolis, Minn.

EXAMPLE XXII

Dry Household Detergent

A porous, dry mat product with excellent wettability and dissolving properties was produced as described below.

1. Slurry Composition

| Ingredients | % | Parts by Weight |
|---|---|---|
| Household detergent (Tide) Composition as described in U.S. Pat. No. 2,486,922 | 46 | 100 |
| Water (80° F.) | 54 | 120 |
| | 100 | 220 |

2. Process Conditions 220 lbs. of slurry were prepared for drying by adding 100 lbs. of "Tide" detergent to 220 lbs. of water at 80° F. using manual stirring to avoid excessive foaming prior to drying.

| Atomizing | |
|---|---|
| Aeration | None |
| Nozzles | Spraying Systems Inc. Type - SBC No. - 4 Size - No. 4 |
| Feed Pressure | 1000 psig |
| Dryer | |
| Spray Chamber | |
| Air inlet temperature | 435° F. |
| Air outlet temperature | 155° F. |
| Air flow CFM | 5500 |
| Second Stage Dryer | |
| Air inlet temperature | 155° F. |
| Air outlet temperature | 148° F. |
| Air flow CFM | 1600 |
| Screen Conveyor Rate | 5.0 inches per minute |

3. Mat Character:

| | As Deposited on Mat | Leaving Spray Chamber | Leaving Second Stage |
|---|---|---|---|
| A. At feed rate of 1100 lbs/hr. | | | |
| Thickness of Mat | | 2.5 in. | |
| Pressure Drop Across Mat | | 1.0 in. | |
| Sifted Product: | | | |
| Bulk Densities gms/cc | | | |
| Composite | | | 0.33 |
| Upper half | | | 0.31 |
| Lower half | | | 0.34 |
| Particle Density (air pycnometer) | | | 1.60 |
| % Moisture  Composite | | | 7.0 |
| Upper half | | | 7.6 |
| Lower half | | | 6.6 |
| Sina $A_w$ (water activity value, composite) | | | 0.14 |
| % Moisture after 24 hrs. at 60% R.H. | | | — |
| Intercept Value (flow resistance) | | | 85. |
| Void Fraction | | | 0.60 |
| Intact Mat | | | |
| % Moisture, average | | | 7.0 |
| Bulk densities, average gms/cc | | | 0.29 |
| Upper half | | | — |
| Lower half | | | — |
| Particle Density (air pycnometer) | | | 1.70 |
| Intercept Value (flow resistance) | | | 18. |
| Void Fraction | | | 0.67 |
| B. At low feed rate not tested | | | |
| Thickness of Mat | | | |
| Pressure Drop across Mat | | | |
| Sifted Product: | | | |
| Bulk density gms/cc (average) | | | |
| Particle density (air pycnometer) | | | |
| % Moisture | | | |
| Sina $A_w$ (water activity value) | | | |
| % Moisture after 24 hrs. at 60% R.H. | | | |
| Intercept Value (flow resistance) | | | |
| Intact Mat: | | | |
| % Moisture, average | | | |
| Bulk Density, average gms/cc | | | |
| Upper half | | | |
| Lower half | | | |
| Particle Density (air pycnometer) | | | |
| Intercept Value (flow resistance) | | | 670 |

EXAMPLE XXIII

Dry "Instant" Cheese Mat Product

Aged American (Cheddar) cheese (14 months) was melted and diluted to form a smooth emulsion which was dried to form a porous mat product with unexpected rehydration characteristics. When 1 cup (about 85 grams) was combined with 2 ounces (about 60 mls) of water, a homogenous stable paste was easily formed without syneresis after several days. The paste consistency was ideal for a spread.

1. Slurry Composition

| Ingredients | Parts by Weight |
|---|---|
| Aged American Cheese (14 months old) | 240 |
| Hot Water (180° F.) | 160 |
| Total | 400 |
| % Solids in Slurry | 40 |

2. Process Conditions

The cheese was delivered in blocks of approximately 40 pounds net weight. These were warmed and cut with a cheese knife into pieces 2 to 3 pounds each and placed in a sweep-agitated, jacketed, stainless steel kettle. The cheese was first melted by applying heat (hot water at 220° F.) to the jacket and mixed at a viscous consistency with the sweep. After melting, the hot water was added carefully with agitation to form a stable oil-in-water emulsion of smooth, homogeneous consistency. This was aided by circulating for 15–20 minutes by pumping the entire slurry through a shear type mixer at 175° F. The stable emulsified slurry was transferred to a jacketed dryer supply tank and held at 160° F.±5° during drying.

| Atomizing | |
|---|---|
| Aeration | None |
| Nozzles | Spraying Systems Inc. |

|  |  |
|---|---|
|  | Type - SBC |
|  | No. - 2 |
|  | Size - No. 4 |
| Feed Temperature | 160° F. |
| Feed Pressure | 1600 psi |
| Slurry Feet Rate | 700 |
| Dryer |  |
| Spray Chamber |  |
| Air Inlet Temperature | 350° F. |
| Air Outlet Temperature | 145° F. |
| Air Flow CFM | 5200 |
| Second Stage Dryer |  |
| Air Inlet Temperature | 135° F. |
| Air Outlet Temperature | 130° F. |
| Air Flow CFM | 1800 |
| Screen Conveyor Rate | 2.0 inches per minute |

3. Mat character

|  | As Deposited on Mat | Leaving Spray Chamber | Leaving Second Stage |
|---|---|---|---|
| A. At slurry feed rate of 700 lbs/hr |  |  |  |
| Thickness of mat (in.) | 0.0-2.0 | 2.0 | 2.0 |
| Pressure drop across mat (in. of water) |  | 0.5 | 1.50 |
| Sifted Product |  |  |  |
| Bulk densities (gms/cc) |  |  |  |
| Composite | 0.42 | 0.41 | 0.44 |
| Upper half |  |  | 0.40 |
| Lower half |  |  | 0.42 |
| Partcticle density (air pycnometer) | 1.17 | 1.17 | 1.16 |
| % moisture    Composite | 19.63 | 8.80 | 3.60 |
| Upper half |  |  | 3.80 |
| Lower half |  |  | 2.71 |
| Sina $A_w$ (water activity value, comp.) |  |  | 0.12 |
| Intercept value (flow resistance) |  |  | 82. |
| Void fraction |  |  | 0.65 |
| Intact Mat |  |  |  |
| % moisture, average |  |  | 3.60 |
| Bulk densities, average (gms/cc) |  |  | 0.32 |
| Particle density (air pycnometer) |  |  | 1.16 |
| Intercept value (flow resistance) |  |  | 23. |
| Void fraction |  |  | 0.73 |

EXAMPLE XXIV

Dry Stable Porous Analgesic Mat Product

A dry highly dispersible, rapidly water-soluble aspirin mat compound was produced with unexpectedly low moisture content from a slurry containing acetyl salicylic acid (ASA) and NaHCO$_3$ (reacted to form N$^a$ ASA), Since storage stability is inversely related to moisture content, the unexpectedly low moisture achieved should result in good stability. The formation of crystals in the process was not anticipated and this occurrence appeared to facilitate the low moisture level in the dry mat.

1. Slurry Composition

| Ingredients | Parts by Weight |
|---|---|
| Acetyl Salicylic Acid (ASA) | 133.5 |
| NaHCO$_3$ | 62.5 |
| Cold Distilled Water (40° F.) | 265.5 |
|  | 461.5 |

| Ingredients | Parts by Weight |
|---|---|
| % Solids | 35.0 |

2. Process Conditions (All contact metal in process was type 304 or 316 stainless steel. Iron causes product to discolor.)

A 150 gallon agitated, jacketed tank was charged with the cooled water and agitated while adding the NaHCO$_3$ (slight excess) after which ASA (slight excess) was added slowly and stirred for 1.5 hours while held at 36° F.±5°. pH was checked and verified at 6.9. Filter aid was added (1.5 pounds) and then removed along with undissolved NaASA by filtering until clear by pumping through a "Sparkler" filter. The batch was transferred to the dryer supply tank and held during the drying test at 35° F.±3° F.

|  |  |
|---|---|
| Atomizing |  |
| Aeration | None |
| Nozzles | Spraying Systems Inc. |
|  | Type - SBC |
|  | No. - 6 |
|  | Size - No. 6 |
| Feed Temperature | 35° F. |
| Feed Pressure | 2000 psi |
| Feed Rate | 700-750 pounds per hour |
| Dryer |  |
| Spray Chamber |  |
| Air Inlet Temperature | 395° F. ± 3° F. |
| Air Outlet Temperature | 155° F. ± 3° F. |
| Air Flow CFM | 5000 at 150° F. |
| Second Stage Dryer |  |
| Air Inlet Temperature | 180° F. ± 10° F. |
| Air Outlet Temperature | 170° F. ± 10° F. |
| Air Flow CFM | 1600 |
| Screen Conveyor Rate | 2.0 inches per minute |

3. Mat Character

|  | As Deposited On Mat | Leaving Spray Chamber | Leaving Second Stage |
|---|---|---|---|
| A. At high feed rate |  |  |  |
| Thickness of mat (in.) | 0-1.0 | 0.5-1.0 | 1.0 |
| Pressure drop across mat (in. of water) |  | 1.5-2.0 |  |
| Sifted Product |  |  |  |
| Bulk densities (gms/cc) |  |  |  |
| Composite |  | 0.45 | 0.44 |
| Particle density (air pycnometer) |  |  | 1.04 |
| % Moisture Composite | 1.24 | 0.12 | Trace |
| Sina $A_w$ (water activity value, comp.) |  |  | 0.08 |
| Intercept value (flow resistance) |  |  | 65. |
| Void fraction |  |  | 0.71 |
| Intact Mat |  |  |  |
| % moisture, avg. |  |  | Trace |
| Bulk densities, avg. (gms/cc) |  |  | 0.38 |
| Particle density (air pycnometer) |  |  | 0.92 |
| Intercept value (flow resistance) |  |  | 21. |
| Void fraction |  |  | 0.76 |

EXAMPLE XXV

Dry porous mat gelatin product

A dry porous mat product was produced using the subject process from a concentrated gelatin slurry without addition of other substances to aid drying. The resulting dry mat product was very low in density, compared to commercial gelatin but density could be greatly increased by comminuting and compressing, which improves wetting and dispersing.

1. Slurry Composition

|  | % | Parts By Weight |
|---|---|---|
| Gelatin, 250 bloom at 10% moisture | 16.4 | 143. |
| Hot water to dissolve (150° F.) | 83.6 | 727. |
|  | 100.0 | 870. |
| Solids in slurry | 15.0 |  |

2. Process Conditions

Hot water (150° F.) was placed in a 150 gallon capacity jacketed kettle and gelatin powder was added with sweep agitation and circulation by pump through a shear mixer until free of undissolved particles. The slurry having cooled during preparation to 135° F. was transferred to the dryer supply tank and held at 135° F.±5° during test. The viscosity was determined with a Brookfield viscosimeter and found to be 1800 cp at 130° F. A satisfactory porous mat was produced under the conditions described below. The feed nozzles for atomizing the slurry were located in the center of the spray chamber within the periphery of a 24" diameter Venturi. Saturated (partially condensed)steam was introduced into this area to reduce evaporation rate immediately adjacent to the spray nozzles in order to promote better droplet formation by the liquid slurry emitted from the nozzles. This appeared to improve atomization and over-all drying rates. Formation of undesirable filaments by the sprays was prevented by this procedure.

| Atomizing |  |
|---|---|
| Aeration | 0.3 to 0.5 scf per pound feed |
| Nozzles | Spraying Systems Inc. |
|  | Type - SBC |
|  | No. - 2 |
|  | Size - No. 4 |
| Feed Temperature | 135° F. |
| Feed Pressure | 2000 psi ± 100 psi |
| Feed Rate | 500 pounds per hour |
| Dryer |  |
| Spray Chamber |  |
| Air Inlet Temperature | 410° F. ± 5° |
| Air Outlet Temperature | 210° F. |
| Air Flow CFM | 4500 |
| Second Stage Dryer |  |
| Air Inlet Temperature | 120° F. |
| Air Outlet Temperature | 110° F. |
| Air Flow CFM | 1200 |
| Screen Conveyor Rate | 2 inches per minute |

3. Mat Character

|  | As Deposited On Mat | Leaving Spray Chamber | Leaving Second Stage |
|---|---|---|---|
| A. At feed rate of 500 lbs/hour |  |  |  |
| Thickness of mat (in.) | 0–3.0 | 3.0 |  |
| Pressure drop across Mat (in. of water) |  | <0.1 |  |
| Sifted Product |  |  |  |
| Bulk densities (gms/cc) |  |  |  |
| Composite |  | 0.03 | 0.03 |
| Particle density air (air pycnometer) |  | 0.51 | 0.52 |
| % Moisture Composite |  | 24.30 | 11.30 |
| Sina $A_w$ (water activity value, Comp.) |  | 0.12 | 0.05 |
| Intercept value (flow resistance) |  |  | 52. |
| Void fraction |  |  | 0.87 |
| Intact Mat |  |  |  |
| % moisture, avg. |  |  | 11.30 |
| Bulk densities, avg. (gms/cc) |  |  | 0.01 |
| Particle density (air pycnometer) |  |  | 0.51 |
| Intercept value (flow resistance) |  |  | 0. |
| Void fraction |  |  | >.90 |
| Crushed and Compressed Granules |  |  |  |
| Bulk density gms/cc, avg |  |  | 0.38 |
| Particle density (air pycnometer) |  |  | 0.87 |
| % moisture |  |  | 11.40 |
| Sina $A_w$ (water activity value) |  |  | 0.06 |
| % moisture after 24 hours at 60% R.H. |  |  | 16.00 |
| Intercept value (flow resistance) |  |  | 305.00 |
| Void fraction |  |  | 0.74 |

EXAMPLE XXVI

Dry Porous Coffee Extract Mat

A commercial coffee extract concentrate was dried to produce a porous mat product with rapid dispersibility and solubility in water. The dissolving characteristics and the appearance of the mat product, when crushed into coarse, granular form, appeared very similar to samples of commercial freeze dried coffee.

1. Slurry Composition

| Ingredients |  | Parts By Weight |
|---|---|---|
| Coffee Extract Solids | 36.44 | 109.32 |
| Water | 63.56 | 190.68 |
|  | 100.00 | 300.00 |

2. Process Conditions

The coffee extract concentrate was received in poly-lined drums and transferred to the dryer supply tank where it was held at 115° F.±5° during the test.

|  | High Rate | Low Rate |
|---|---|---|
|  | (Same nozzles for both tests) | |
| Atomizing |  |  |
| Aeration | None | None |
| Nozzles - Spraying Systems Inc. |  |  |
| Type - SBC |  |  |
| No. - 4 |  |  |
| Size - No. 5 |  |  |
| Feed Temperature | 115° F. | 115° F. |
| Feed pressure (psig) | 1500–1600 | 1000–1200 |
| Feed Rate (lbs/hr) | 950 | 800 |
| Dryer |  |  |
| Spray Chamber |  |  |
| Air Inlet Temperature | 365° F. |  |
| Air Outlet Temperature | 145° F. | 155–160° F. |
| Air Flow CFM | 5400 | 5400 |
| Second Stage Dryer |  |  |
| Air Inlet Temperature | 156° F. | 155° F. |
| Air Outlet Temperature | 150° F. | 152° F. |
| Air Flow CFM | 1800 | 1800 |
| Screen Conveyor Rate (in./min.) | 0.6 | 0.6 |

3. Mat Character

|  | As Deposited On Mat | Leaving Spray Chamber | Leaving Second Stage |
|---|---|---|---|
| A. At high feed rate (950 lbs/hr) | | | |
| Thickness of mat (in.) | | 1.5 | 1.5 |
| Pressure Drop Across Mat (in. of water) | | 2.0 | |
| Sifted Product | | | |
| Bulk densities (gms/cc) | | | |
| Composite | | 0.43 | 0.42 |
| Particle density (air pycnometer) | | 1.10 | 1.06 |
| % moisture Composite | 12.89 | 5.65 | 3.04 |
| Sina $A_w$ (water activity value, comp. | 0.56 | 0.19 | 0.16 |
| % moisture after 24 hrs. at 60% R.H. | | | 12.13 |
| Intercept value (flow resistance) | | | 567. |
| Void fraction | | | 60 |
| Intact Mat | | | |
| % moisture, avg. | | | 3.04 |
| Bulk densities, avg. (gms/cc) | | | 0.29 |
| Particle density (air pycnometer) | | | 0.89 |
| Intercept value (flow resistance) | | | 205. |
| Void fraction | | | 0.67 |
| B. At low feed rate (800 lbs/hr) | | | |
| Thickness of mat (in. | 0. to 1.0 | 1.0 | 1.0 |
| Pressure drop across mat (in. of water) | | 4.0 | |
| Sifted Product: | | | |
| Bulk density (gms/cc), avg. | | 0.39 | 0.38 |
| Particle density (air pycnometer) | | 1.10 | 1.16 |
| % moisture | 10.64 | 8.21 | 7.04 |
| Sina $A_w$ (water activity value) | 0.50 | 0.39 | 0.29 |
| % moisture after 24 hrs. at 60% R.H. | | | 12.10 |
| Intercept value (flow resistance) | | | 5.67 |
| Void fraction | | | 0.69 |
| Intact Mat: | | | |
| % moisture, average | | | 7.04 |
| Bulk density, avg. (gms/cc) | | | 0.36 |
| Particle density (air pycnometer) | | 1.18 | 1.18 |
| Intercept value (flow resistance) | 670 | | 410. |
| Void fraction | | | 0.59 |

EXAMPLE XXVII

Instant Artificial Non-fat DryMilk In Porous Mat Form

A highly dissolvable dry product in mat form, suitable for use as a substitute for Instant Non-fat Dry Milk and containing the nutritious features thereof, was prepared from the ingredients listed below in an aqueous medium by employing the equipment pursuant to Example XIX, and under the process conditions described below:

1. Slurry Composition

| Ingredients | Parts By Weight |
|---|---|
| Whey Concentrate (40% solids) | 600 |
| Casein (dispersible, 90% protein) | 100 |
| Water (containing salts and alkali) | 150 |
| Total (at 40% solids) | 850 |
| Containing 340 lbs of dry material (35% protein MFB) | |

2. Process Conditions

The casein was dispersed in a suitable quantity of cold whey concentrate and water (pH adjusted to facilitate dispersion) thoroughly mixed by circulating in a shear type mixer in a jacketed kettle at 60° F. or less while mixing, heated to 140° F. and transferred to the dryer supply tank.

| Atomizing | |
|---|---|
| Aeration | None |
| Nozzles | Spraying Systems Inc. Type - SBC TC No. - 2 Size - No. 8 |
| Feed Pressure | 1500–1600 psig |
| Feed Temperature | 145° F. |
| Dryer | |
| Spray Chamber | |
| Air Inlet Temperature | 335° F. |
| Air Outlet Temperature | 140° F. |
| Air Flow CFM | 5400 |
| Second Stage Dryer | |
| Air Inlet Temperature | 195° F. |
| Air Outlet Temperature | 175° F. |
| Air Flow CFM | 1600 |
| Screen Conveyor Rate | 1.5 inches per minute |

3. Mat Character

| | As Deposited On Mat | Leaving Spray Chamber | Leaving Second Stage |
|---|---|---|---|
| A. At feed rate of 1100 | | | |

|  | As Deposited On Mat | Leaving Spray Chamber | Leaving Second Stage |
|---|---|---|---|
| lbs/hr |  |  |  |
| Thickness of mat (in.) |  | 1.5 |  |
| Pressure drop across mat (in. of water) |  | 1.0 |  |
| Sifted Product: |  |  |  |
| Bulk densities (gms/cc) |  |  |  |
| Composite |  |  | 0.42 |
| Particle density (air pycnometer) |  |  |  |
| % moisture Composite |  | 4.80 | 3.20 |
| Sina $A_w$ (water activity value composition) |  | 0.22 | 0.16 |
| Intercept value (flow resistance) |  |  | 160. |
| Intact Mat: |  |  |  |
| % moisture, avg. |  |  | 3.2 |
| Bulk densities, avg. (gm/cc) |  |  | 0.40 |
| Particle density (air pycnometer) |  |  | 1.16 |
| Intercept value (flow resistance) |  |  | 62. |

EXAMPLE XXVIII

An Aerated Topping Mat Product

An aerated topping mix mat product adapted to provide a whipped topping of a fine, smoth, creamy consistency when reconstituted with water was prepared employing the following ingredients:

| Sucrose | 52.0 |
|---|---|
| Sodium caseinate | 6.0 |
| Hydrogenated coconut oil | 32.0 |
| "Myvacet 5-07"[1] | 7.0 |
| "Myverol 1807"[2] | 6.0 |
| Lecithin 1.0 |  |
| Nonfat milk solids | 30.0 |
| Corn syrup solids | 10.0 |
| Stabilizer[3] | 1.0 |
| Pure Vanilla Extract | 1.5 |
|  | 146.5 |

[1]Distilled acetylated monoglycerides from acetyled hydrogenated cottonseed oil with about 50% of the free hydroxyl groups being acetylated-sold by DPI Division of Eastman Chemical Products.
[2]Molecular distilled glycerol monoesters of fully hydrogenated cottonseed base and containing at least 90% monoester-sold by DPI Division of Eastman Chemical Products.
[3]Vegetable gum In preparing the slurry in this example the shortening was placed in a 75-gallon heated kettle equipped with an agitator and heated to a temperature of 160° F. After the shortening had melted, the "Myvacet 5-07," "Myverol 1807", sodium caseinate and lecithin were added followed by thorough mixing. To a separate mixing kettle having a capacity of 150 gallons there was added 120 parts by weight water with the water then being heated to and maintained at 140° F. To the hot water there was added with thorough mixing 30,0 parts by weight nonfat dry milk solids, 10.0 parts by weight corn syrup solids and 1.0 parts by weight stabilizer. In another heated mixing vessel 52.0 parts by weight sucrose was dissolved in 32 parts by weight hot water (i.e., 140° F.) after which the ingredients from the heated mixing vessel were uniformly blended with the contents of the 150-gallon mixing kettle. The contents from the 75-gallon kettle were then pumped into the 150-gallon kettle with thorough mixing while maintaining the temperature from about 120° F. to 125° F. This mixture was then recirculated for about five minutes through a Model 8M3 Oakes Mixer operating at 1750 rpm. The resultant mixture was then homogenized at 500 psi in the first stage and 1500 psi in the second stage in a Marton Gaulin homogenizer with capacity of 75 gph. The resultant homogenized mixture was conducted through a high pressure piston pump operated at a pressure of about 2000 to 2200 and then through a sparger of the type disclosed in U.S. Pat. No. 3,222,193 by F.P. Hanrahan wherein the homogenized mixture was aerated at a rate of between about 3.00 to about 4.5 cubic feet of air per pound of homogenized mixture solids. After seration, the serated homogenized mixture was fed through atomizing nozzles to the top of a dryer of the type disclosed in FIG. 8 with the dryer having an internal height of 16 feet and side dimensions of 6 feet by 6 feet. In the dryer, the serated homogenized mixture was passed through a SBC #5 nozzle manufactured by Spraying Systems, Inc. positioned approximately 15 feet above the collecting screen. To regulate the air volume and velocity at approximately 1000 fpm. through the throat section of the dryer, an inverted truncated venturi having a 2 foot base, a height of 1.5 feet was positioned and supported 8 inches above the nozzle outlet. The conical nozzle was slanted inwardly at about a 20 degree angle toward the spray nozzles with the apex portion of the sleeve being open (i.e., the nozzle outlet portion was open with the side walls thereof providing a hooded enclosure about the nozzle. In the dryer, air was admitted at a temperature range of 315° F. to 325° F. and had an outlet temperature ranging from 175° F. to 200° F. with the aerated product being admitted under a nozzle pressure of about 1000 psi. The resultant spray dried particles were deposited on a collecting screen conveyor continuously moving at a speed of 2 inches per minute. The deposited particles were transferred on the collecting screen conveyor from the spray drying chamber into a second stage drying chamber 36 inches long wherein air maintained at about 120° F. and at a rate of about 2000 cubic feet per minute was passed through the mat product accumulated on the conveyor screen with a total residence time in the second stage dryer being 18 minutes. The resultant mat of about 4.0 inches in thickness and a width of 72 inches was partially pulverized by passing through the screen (8 mesh) of a Tornade hammermill. Density of the resultant pulverized product was 0.15 and had a moisture content of 1.0 percent.

A whipped topping was prepared by placing 8 fluid ounces of cold milk (3.5 percent fat) along with 120 grams of the pulverulent product in a sealed one-quart jar. After about 75 seconds of vigorous shaking by hand, the product was removed from the jar. Examination of the product after shaking indicated the product was of a fine smooth creamy consistency similar to whipped cream with a volume of 20 fluid ounces (i.e., over-run of about 250 percent).

EXAMPLE XXIX

Dried Egg Soufflé Mix

An "instant" type preleavened, low density egg soufflé mix in highly permeable mat form, capable of rapid rehydration with substantial retention of occluded or entrapped gas (air, $CO_2$, etc.) was prepared by drying a prepared slurry with gas injected into the feed to the nozzles.

1. Slurry Composition

| Ingredients | % Parts By Weight |
|---|---|
| All purpose white flour (3338) | 7.5 |
| Creamery butter | 12.0 |
| Whole eggs | 95.0 |
| Eggs whites | 15.0 |
| Nonfat dry milk | 7.5 |
| Salt | 1.0 |

2. Process Conditions

Liquid egg materials were combined in an agitated, jacketed tank with non-fat dry milk, melted butter and salt to form a smooth slurry and heated to 100°±5° F. Flour was then added slowly with agitation and slurry ciculated through sheat type mixer to form a stable emulsion. Mix was transferred to jacketed supply tank and held during drying at 95°-100° F. Solids in slurry—34.5%

| | |
|---|---|
| Atomizing | |
| Aeration | Maximum 5-6 scf per minute |
| Nozzles | Spraying Systems Inc. |
| | Type - SX |
| | No - 4 |
| | Size - No. 69 orifice inserts |
| | No. 17 cores |
| Feed Pressure | 2000-2200 psig |
| Dryer | |
| Spray Chamber | |
| Air Inlet Temperature | 290° F. |
| Air Oulet Temperature | 140° F. |
| Air Flow CFM | 6000 |
| Second Stage Dryer | |
| Air Inlet Temperature | 105° F. |
| Air Outlet Temperature | 100° F. |
| Air Flow CFM | 1500 |
| Screen Conveyor Rate | 4 inches per minute |

3. Mat Character

| | As Deposited on Mat | Leaving Spray Chamber | Leaving Second Stage |
|---|---|---|---|
| A. At feed rate of 750 lbs. per hr. | | | |
| Thickness of Mat inches | 2.00 | | |
| Pressure Drop Across Mat inches of water | 0.70 | | |
| Sifted Product: | | | |
| Bulk Densities gms/cc | | | |
| Composite | 0.09 | | |
| Upper half | — | | |
| Lower half | — | | |
| Particle Density (air pycnometer) gm/cc | | | 1.12 |
| % Moisture Composite | | | 5.02 |
| Upper half | | | 5.07 |
| Lower half | | | 4.97 |
| Sina $A_w$ (water activity value, composite) | | | 0.14 |
| % Moisture after 24 hrs. at 60% R.H. | | | — |
| Intercept Value (flow resistance) | | | 240. |
| Void Fraction | | | 0.80 |
| Intact Mat: | | | |
| % Moisture, average | | | 5.02 |
| Bulk densities, average gms/cc | | | 0.07 |
| Upper half | | | |
| Lower half | | | |
| Particle density (air pycnometer) | | | 1.10 |
| Intercept Value (flow resistance) | | | 60. |
| Void fraction | | | 0.88 |

| | As Deposited on Mat | Leaving Spray Chamber | Leaving Second Stage |
|---|---|---|---|
| Batter density gms/cc (when reconstituted at 1.0 part dry mix to 1.5 parts water by folding as specified in Example XIII (ice cream) | | | 0.60 |
| B. At low feed rate Not tested | | | |

The dry mix was tested by recombining 250 gms. of mix with 375 ml. cold water in a 9 in. greased casserole by "folding" mix into water gently. When mix was uniformly dispersed to form aerated batter, casserole with batter was placed in preheated oven and baked for 30 minutes at 375° F. This produced a golden brown soufflé of excellent texture and flavor.

EXAMPLE XXX

Dry "Instant" Ice Cream Mix

Dry non-serated and foamed mat products were prepared from a homogenized commercial liquid ice cream mix of the following composition:

1. Slurry Composition: (total solids 38%)

| Ingredients | Percent | Parts by Weight |
|---|---|---|
| Light cream | 81.50 | 240.00 |
| Sucrose | 13.45 | 35.00 |
| Corn syrup solids (36 dextrose equiv) | 4.65 | 13.50 |
| Vegetable Gum stabilizer | 0.34 | 1.25 |
| Emulsifier (mono and di-glycerides) | 0.06 | 0.25 |
| | 100.00 | 290.00 |

2. Process Conditions

The mix was stored in dryer supply tank at 40°-45° F. with mild agitation.

| | |
|---|---|
| Atomizing - | One-half the batch was dried without aeration. The other half was aerated to yield a dry foam. |
| Aeration - | 5-6 SCFM of compressed air at 1200 psi injected into feed ahead of nozzles |
| Nozzles - | Spraying Systems Inc. |
| Type - | SBC |
| No. - | 4 |
| Size - | No. 5 |
| Feed Pressure - | 1000 psi ± 50 psi. |
| Dryer - | Identical operating conditions were employed for both aerated and non-aerated tests except for conveyor rate |
| Spray chamber | |
| Air inlet temperature | 330° F. |
| Air outlet temperature | 135° F. |
| Air flow CFM | 5500 |
| 2nd stage | |
| Air inlet temperature | 130° F. |
| Air outlet temperature | 115° F. |
| Air flow CFM | 1500 |
| Screen conveyor rate - non-aerated | 0.75 inches per min. |
| aerated | 1.50 inches per min. |

3. Mat Character

|  | As deposited on mat | Leaving spray chamber | Leaving second stage |
|---|---|---|---|
| A. Non-Aerated | | | |
| Thickness of Mat | | | 0.75 |
| Pressure Drop Across Mat | | | 1.50 |
| Sifted Product | | | |
| Bulk Densities gms/cc | | | |
| composite | | | 0.36 |
| upper half | | | 0.28 |
| lower half | | | 0.45 |
| Particle Density (air pycnometer) | | | 1.20 |
| % moisture composite | 5.6 | 3.50 | 1.33 |
| upper half | | | 2.00 |
| lower half | | | 1.20 |
| Sina $A_w$ (water activity value, comp.) | | | 0.09 |
| % Moisture after 24 hr. at 60% R.H. | | | 8.30 |
| Intercept value (flow resistance) | | | 245.00 |
| Void fraction | | | 0.62 |
| Intact Mat | | | |
| % Moisture, average | | | 1.40 |
| Bulk Densities, average gms/cc | | | 0.27 |
| upper half | | | 0.25 |
| lower half | | | 0.30 |
| Particle density (air pycnometer) | | | 1.10 |
| Intercept Value (flow resistance) | | | 85.0 |
| Void Fraction | | | 0.56 |
| B. Aerated Portion | | | |
| Thickness of Mat | | | 2.5 in. |
| Pressure Drop Across Mat | | | 2.0 in. |
| Sifted Product | | | |
| Bulk Density gms/cc (average) | | | 0.28 |
| Particle Density (air pycnometer) | | | 1.03 |
| % Moisture | | | 1.20 |
| Sina $A_w$ (water activity value) | | | — |
| % Moisture after 24 hrs. at 60% R.H. | | | 6.60 |
| Intercept Value (flow resistance) | | | 870.0 |
| Void Fraction | | | 0.75 |
| Intact Mat | | | |
| % Moisture, average | 6.50 | 3.00 | 1.20 |
| Bulk Density average gms/cc | | | 0.15 |
| upper half | | | 0.14 |
| lower half | | | 0.16 |
| Particle Density (air pycnometer) | | | 0.36 |
| Intercept Value (flow resistance) | | | 185.0 |
| Void Fraction | | | 0.86 |

The resultant dry foamed mat product collected from the second stage drying chamber after being grated through a 20-mesh ASBS screen was found to have a density of about 0.15 grams per cubic centimeter. The large volume of entrapped air provided leavening for convenient preparation of an ice cream product from the aerated grated mat product as follows: 8 ounces of the grated mat product was plAced in a two-quart wide-mouthed glass jar along with 12 ounces of cold skim milk (2% fat) and vanilla flavoring. The lid of the two-quart jar was then secured and the contents were vigorously shaken by hand for about 35 seconds to disperse and hydrate the dry ice cream mix therein. The resultant product containing a sufficient amount of gas to provide an overrun of about 100 percent was then poured into an appropriate mold and placed into a freezing unit maintained at −12° F. After about one hour the resultant frozen product was removed from the freezing unit and found to possess a quality comparable to commercially available ice cream.

|  | As deposited on mat | Leaving Spray Chamber | Leaving Second Stage |
|---|---|---|---|
| % Moisture after 24 hrs. at 60% R.H. | 12.26 | 13.10 | 13.56 |
| Intercept Value (flow resistance) | | | 312.0 |
| Intact Mat: | | | |
| % Moisutre | | | 4.80 |
| Bulk density average gms/cc | | | 0.40 |
| Upper half | | | 0.37 |
| Lower half | | | 0.46 |
| Particle Density (air pycnometer) | | | 1.19 |
| Intercept Value (flow resistance) | | | 670.0 |

EXAMPLE XXXI

Dry Aerated Dough Mix Porous Mat Product

A dry dough mix product containing many air cells was produced by drying an aerated slurry containing flour, shortening, water and other bread dough constituents as described below. The dry mat product, when combined with water, easily formed a dough containing air cells for leavening. This conveniently formed dough, when baked, resulted in a bread product of acceptable texture, flavor, volume, and appearance without further leavening.

1. Slurry Compsition

| Ingredients | % | Parts by Weight |
|---|---|---|
| Flour | | 150.0 |
| Shortening | | 12.0 |
| Sugar | | 7.0 |
| Salt | | 2.0 |
| Water | | 400.0 |
| | | 571.0 |
| % Solids (MFB) | | 27.5 |

2. Process Conditions

Water at 80° F. was placed in a 150 gallon capacity stainless steel jacketed kettle with sweep agitator. Sugar, shortening and salt were added, followed by slowly adding the flour while stirring and circulating with pump through shear type mixer. Temperature of the slurry was not permitted to exceed 85° F. and was held at this temperature ±5° F. during mixing to form a smooth slurry. This was transferred to a supply tank for the dryer and held at less than 90° F. during the 2 drying process which were conducted as shown below. For drying, the slurry was split into two equal portions, one of which was dried without seration and the other serated by injecting compressed air into the slurry feed to produce a porous mat formed by cohesion of foamed particle of low density.

| Atomizing | Non-aerated Portion | Aerated Portion |
|---|---|---|
| Nozzles - Spraying Systems Inc. | | |
| Type | SBC | SBC |
| No. | 2 | 2 |

| Atomizing | Non-aerated Portion | Aerated Portion |
|---|---|---|
| Size | No. 5 | No. 5 |
| Feed Temperature | 85° F. | 85° F. |
| Feed Rate, lbs. | 700 | 750 |
| Dryer Spray Chamber | | |
| Air Inlet Temperature | 350° F. ± 5° | 360° F. ± 5° |
| Air Outlet Temperature | 160° F. ± 5° | 150° F. ± 5° |
| Air Flow CFM | 5500 | 5500 |
| Second Stage Dryer | | |
| Air Inlet Temperature | 160° F. | 160° F. |
| Air Flow CFM | 1800 | 1800 |
| Screen Conveyor Rate | 3.0"/min | 3.0"/min. |
| Aeration Rate, scfm | None | 10.0 |

3. Mat Character

| | As Deposited On Mat | Leaving Spray Chamber | Leaving Second Stage |
|---|---|---|---|
| A. Non-aerated Portion | | | |
| Thickness of mat (in.) | 0-1.5 | 1.5 | 1.5 |
| Pressure drop across mat (in. of water) | | 2.5 | |
| Sifted Product | | | |
| Bulk densities (gms/cc) | | | |
| Composite | | | 0.55 |
| Particle density (air pycnometer) | | | 1.42 |
| % moisture Composite | | | 2.50 |
| Sina $A_w$ (water activity value, comp.) | | | 0.15 |
| % moisture after 24 hrs at 60% R.H. | | | 13.08 |
| Intercept value (flow resistance) | | | 710. |
| Void fraction | | | 0.56 |
| Intact Mat | | | |
| % moisture, avg. | | | 5.98 |
| Bulk densities, avg. (gms/cc) | | | 0.46 |
| Particle density (air pycnometer) | | | 1.40 |
| Intercept value (flow resistance) | | | 420. |
| Void fraction | | | 0.63 |
| B. Aerated Portion | | | |
| Thickness of mat (in.) | .0-3.0 | 3.0 | 3.0 |
| Pressure drop across mat (in. of water) | | 1.2 | |
| Sifted Product: | | | |
| Bulk density (gms/cc) (avg) | | | 0.24 |
| Particle density (air pycnometer) | | | 1.40 |
| % moisture | | | 2.50 |
| Sina $A_w$ (water activity value) | | | 0.10 |
| % moisture after 24 hrs at 60% R.H. | | | 13.60 |
| Intercept value (flow resistance) | | | 140. |
| Void fraction | | | 0.75 |
| Intact Mat: | | | |
| % moisture, avg. | | | 2.50 |
| Bulk density, avg. (gms/cc) | | | 0.18 |
| Particle density (air pycnometer) | | | 1.30 |
| Intercept value (flow resistance) | | 670 | 12. |
| Void fraction | | | 0.85 |

EXAMPLE XXXII

Dry Porous Milk Product from Frozen Porous Mat

Dry whole milk solids (27.5% fat) are suitably prepared to highly dispersible form by sublimation drying of a frozen, porous mat material obtained by collecting a bed or mat deposit on a foraminous surface as described below. The dry product was stable and possessed excellent flavor characteristics:

1. Slurry Composition

| Ingredients | % | Parts By Weight |
|---|---|---|
| Whole milk concentrate Composition | | 100 |
| Water | 60.0 | 60 |
| Milk solids containing fat | 11.0 | |
| Solids not fat | 29.0 | |
| Total solids | 40.0 | 40 |

2. Process Conditions

A. Slurry Preparation: Fresh pasteurized milk, standardized to 3.5% fat, was homogenized and concentrated under substamospheric pressure at temperatures not exceeding 140° F. to a total solids content of 40%. The concentrate was then cooled by means of a swept surface heat exchanger to a temperature below the freezing point of water sufficient to freeze a portion of the water therein but at a level at which it remained a purifiable liquid. Viscosity was low enough to permit satisfactory atomization with a two fluid spray device or by pumping through a spray nozzle at high pressures at a temperature of 25° F.±5° F.

B. Mat Formation: No aeration. A frozen, porous mat was formed by spraying the supercooled concentrate in the form of atomized droplets at the top of a spray chamber at a rate of 1200 pounds per hour. The said droplets had been dispersed in a quantity (5600 cfm) of dry air supplied at a temperature of −10° F. The frozen droplets resulting were collected from the air by venting the air through a moving screen on which the frozen droplets were deposited and collected in the form of a porous mat several inches in thickness. The frozen mat was transferred by the conveyor into a second zone where an additional quantity (1500 cfm) of cold air at −25°±2° F. was forced through the bed to freeze the partially coalesced particles to form a more rigid bed. The apparatus employed for this process is substantially the same as that of EXample XII. The frozen mat was then subjected to a sublimation (freeze drying) step by one or more methods as descried below.

C. Mat Formation with Aerated Spray: As a variation the liquid feed to the spray nozzles was mixed with up to 20 scfm of air by injecting the air into the feed supply pipe between the high pressure pump and the nozzles. The addition of the air produced a frozen mat of increased volume and porosity with a low particle density. Freeze drying of this frozen mat yielded a dry porous milk product highly suitable for reconstitution with an aqueous medium to provide a stable foam without whipping or beating (as described in Example XIV).

| Atomizing | | |
|---|---|---|
| Aeration - | None | With Aeration 20 SCFM |
| Nozzles - | Spraying Systems, Inc. Type - SBC No. 2 Size No. 8 | Spraying Systems, Inc. Type - SBC No. 2 Size No. 8 |
| Feed Pressure | 1500 psi ± 200 psi | 1500 psi |
| Feed Temperature | 20° F. | 20° F. |
| Dryer Spray Chamber | | |
| Air Inlet Temperature | −10° F. | −10° F. |

-continued

| Atomizing | | |
|---|---|---|
| Air Outlet Temperature | 0° F. | 2° F. |
| Air Flow CFM | 5600 at 11.32 ft³/lb | 5600 |
| Second Stage Dryer | | |
| Air Inlet Temperature | −25° F. | −25° F. |
| Air Outlet Temperature | −19° F. | −18° F. |
| Air Flow CFM | 1500 at 10.95 ft³/lb | 1500 |
| Screen Conveyor Rate | 4 in/min. | 4 in./min. |

Spray Chamber: Approximately 5600 cfm of saturated air at −10° F. at a density of 11.34 ft³/lb=500 lbs/min. or 30,000 lbs/hr was used to absorb about 75,000 btus released which raised the temperature of the air 4. Mat Freeze Drying a. Atmospheric: While on the conveyor the frozen bed enters a zone where dehumidified air (or other gas) is passed through pores of the bed until the water content is reduced to the desired level. Preferably for favorable shelf life the moisture should be less than 2%. In this step the air should be sufficiently warm to cause the water, as ice, to evaporate (sublime) employing rates and temperatures low enough to prevent melting.

b. Sub-atmospheric (vacuum): Alternatively, the rigid, intact, mat is transferred or removed in the frozen form from the described subject apparatus as porous slabs or pieces or if preferred crushed into porous granules. The porous material then was transferred to a vacuum or freeze dryer for drying under controlled rates without melting. During drying the dry, heated gas is preferably circulated through the porous material. By sublimation at comparatively high rates over those known to the art by conventional freeze drying processes, suitable dried products are prepared. Normally, after about 5½ hours the moisture content for a frozen, concentrated milk product was reduced to 1.64%. A sample of frozen milk containing the same percentage of water (58.7%) was placed in the freeze dryer adjacent to the porous mat material and subjected to identical drying conditions except for the porosity feature. After about 5 hours, the latter sample will normally contain about 14.6% moisture.

EXAMPLE XXXIII

Dry Porous Ice Cream Product From Partly Dried Frozen Mat

Dry porous ice cream mix mat products with excellent wetting and reconstituting properties are prepared by forming a porous mat from partially dried particles, freezing same and evaporating the remaining water by sublimation to the desired final moisture content.

1. Slurry Composition: Commercial Mix

| Ingredients | % | Parts By Weight |
|---|---|---|
| Light Cream | 81.50 | 240.00 |
| Sucrose | 13.45 | 35.00 |
| Corn Syrup Solids | 4.65 | 13.50 |
| Vegetable Gum | 0.34 | 1.25 |
| Emulsifier | 0.06 | 0.25 |

2. Process Conditions

A. Slurry preparation was by supplier. The homogenized, cooled, liquid mix was stored in a supply tank at 40°–45° F. with mild agitation.

B. Mat Partial Dehydration

In another application relating to freeze drying of the porous mat, the initial step in the spray chamber is similar to that described in Example XX, and heated air, rather than cooled air, is admitted to the spray chamber. A significant portion of the water, preferably 50% or more (see Table VIII) is evaporated. The hot air is introduced and the material is collected on the screen conveyor as described in Example XXXII. However, the procedure is modified to retain a substantial proportion of the water (10–30% moisture) in the mat at the point at which it is removed from the spray chamber (1st stage). This is achieved by a combination of an excessively high feed rate and high conveyor rate, resulting in a relatively high evaporation of water and thermal efficiency as well as an incompletely dried mat product containing substantial proportion of water and other volatile materials (i.e. flavor, etc.) which normally would be lost under higher thermal conditions necessary to form a mat with lower moisture content.

C. Mat Freezing and Drying

This porous, high moisture mat is then transferred without disruption to a second zone and cooled until frozen to a rigid consistency while retaining a high degree of porosity. This may be conducted in a manner such as described in Example XXXII. Subsequent treatment of the frozen porous mat, partially dehydrated, may be conducted as described therein. However, pursuant to this example, greater drying capacities at shorter time intervals are thus achieved to reduce the moisture content to a satisfactory level. Comparatively, frozen mat products per this example, containing about 26% moisture which are subjected to freeze drying conditions identical to that of Example XXXII, can be reduced to about 1.5% moisture after 2.5 hours as opposed to about 5 hours. The following is illustrative of processing conditions and of Example XXXII and products produced thereby:

| Atomizing | |
|---|---|
| Aeration - | 12 scfm |
| Nozzles - | Spraying Systems Inc. Type - SBC No. - 4 Size - No. 5 |
| Feed Pressure - | 1000 psi ± 50 psi |
| Feed Rate - | 900 pounds per hour |
| Dryer | |
| Spray Chamber | |
| Air Inlet Temperature - | 325° F. |
| Air Outlet Temperature - | 125° F. |
| Air Flow CFM - | 5500 |
| Second Stage Dryer | |
| Air Inlet Temperature - | −25° F. |
| Air Outlet Temperature - | −16° F. |
| Air Flow CFM - | 1200 |
| Screen Conveyor Rate - | 3.0 inches per minute |

3. Mat Character

| | As Deposited On Mat | Leaving Spray Chamber | Leaving Second Stage |
|---|---|---|---|
| A. At feed rate of 900 lbs/hr | | | |
| Thickness of mat (in.) | 0–3.0 | 3.0 | 3.0 |
| Pressure drop across mat (in. of water) Intact Mat | | 1.0 | 1.2 |
| % moisture, avg. | 26.0 | 23.50 | 23.50 |

-continued

|  | As Deposited On Mat | Leaving Spray Chamber | Leaving Second Stage |
|---|---|---|---|
| Bulk densities |  | 0.25 | 0.24 |
| Intercept value (flow resistance) |  | 60. | 63. |

TABLE NO. VIII

FOR EXAMPLE XXXIII

|  | Product Content | | | | Water Evaporated | | | | Final % Water |
|---|---|---|---|---|---|---|---|---|---|
|  | In 100 Parts | | Percent | | Filter Mat | | Freeze Dryer | | |
|  | Solids | Water | Solids | Water | Amount | % | Amount | % | |
| Spray Feed | 39 | 61 | 39 | 61 | — | — | — | — | — |
| Mat - Low Moisture | 40 | 10 | 80 | 20 | 50 | 83 | >10 | 16 | <2.0 |
| Medium Moisture | 40 | 20 | 67 | 33 | 40 | 67 | >20 | 20 | <2.0 |
| High Moisture | 40 | 30 | 57 | 43 | 30 | 50 | >30 | 30 | <2.0 |

EXAMPLE XXXIV

Porous Mat As Filter Media for Entrained Dust Particles

Procedure

A moving foraminous conveyor as shown in FIGS. 10 and 11 was used as a collecting device for fine dust emitted from a conventional spray dryer producing non-fat dry milk powder. The porous dry mat produced as described below was characterized by excellent dispersibility characteristics and met ADM standards for "instant" NDM. Dryer exhaust air supply was supplied from a 3000 pound per hour capacity spray dryer. Maximum solids in this exhaust were 300 pounds per hour or 5 pounds per minute; water was atomized to moisten conveyor at a rate of 1 to 2 pounds per minute.

Process Conditions

A portion (10-20%) of the exhaust air from a spray dryer was used to form a precoat of agglomerated dust particles on a horizontal moving screen as follows: Sufficient water was sprayed onto the conveyor's upper surface employing a chamber as shown in FIG. 8 as a preparatory precoating step to permit moistening the dust particles sufficiently to render them cohesive and cause them to adhere to the surface of the screen. In this stage the face velocity of the dryer exhaust gas at point of passage through the screen was regulated at a rate of less than 200 feet per minute and preferably about 100 fpm, thus requiring an area of 40 to 80 square feet. The particles collected in this stage formed a mat approximately 0.60 inches thick at the point where conveyor left the precoating stage. The conveyor then passed into a second chamber (not shown) into which the remaining exhaust air plus the air emitted from the precoating stage were introduced and directed through the mat formed in the first stage.

Atomizing - Water to moisten conveyer
Nozzles - Spraying Systems Inc.
  Type - SXA
  No. - 4
  Size - No. 80A orifice insert with 101A
Feed Pressure - 500-750 psi.
Feed rate - 60-120 lbs. per hr.
Precoat stage:
Spray Chamber -
Air inlet temp. - 180° F.
Air outlet temp. - 130° F.
Air flow CFM - 4000-6000
Second Stage Dryer
Air inlet temp. - 180° F.
Air outlet temp. - 175° F.
Air flow CFM - 40000 at 180° F.
Screen conveyor rate - 1.0 ± 0.5 inches/min
Dust Particles Emitted from Dryer Cyclone
(up to 10% of dryer output)
Estimated quantity - 300 lbs. per hr.
Mean particle size - 30μ
Max. particle size - 100μ
Solids (dust) in Exhaust from Filter Stage
Estimated quantity - <10 lbs./hr.
Mean particle size - <10μ
Max. particle size - <10μ

3. Mat Character

|  | As Deposited on Mat | Leaving Spray Chamber | Leaving Second Stage |
|---|---|---|---|
| Conveyor rate 1.2" per minute |  |  |  |
| Thickness of mat | 0.0-0.6" | 0.6" | 3.0" |
| Pressure Drop Across Mat, in. of water |  | <0.5 | 2.0" |
| Sifted Product: |  |  |  |
| Bulk density gms/cc avg. |  |  | 0.35 |
| Particle density (air pycnometer) |  |  | 0.95 |
| % Moisture |  |  | 2.30 |
| Intercept value (flow resistance) |  |  | 420. |
| Intact Mat: |  |  |  |
| % Moisture, avg. |  |  | 2.30 |
| Bulk density, avg. gms/cc |  |  |  |
| Particle density (air pycnometer) |  |  | 0.90 |
| Intercept value (flow resistance) |  |  | 120. |
| Void Fraction |  |  | .68 |

EXAMPLE XXXV

For comparative purposes analytical data and computations as to the air flow resistance for various intact porous mat products and particulated samples thereof were determined. The data and computations therefore were determined pursuant to the methodology of Example XII. The following Table IX sets forth the various mat products prepared pursuant to the previous examples as indicated therein. In Table IX it will be observed that the non-fat-milk mat product of Example XII produced under high feed rate conditions possessed a lesser resistance to the flow of gas than the corresponding product prepared under low feed rate conditions. Thus, the high feed rate mat product per Example XII comparatively exhibited a resistance to the flow of gas value (i.e. corrected air flow resistance) to its corresponding particulated test sample thereof 2.15. Conversely, the low feed rate product of Example XII which possessed a lesser degree of porosity between its influent to effluent surface than the high feed rate product had a corrected air resistance ratio of only 0.80. Table VIII also contains air flow resistance data for dry products other than in those in porous mat form of the subject invention. These include commercial spray dried whole milk, non-fat milk, instant non-fat dry milk and a freeze dried non-fat milk. Comparison of the gas flow resistance characteristics of these products clearly distinguishes them from the porous mat products of this invention including those produced at low feed rates. The latter, although produced under conditions less favorable than those preferred for optimum permeability and flow characteristics for a bed did in fact form a porous bed and thus possessed desirable characteristics but to a lesser degree than those obtainable when optimum operating conditions are employed.

As stated above, the porous mat product of the unique type preferred and described herein is exceedingly receptive, sensitive and rapidly responsive to applications of various physical forces, making it possible to impart a wide variety of desirable properties to the materials comprising the bed in situ, or to retain desirable characteristics lost or diminished by application of similar forces to products of similar composition in other than the porous mat form of the subject invention.

TABLE IX

| Mat Product Example No. | | % Moisture | Bulk Density gms/cc | | Average Particle Density | Intercept Air Flow Resistance at Zero Velocity | Air Flow Resistance Ratio Sifted vs. Intact | % Voids | Corrected Air Flow Resistance Ratio[1] |
|---|---|---|---|---|---|---|---|---|---|
| XXVIII | Intact | 1.0 | 0.16 | | 6.10 | 80 | | 85 | 3.0 |
| | Sifted | 1.0 | 0.16 | | 1.11 | 240 | 3.0 | 85 | |
| XII High | Intact | 3.8 | 0.29 | | 1.33 | 47 | | 78 | 2.15 |
| Rate | Sifted | 3.8 | 0.54 | Packed | 1.27 | 898 | 18.0 | 58 | |
| XII Low | Intact | 4.4 | 0.46 | | 1.26 | 4.23 | | 63 | 0.80 |
| Rate | Sifted | 4.4 | 0.62 | Packed | 1.22 | 1236 | 2.9 | 50 | |
| XXIX | Intact | 3.4 | 0.08 | | 0.93 | 30 | | 83 | 5.91 |
| | Sifted | 3.4 | 0.09 | Packed | 0.40 | 460 | 15.0 | 76 | |
| XVII | Intact | 2.4 | 0.16 | | 1.10 | 75 | | 85 | 3.33 |
| | Sifted | 2.4 | 0.16 | Packed | 1.11 | 250 | 3.33 | 85 | |
| XVI High | Intact | 1.47 | 0.32 | | 1.44 | 47 | 10.0 | 78 | 1.54 |
| Rate | Sifted | 1.47 | 0.53 | | 1.41 | 475 | | 61 | |
| XVI Low | Intact | 3.01 | 0.36 | | 1.47 | 90 | 6.0 | 75 | 1.64 |
| Rate | Sifted | 3.01 | 0.56 | | 1.41 | 545 | | 63 | |
| XX High | Intact | 4.40 | 0.38 | | 1.31 | 37 | 7.8 | 72 | 1.81 |
| Rate | Sifted | 4.40 | 0.55 | | 1.29 | 288 | | 58 | |
| XX LOw | Intact | 4.80 | 0.40 | | 1.19 | 312 | 2.2 | 67 | 0.95 |
| Rate | Sifted | 4.80 | 0.47 | | 1.16 | 670 | | 59 | |

[1]Ratio of sifted to intact mat product wherein the sifted test sample values have been corrected to an equivalent void fraction to that of the intact mat sample (see Example XII Supra).

What is claimed is:

1. A highly porous mat of agglomerated particles collected on a foraminous member by spraying a mixture of liquid and solid materials into a stream of a drying gas which is flowed through the foraminous collecting member comprising:
    a multiplicity of microscopic spheroidal particles which are initially deposited on the foraminous collecting member and are rigidly bonded together at their points of contact to form an initial bed extending substantially over the entire surface of the foraminous collecting member, having upper and lower surfaces, and a multiplicity of communicating pores and channels extending between said upper and lower surfaces and through which substantially all of said drying gas continues to flow,
    said initial bed acting as a filter medium to subsequently remove air entrained particles from said drying gas which removed particles are rigidly bonded at their points of contact with each other and the particles forming said initial bed to provide a porous mat having a thickness of several inches corresponding to the combined thickness of a multiplicity of said particles, and
    said resultant mat characterized by said bonded particles having a moisture content substantially less than at the time they are deposited on the foraminous collecting member or filtered from said drying gas and by having a void fraction value greater than 0.50.

2. The mat product according to claim 1 wherein the pores within said mat are oriented to form channels extending predominantly normal to the upper and lower surfaces thereof.

3. The mat product according to claim 1 wherein the lower surface of said mat bears the impression of the foraminous collecting member.

4. The mat product according to claim 1 wherein the particles forming said mat is a food product.

5. The mat product according to claim 4 wherein a major portion of the particles forming said mat on a weight basis is a lacteal product.

6. The mat product according to claim 5 wherein the particles forming said mat consist essentially of whey solids.

7. The mat product according to claim 5 wherein the particles forming said mat consist essentially of non-fat milk solids.

8. The mat product according to claim 5 wherein the particles forming said mat consist essentially of whole milk.

9. The mat product according to claim 5 wherein the particles forming said mat consist essentially of cheese solids.

10. The mat product according to claim 5 wherein the particles forming said mat consist essentially of cheese food solids.

11. The mat product according to claim 5 wherein the particles forming said mat consist essentially of cream solids.

12. The mat product according to claim 5 where the particles forming said mat consist essentially of sour cream solids.

13. The mat product according to claim 5 wherein the particles forming said mat consist essentially of buttermilk solids.

14. A mat product according to claim 5 wherein the particles forming said mat consist essentially of delactosed whey solids from which at least 20% to about 90% by weight of the whey lactose has been removed.

15. A mat product according to claim 5 wherein the particles forming said mat consist essentially of demineralized whey derived from whey and from which at least 20% by weight of whey mineral constituents have been removed.

16. The mat product according to claim 7 wherein said non-fat milk solids particles are derived from a demineralized non-fat milk source from which at least 20% by weight of the minerals have been removed.

17. The mat product according to claim 7 wherein at least 20% by weight of the lactose constituent has been removed from said non-fat milk.

18. The mat product according to claim 2 wherein said mat is characterized as exhibiting a lesser resistance to the flow of gas than a particulated sample of the particles forming said mat in which the particulates of said sample have a maximum size of less than 840 microns and the resistance to the flow of gas for the particulated sample is computed on an equivalent void fraction basis as said mat product.

19. The mat product according to claim 18 wherein said particulated sample on an equivalent void fraction basis as said mat product comparatively exhibits at least a two-fold resistance to the flow of gas as said mat product.

20. The mat product according to claim 19 wherein said particulated sample on an equivalent void fraction basis as said mat product comparatively exhibits at least a three-fold resistance to the flow of gas as said mat product.

21. The mat product according to claim 1 wherein the particles forming said mat is a biologically active concentrate containing an effective amount of a heat labile substance having a biological activity equal to at least 50% (on a moisture free basis).

22. The mat product according to claim 21 wherein the particles forming said mat contain an effective amount of biologically active proteinaceous substance selected from the group consisting of micro-organisms, enzymes, co-enzymes, vitamins and pro-vitamins.

23. The mat product according to claim 21 wherein said biologically active substance is contained in an innocuous menstrum effective in retaining and preserving its biological activity.

24. The mat product according to claim 22 wherein the major portion of the biologically active substance is rennin.

25. The mat product according to claim 22 wherein said biologically active substance is invertase.

26. The mat product according to claim 22 wherein the biologically active substance is a protease.

27. The mat product according to claim 22 wherein the biologically active substance is a lipase.

28. The mat product according to claim 22 wherein the biologically active substance is Vitamin A.

29. The mat product according to claim 22 wherein said biologically active substance is carotene.

30. The mat product according to claim 22 wherein said biologically active substance is an amylase.

31. The mat product according to claim 22 wherein said biologically active substance is lactase.

32. The mat product according to claim 22 wherein said biologically active substance is diastase.

33. The mat product according to claim 1 wherein the particles forming said initial bed and the air entrained particles, immediately prior to contacting the foraminous collecting member or said initial bed, are tacky.

* * * * *